(12) United States Patent
Jiang

(10) Patent No.: US 9,207,776 B2
(45) Date of Patent: Dec. 8, 2015

(54) INPUT SYSTEM AND ITS INPUT METHOD

(75) Inventor: Hongming Jiang, Hangzhou (CN)

(73) Assignee: Hangzhou Kind-Tao Technologies Co., Ltd, Hangzhou (CN)

( * ) Notice: Subject to any disclaimer, the term of this patent is extended or adjusted under 35 U.S.C. 154(b) by 1200 days.

(21) Appl. No.: 12/992,258

(22) PCT Filed: May 15, 2009

(86) PCT No.: PCT/CN2009/000528
§ 371 (c)(1),
(2), (4) Date: Nov. 11, 2010

(87) PCT Pub. No.: WO2009/137992
PCT Pub. Date: Nov. 19, 2009

(65) Prior Publication Data
US 2011/0071818 A1 Mar. 24, 2011

(30) Foreign Application Priority Data

May 15, 2008 (CN) .......................... 2008 1 0062387

(51) Int. Cl.
*G06F 3/0481* (2013.01)
*G06F 3/0482* (2013.01)
*G06F 3/023* (2006.01)

(52) U.S. Cl.
CPC .................................. *G06F 3/0236* (2013.01)

(58) Field of Classification Search
CPC ........... G06F 3/00; G06F 3/0202; G06F 3/01; G06F 3/016; G06F 3/017; G06F 3/018; G06F 3/041; G06F 3/048; G06F 3/0481; G06F 3/0482; G06F 3/0488; G06F 3/04883; G06F 3/04886; G06F 3/0233; G06F 3/0338; G06F 3/0237; G06F 3/0416; G06F 3/0236; G06F 9/444

See application file for complete search history.

(56) References Cited

U.S. PATENT DOCUMENTS

| | | | | |
|---|---|---|---|---|
| 5,617,314 | A | * 4/1997 | Zhong ........................... | 715/234 |
| 5,745,717 | A | * 4/1998 | Vayda et al. ................... | 715/834 |
| 6,903,723 | B1 * | 6/2005 | Forest ........................... | 345/157 |
| 7,286,115 | B2 * | 10/2007 | Longe et al. ................... | 345/168 |
| 7,453,439 | B1 * | 11/2008 | Kushler et al. ................ | 345/168 |
| 7,817,168 | B2 * | 10/2010 | Nagiyama et al. ............. | 345/661 |
| 8,015,508 | B2 * | 9/2011 | Kim et al. ...................... | 715/863 |
| 2002/0180797 | A1 * | 12/2002 | Bachmann .................... | 345/780 |
| 2004/0104896 | A1 * | 6/2004 | Suraqui ......................... | 345/168 |

(Continued)

FOREIGN PATENT DOCUMENTS

| CN | 2493974 Y | 5/2002 |
|---|---|---|
| CN | 2493974 Y | 5/2002 |

(Continued)

OTHER PUBLICATIONS

International Search Report, dated Aug. 20, 2009, corresponding to PCT/CN2009/000528.

*Primary Examiner* — Xiomar L Bautista
(74) *Attorney, Agent, or Firm* — Christie, Parker & Hale, LLP

(57) ABSTRACT

A man-machine interface is disclosed. The circle is divided into several angle cells. The required inputted content is placed in the cells, the inputted option direction of motion is detected in real time, the content which the user want to input is forecasted and inputted according to the content in the angle cell directed by the extension line of the direction of motion.

35 Claims, 33 Drawing Sheets

(56) References Cited

U.S. PATENT DOCUMENTS

| | | | |
|---|---|---|---|
| 2005/0050476 A1* | 3/2005 | SanGiovanni | 715/834 |
| 2005/0154579 A1* | 7/2005 | Izuha | 704/8 |
| 2006/0258390 A1* | 11/2006 | Cui et al. | 455/550.1 |
| 2007/0040813 A1* | 2/2007 | Kushler et al. | 345/173 |
| 2007/0089070 A1* | 4/2007 | Jaczyk | 715/816 |
| 2007/0188472 A1* | 8/2007 | Ghassabian | 345/169 |
| 2009/0198691 A1* | 8/2009 | Kraft et al. | 707/6 |
| 2009/0213134 A1* | 8/2009 | Stephanick et al. | 345/589 |
| 2009/0265669 A1* | 10/2009 | Kida et al. | 715/863 |
| 2010/0153880 A1* | 6/2010 | Dinn | 715/816 |
| 2011/0029869 A1* | 2/2011 | McLennan | 715/702 |

FOREIGN PATENT DOCUMENTS

| | | |
|---|---|---|
| WO | WO 02/08882 | 1/2002 |
| WO | WO 02/08882 A1 | 1/2002 |
| WO | WO 2007/114677 | 10/2007 |
| WO | WO 2007/114677 A1 | 10/2007 |
| WO | WO 2007/114678 | 10/2007 |
| WO | WO 2007/114678 A1 | 10/2007 |

* cited by examiner

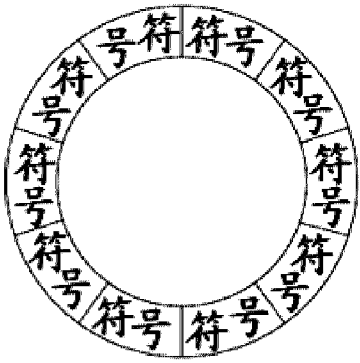
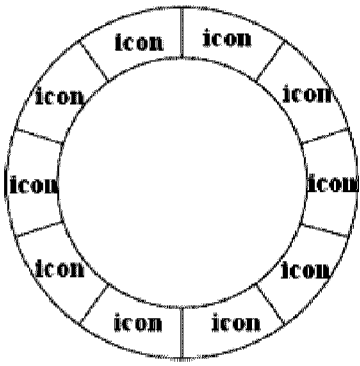
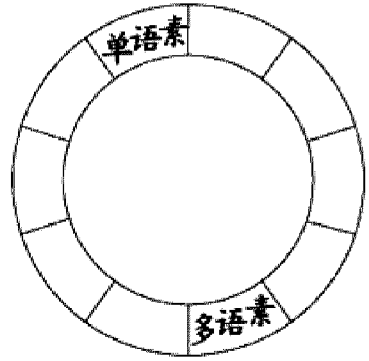
fig. 5-13  fig. 5-14  fig. 5-15
fig. 5-16  fig. 5-17  fig. 6
fig. 7-1  fig. 7-2  fig. 7-3  fig. 7-4  fig. 7-5
fig. 7-6  fig. 7-7  fig. 7-8  fig. 7-9  fig. 7-10
fig. 7-11  fig. 7-12  fig. 7-13  fig. 7-14

fig. 7-15   fig. 7-16   fig. 7-17   fig. 7-18   fig. 7-19
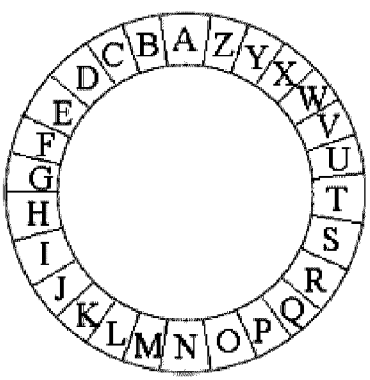 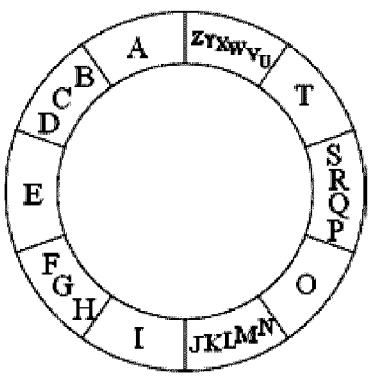 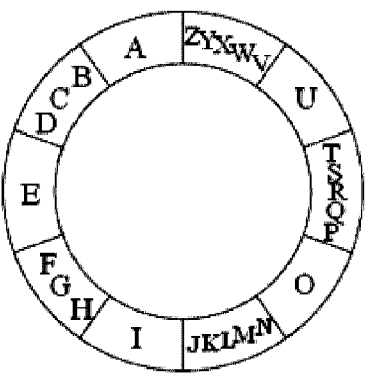
fig. 8-1   fig. 8-2   fig. 8-3
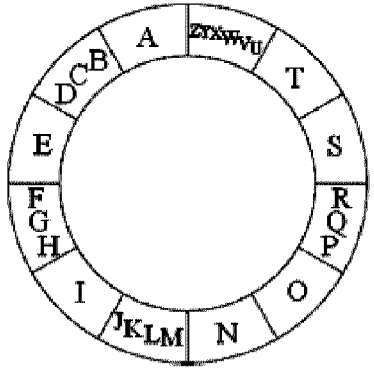 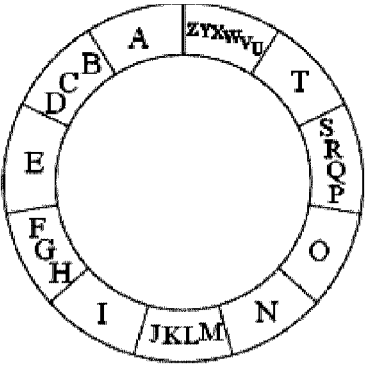 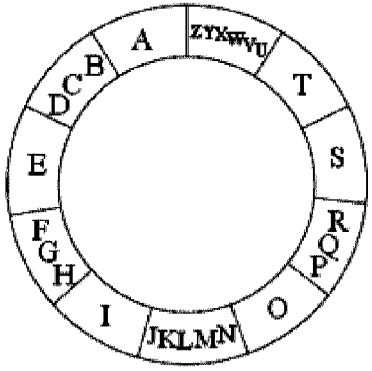
fig. 8-4   fig. 8-5   fig. 8-6
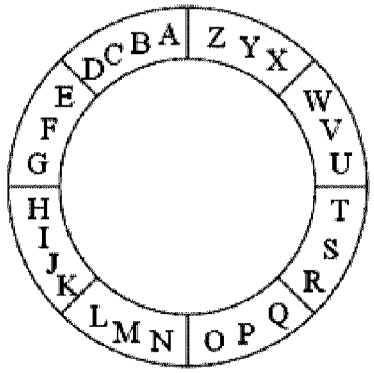 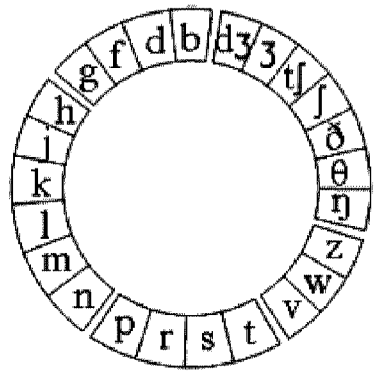 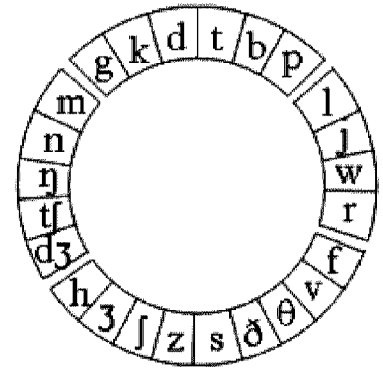
fig. 8-7   fig. 9-1   fig. 9-2

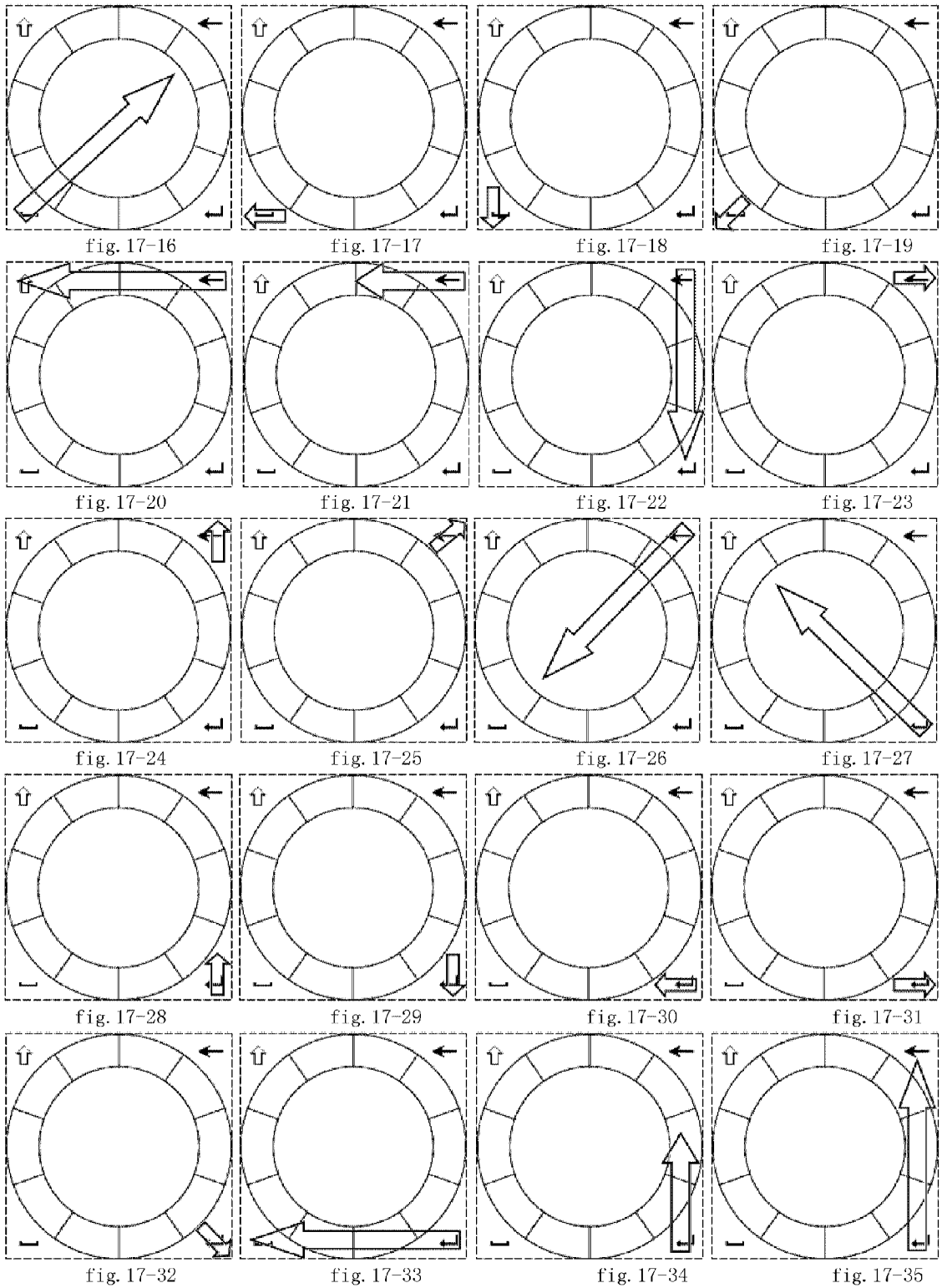

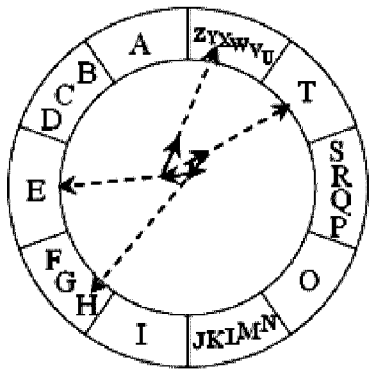
fig. 27-1
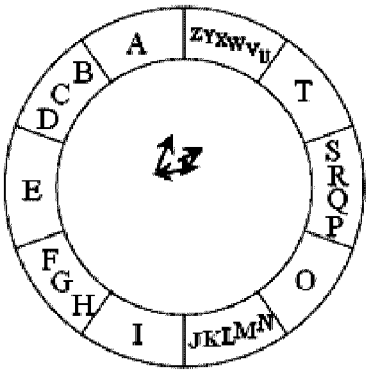
fig. 27-2
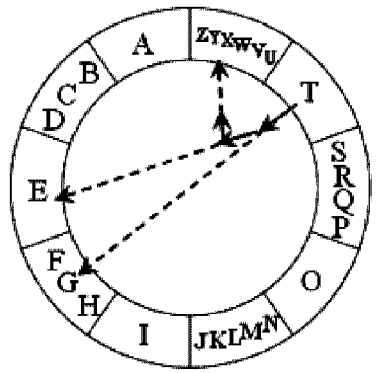
fig. 27-3
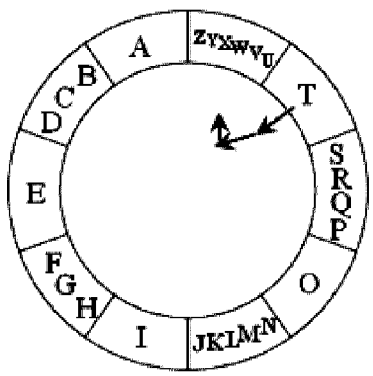
fig. 27-4
First Frequency Word
*Second Frequency Word*
they
*thew*
fig. 27-5
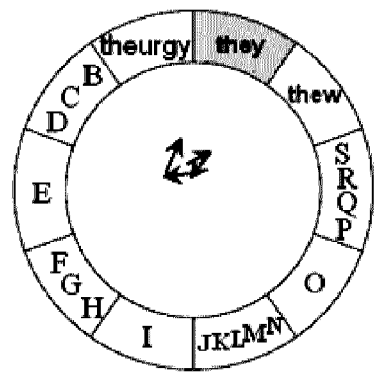
fig. 27-6
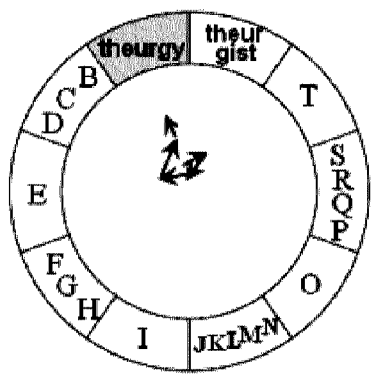
fig. 27-7
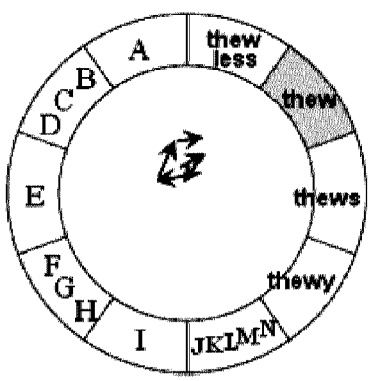
fig. 27-8
First Frequency Word
*Second Frequency Word*
fig. 28-1
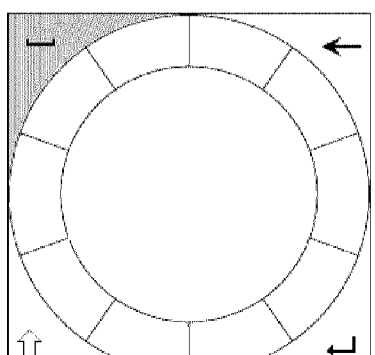
fig. 28-2
First Frequency Word
*Second Frequency Word*
fig. 28-3
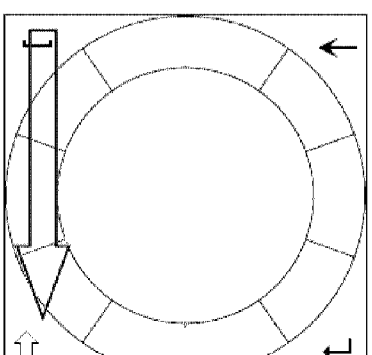
fig. 28-4

Second Frequency Word
Third Frequency Word
Fourth Frequency Word
Fifth Frequency Word
Sixth Frequency Word
......
Last Frequency Word
Second Frequency Word
Third Frequency Word
Fourth Frequency Word
Fifth Frequency Word
Sixth Frequency Word
......
Last Frequency Word
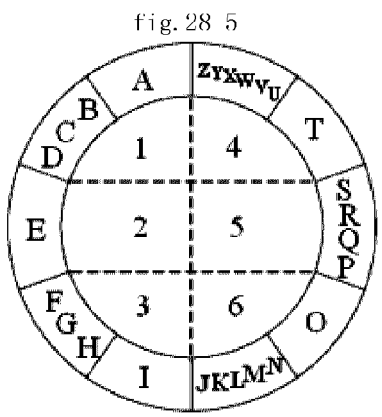
fig. 29-1
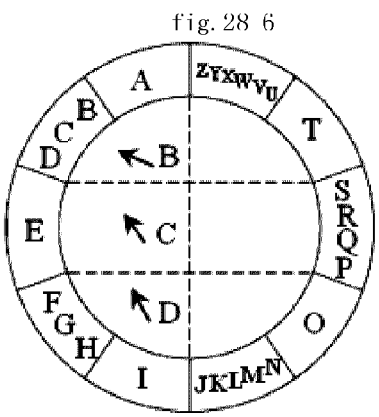
fig. 29-2
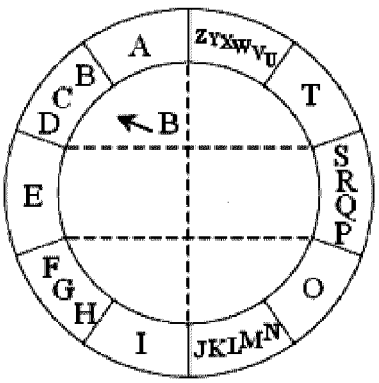
fig. 29-3
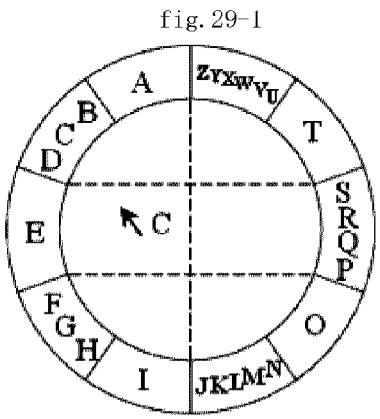
fig. 29-4
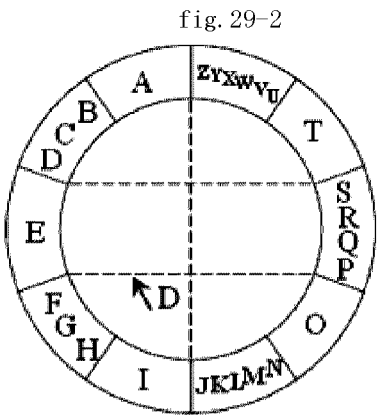
fig. 29-5
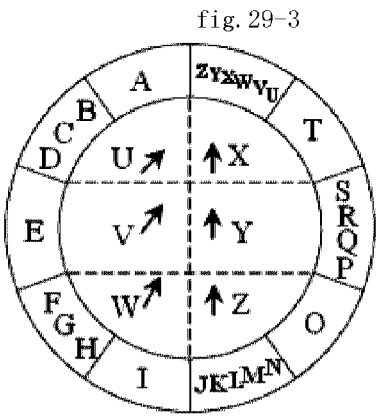
fig. 29-6
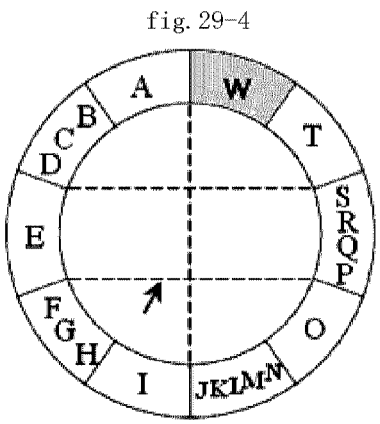
fig. 29-7
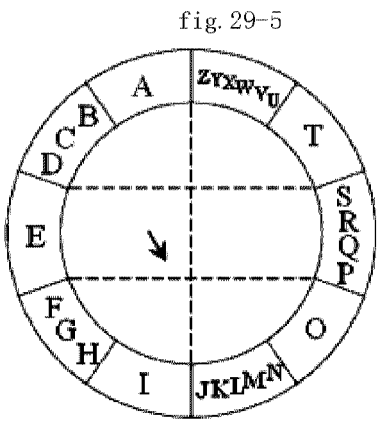
fig. 29-8
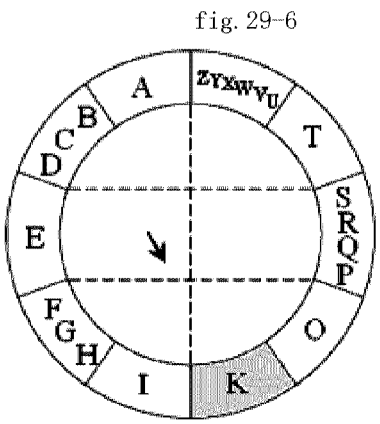
fig. 29-9

| A1 | A2 | A3 | A4 | A5 |
|---|---|---|---|---|
| A6 | A7 | A8 | A9 | An |
| An | An | An | An | An |
| An | An | An | An | An |
| An | An | An | An | An |
| An | An | An | An | An |
| An | An | An | An | An |
fig. 43-1
| , | . | ? | ! | @ |
|---|---|---|---|---|
| : | ; | ' | " | # |
| ( | ) | / | \ | ! |
| [ | ] | { | } | — |
| < | > | & | ^ | % |
| + | - | * | / | = |
| $ | ¥ | € | ~ | ` |
fig. 43-2
fig. 43-3
| あ | い | う | え | お | か | き | く | け | こ |
|---|---|---|---|---|---|---|---|---|---|
| さ | し | す | せ | そ | た | ち | つ | て | と |
| な | に | ぬ | ね | の | は | ひ | ふ | へ | ほ |
| ま | み | む | め | も | や | い | ゆ | え | よ |
| ら | り | る | れ | ろ | わ | い | う | え | を |
| ん | 、 | 。 | ? | ! | ; | @ | " | () | / |
| : | ' | <> | & | % | $ | € | ¥ | * | # |
| 0 | 1 | 2 | 3 | 4 | 5 | 6 | 7 | 8 | 9 |
fig. 43-4
fig. 43-5
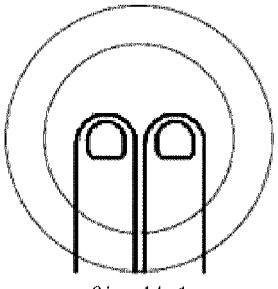
fig. 44-1
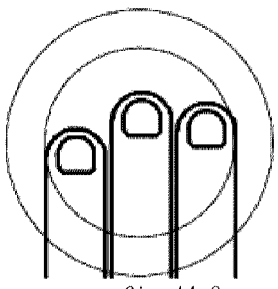
fig. 44-2
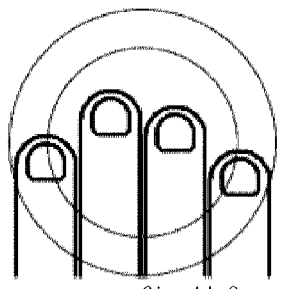
fig. 44-3
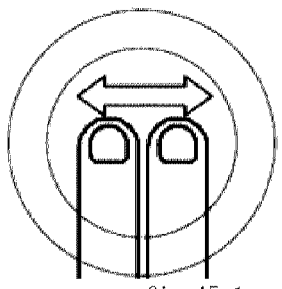
fig. 45-1
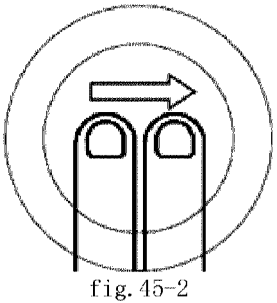
fig. 45-2
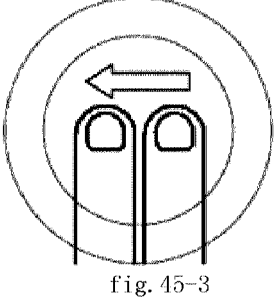
fig. 45-3
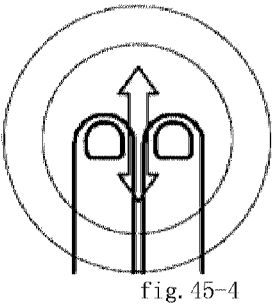
fig. 45-4
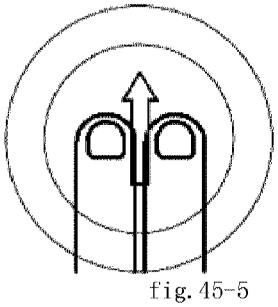
fig. 45-5
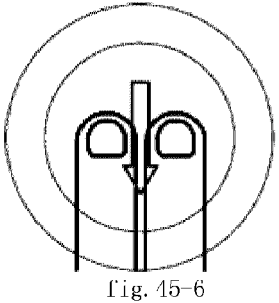
fig. 45-6
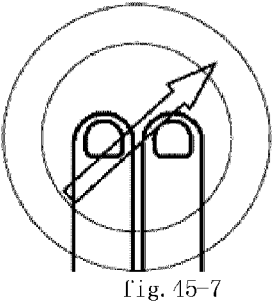
fig. 45-7
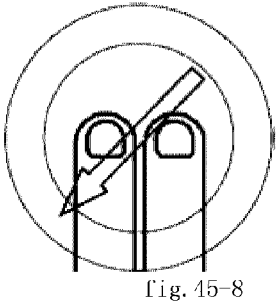
fig. 45-8
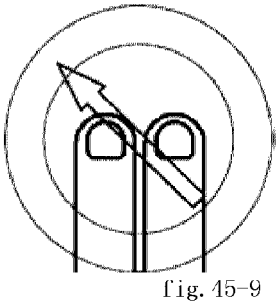
fig. 45-9

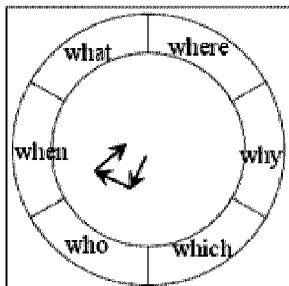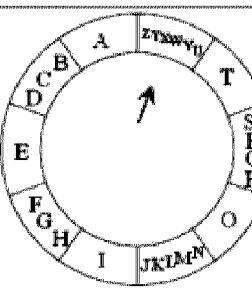 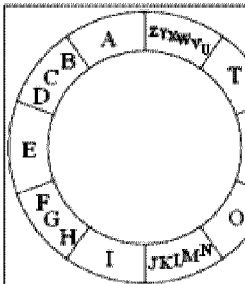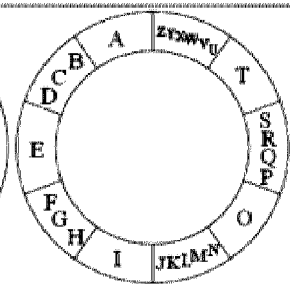
fig. 47-3　　　　　　　　　　　　fig. 47-4
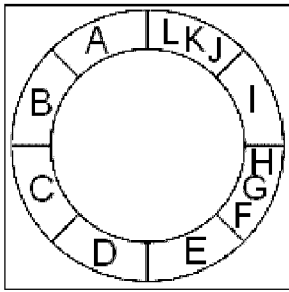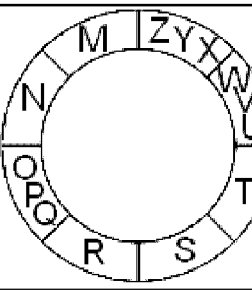 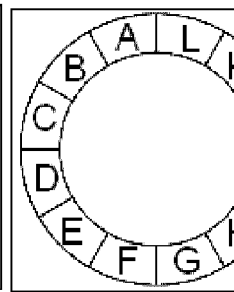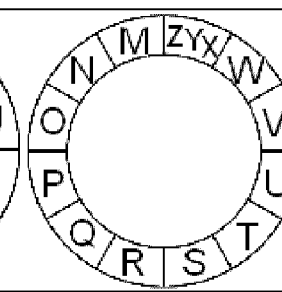
fig. 48-1　　　　　　　　　　　　fig. 48-2
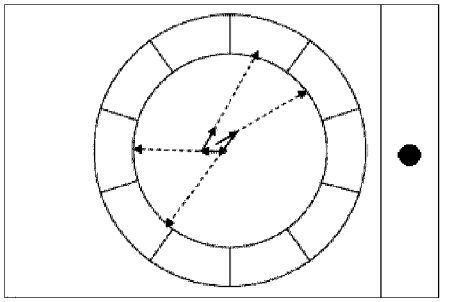  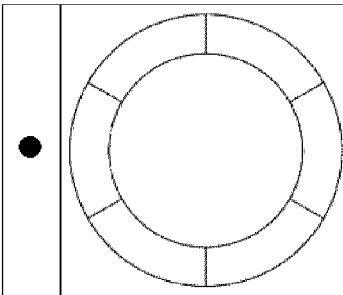
fig. 49-1　　　　　　　　　　　　fig. 49-2
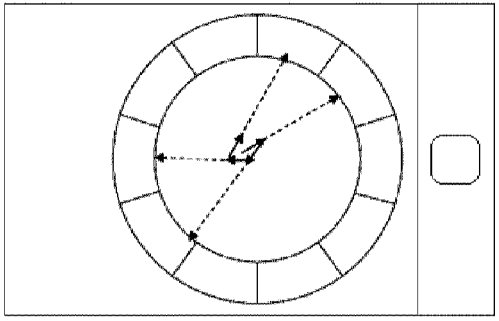　　　　　　　　　　　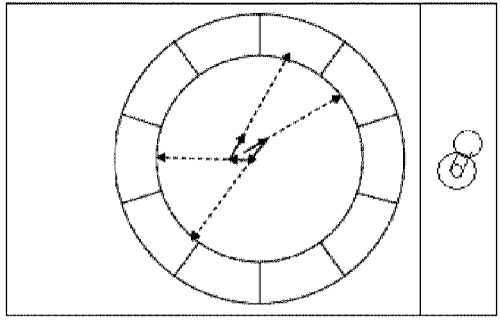
fig. 49-3　　　　　　　　　　　　fig. 49-4
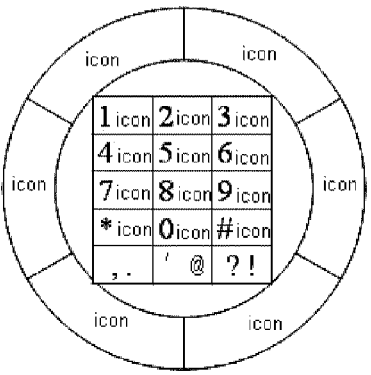 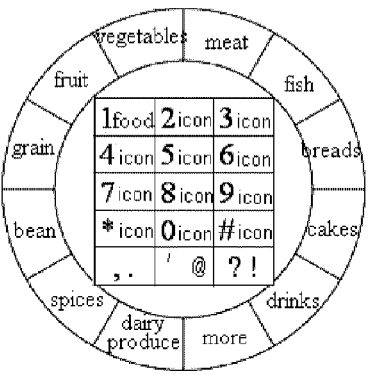 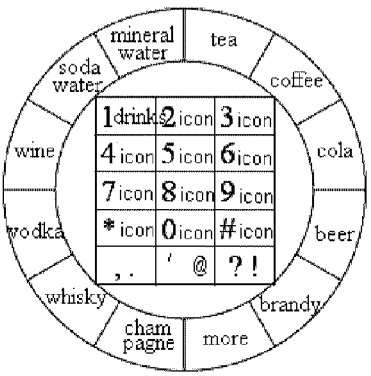
fig. 50-1　　　　fig. 50-2　　　　fig. 50-3

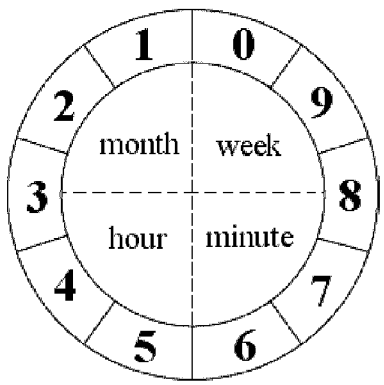
fig. 50-16

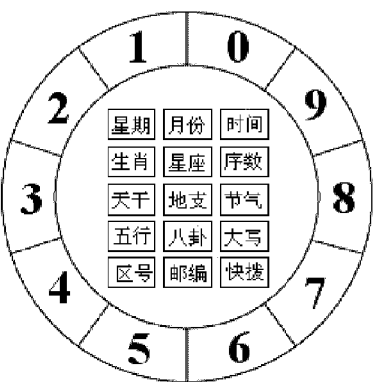
fig. 50-17

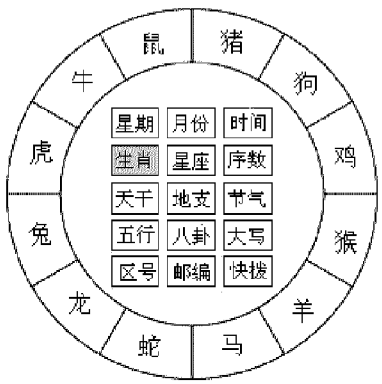
fig. 50-18

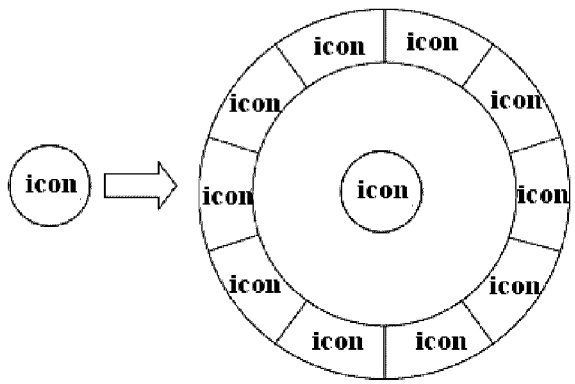
fig. 50-19

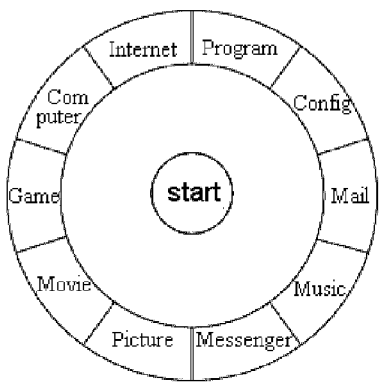
fig. 50-20

| verb tenses | the past tense | the present tense | the future tense |
|---|---|---|---|
| the perfect tense | 1 the Past Perfect Tense | 2 the Present Perfect Tense | 3 the future perfect tense |
| the perfect continuous tense | 4 the past perfect continuous tense | 5 the present perfect continuous tense | 6 the future perfect continuous tense |
| the general tense | 7 the past tense | 8 the present tense | 9 the future tense |
| the continuous tense | * the past Continuous Tense | 0 the present continuous tense | # the future continuous tense |
|  | 73 the past future perfect tense | 79 the past future tense | 7# the past future continuous tense |
|  | 76 the past future perfect continuous tense |||| fig. 51-1

| verb tense | the past tense | the present tense | the future tense |
|---|---|---|---|
| the perfect tense | 1 the Past Perfect Tense | 2 the Present Perfect Tense | 3 the future perfect tense |
| the perfect continuous tense | 4 the past perfect continuous tense | 5 the present perfect continuous tense | 6 the future perfect continuous tense |
| the general tense | 7 the past tense | 8 the present tense | 9 the future tense |
| the continuous tense | * the past Continuous Tense | 0 the present continuous tense | # the future continuous tense |
|  | 73 the past future perfect tense | 79 the past future tense | 7# the past future continuous tense |
|  | 76 the past future perfect continuous tense |||| fig. 51-2

INPUT SYSTEM AND ITS INPUT METHOD

CROSS-REFERENCE TO RELATED APPLICATION(S)

This application is a National Phase Patent Application and claims the priority of International Application Number PCT/CN2009/000528, filed on May 15, 2009, which claims priority of Chinese Patent Application Number 200810062387.8, filed on May 15, 2008.

FIELD OF THE INVENTION

The present invention belongs to the filed of man-machine interface and the field of information input.

BACKGROUND OF THE INVENTION

At present, the man-machine interfaces can be categorized by type into keyboards (numeric keypads of mobile phones, full-size QWER keyboards of computers, and QWER keyboards reduced at different ratios or virtual keyboards of portable devices), mouses, microphones, touch screens, touch pads, handwriting pens, handwriting pads, etc., and can be categorized by input mode into keystroke input, speech input, handwriting input, and coordinate input, etc. The most popular input mode is still keystroke input, due to the factors such as applicability, input speed, recognition rate, and cost, etc. The following table lists the advantages and disadvantages of each man-machine interface (MMI).

| MMI | Input mode | Advantages | Disadvantages |
| --- | --- | --- | --- |
| Keyboard | Keystroke input | High accuracy, high input speed, and low cost | Unhealthy, unsuitable for small devices, not suitable for all languages, poor waterproof, dust-proof, and anti-bacteria performance |
| Mouse | Coordinate input, click input, handwriting input | Natural and directly perceived through the sense, high accuracy | Unhealthy, unsuitable for devices except for computers, in need of a flat surface, low input speed |
| Touch screen, Touch pad | Coordinate input, click input, handwriting input | Natural and directly perceived through the sense | High cost, low input speed |
| Handwriting pen, Handwriting pad | Coordinate input, click input, handwriting input | Natural and directly perceived through the sense | Low input speed |
| Microphone | Speech input | Natural and directly perceived through the sense | Low accuracy, high cost, in need of a quiet ambient, disturbing others |

It can be seen from above table that up to now, there is no MMI that is suitable for devices in all sizes from mobile phones, portable devices to computers, and that is as accurate and quick as keyboards and mouse, and as simple and easy to use as touching and handwriting.

In patent applications PCT/KR2007/001699 (WO2007/114677A1) and PCT/KR2007/001700 (WO2007/114678A1), Mobience Company disclosed a sliding input system. However, that system has several disadvantages: firstly, unless the user slides into the required morpheme cell, the system can't judge the user's input; secondly, it is difficult to implement an appropriate fault tolerance algorithm since the connecting line passes through morphemes; thirdly, the user has to learn the sequence of letters from scratch.

In patent application PCT/CHO1/00453 "Method for A High-Speed Writing System and High-Speed Writing Device", Speedscript Company disclosed a sliding input system, which has very quick input performance. However, that system has several disadvantages. Firstly, the method is only applicable to Indo-European language systems with vowel system (the number of vowel is less than 7) and consonantism or language systems which has 7 or less high-frequency letters, because the method is restricted to 8 directions, and one of the directions has to be used to represent the space bar. That method is inapplicable to Japanese Kana or Chinese characters. Secondly, the user has to learn the quicker letter typesetting of the method from scratch. Thirdly, splitting words into pairs of consonants and vowels greatly disturbs the user's thought.

Dasur Company also introduced a sliding input product with U.S. Pat. No. 7,199,786, named as "SlideIT", which incorporated sliding input and handwriting input. However, that method has several disadvantages: firstly, the connecting distance between letters is very long in some cases, resulting in difficulties in connecting actions and therefore low input speed; secondly, it is difficult to design an appropriate fault tolerance algorithm, since the connecting line passes the letters; thirdly, unless the user slide onto or nearby the required morpheme, the system can't judge the user's input.

In can be seen from above description: at present, most MMIs still employ real keyboards or virtual keyboards to input information by pressing; or, like the products introduced by Mobience Company or Dasur Company, input information by detecting the morpheme where the turning point of lineation lies; or, like the product introduced by Speedscript Company, input information by defining fix directions as special input information. Up to now, there is no method that can detect the user's movement direction and predict the user's input content in real time. There is a need for a MMI that is directly perceived through the sense, ergonomically designed, in line with the inherent culture and rule of a variety of languages, capable of inputting information by simple clicking, sliding, lining, or pressing, as natural and directly perceived through the sense as touch screen and speech input, as simple and convenient as handwriting input, as accurate as real keyboard input, with high input speed and at affordable cost.

SUMMARY OF THE INVENTION

The technical problem to be solved by the present invention is to overcome the shortages in the prior art and provides a novel man-machine interface (MMI).

One purpose of the present invention is to provide a MMI that is in line with the characteristics of all human languages and symbols, applicable to devices in all sizes ranging from mobile phones, portable devices, computers to large-screen TV and applicable to all sizes ranging from point to plane, and is natural, directly perceived through the sense, achieves high input speed, at affordable cost.

To solve the technical problem described above, the present invention employs the following technical scheme:

The present invention provide a MMI that can detect any movement direction in real time, and predict and input information in real time according to the detected direction, wherein, the circumference is divided into angular cells, the content to be input is placed in the angular cells, the movement direction is detected in real time, the content expected by the user is predicted and judged according to the content in the angular cell which the extension line in the movement direction points to, the positions of starting point, turning points, and finishing point of the movement path, pause durations, and magnitude of pressure are detected in real time, so as to assist the prediction and judgement of the input content expected by the user.

In the said MMI, high-frequency morphemes or special-function morphemes are placed in an angular cell separately. Other morphemes are placed together by sequence or category in an angular cell, respectively.

With regard to the above-mentioned method of arrangement of morphemes, in the language interfaces of English and other languages similar to English, five letters "A, E, I, O, T" are placed in one angular cell separately; or, the five vowel letters "A, E, I, O, U" are placed in an angular cell separately; or, six letters "A, E, I, N, O, T" are placed in an angular cell separately; or, six letters "A, E, I, O, S, T" are placed in an angular cell separately; or, seven letters "A, E, I, N, O, S, T" are placed in an angular cell separately. In the interface for Chinese characters, five essential strokes "—, |, ノ, 丶, and ➔" are placed in an angular cell separately. In the interface of Japanese characters, every 5 Japanese Kana are placed together into an angular cell according to the order of Japanese syllabary.

The basic sliding actions and functions of the said MMI are shown in the following table:

With the MMI, the content in the angular cell that the current movement direction points to change in real time, an incremental morpheme string is prompted hierarchically for the user to select and continue. Once the movement direction doesn't point to the angular cell any more, the content in the angular cell returns to the initial state.

When words are input, the hierarchical and incremental prompt function of angular cells prompts different contents depending on the input angular cells. When the contents in the first and second angular cells are input, the prompt function prompts commonly used prefixes or letter strings initiated with the morpheme in the angular cell for the user to select; when the contents in the second and third angular cells are input, the prompt function prompts commonly used letter strings initiated with the morpheme in the angular cell for the user to select; when the contents in the third and further angular cells are input, the prompt function prompts commonly used suffixes or letter strings initiated with the morpheme in the angular cell for the user to select.

The hierarchical and incremental prompt function of angular cells prompts letter variants when words of Latin language family are input.

The hierarchical and incremental prompt function of angular cells prompts incremental morpheme strings hierarchically during Chinese input are shown in the following table:

| Angular cell | First prompt | Second prompt | Third prompt | Angular cell | First prompt | Second prompt |
|---|---|---|---|---|---|---|
| — | 二 | 三 | 三 | a | an | ang |
| \| | \|\| | \|\|\| | \|\|\|\| | e | en | eng |
| ノ | ノノ | 彡 | | i | in | ing |
| 丶 | 冫 | 口 | 灬 | o | ou | ong |
| → | 三 | 亻 | 乁 | u | un | ü |
| ㄋ | ㄱ | ㄷ | 彐 | ㄥ | ㄴ | ㄣ |
| ㄴ | ㄴ | 亻 | ㄹ | ㄨ | ㄌ | ㄅ |

In the said MMI, multi-morpheme angular cells have expansion and enlargement function, i.e., the morphemes in the multi-morpheme angular cell that the movement direction

| Operation mode | Function |
|---|---|
| Slide inward from the circumference | Input the content in the angular cell at the starting point and the content in the angular cell that the movement direction points to |
| Slide inward from the circumference | In a circle of numbers, input the pointed numbers by the number at the starting point |
| Slide from inside of the circle towards the circumference | Input the content of the angular cell that the extension line of direction points to |
| Pause at the starting point | Indicate the position of the morpheme in the word or sentence |
| Slide from inside of the circle directly to the circumference | Quick input of high-frequency word or phrase with the morpheme at end point as initial |
| Slide outward from the circumference | Input upper case or letter variant, or quick input of word |
| Slide outward from the circumference and then slide back | Input letter variant, or quick input of word or phrase |
| Slide between two adjacent angular cells | Input a combination of morphemes in the adjacent two angular cells |
| Slide within an angular cell | Select an morpheme in a multi-morpheme angular cell |
| Slide within an angular cell | Quick input of word in a single-morpheme angular cell |
| Two fingers retract inward from the circumference | Input a combination of the morphemes in the two starting angular cells |
| Two fingers extend outward from the circumference | Input a combination of the morphemes in the two angular cells that the two extension lines point to |
| Two fingers revolve on the circumference | Revolve or switch the interface | points can be expanded and enlarged to the adjacent angular cells for the user to select. After expansion and enlargement, each morpheme in the multi-morpheme angular cell occupies an angular cell separately.

With the multi-morpheme angular cell expansion and enlargement function described above, the morphemes in an expandable angular cell can be expanded in three ways: firstly, expanding towards both sides, centering on the central morpheme in the angular cell; secondly, expanding towards both sides, centering on the high-frequency morpheme in the angular cell; thirdly, expanding towards both sides, centering on the morpheme that the movement direction points to.

In the said MMI, the angular cells have angular enlargement function, i.e., each angle of the adjacent angular cells that the movement direction points to can be enlarged for the user to select.

The said MMI provides icon-based and category-based input methods. When an icon is input by clicking or sliding, the content of category represented by the icon is expanded hierarchically for the user to select. The icons of the operating system can be manipulated by continuous sliding.

The said MMI provides an input method on the basis of direction combination of the angular cells. When the user inputs a plurality of angular cells directly and continuously, the system will automatically filter out meaningful combinations from all possible combinations of all morphemes in these angular cells. If there is only one meaningful combination, the combination will be input directly. If there are more combinations, the high-frequency combination will be input directly, while the other combinations are provided for the user to select.

The said MMI provides an assistant initial morpheme screening method for the input method on the basis of direction combination of angular cells, wherein, the initial morpheme is input separately, and multiple angular cells are input directly and consecutively, starting from the second morpheme; the system filters out meaningful combinations from all possible combinations. If there is only one meaningful combination, the combination will be directly input. If there are more combinations, the high-frequency combination will be input directly, while the other combinations are provided for the user to select.

The said MMI provides a method for the user to select morpheme combinations. If the combinations of input morphemes in the angular cells can be recognized as few morpheme combinations, these morpheme combinations will be displayed on the circle directly for the user to select.

The said assistant judging method based on the starting point position information selects the exact morpheme in the angular cell corresponding to the zone of the starting point. Or the morpheme in the angular cell is selected according to the position of the zone of starting point relative to the pointed angular cell: if the zone of starting point faces the angular cell, the center morpheme in the angular cell will be input; if the zone of starting point is adjacent to the angular cell, the morpheme at the corresponding sides will be input.

The assistant judging method based on the starting point position information automatically recognizes the type of input language or the variant of the same language according to the information of the zone of starting point.

The assistant judging method based on the starting point position information automatically identifies the demarcation points of morphemes at different levels, i.e., positions of morphemes in characters, words, phrases, or sentences, according to the zone of the starting point, so as to achieve smart input of word, phrase or whole sentence.

The assistant judging method based on the pause time information of starting point automatically identifies the demarcation points of morphemes at different levels according to the pause time information of the starting point, i.e., the positions of morphemes in characters, words, phrases, or sentences, so as to achieve smart input of word, phrase or whole sentence.

The assistant judging method based on turning point information judges accent position of the language according to the position of turning point beyond the circle and judges long vowels in the language according to the pause time at the turning point.

The assistant judging method based on the position information of starting point inputs the tones of the language according to the zone of the starting point.

The assistant judging method based on the position information of starting point judges structural information of morpheme elements of Chinese or other languages which have two-dimensional spatial information like Chinese characters, such as Korean, according to the zone of the starting point. The method judges the structural information of strokes, components, or phonetics in Chinese characters according to the zone of the starting point.

The assistant judging method based on the position information of the starting point judges the length of word according to the zone of the starting point. If the starting point is on the circumference, it indicates the length of the input word is less than or equal to n; if the starting point is within the circle, it indicates the length of the input word is greater than n. Or, if the starting point is within a specific zone in the circle, it indicates the length of the input word is less than or equal to 3 letters; if the starting point is within another zone in the circle, it indicates the length of the input word is 4-6 letters; if the starting point is within a different zone in the circle, it indicates the length of input word is greater than 6 letters.

The assistant judging method based on the position information of starting point determines the part of speech or meaning category of the input content according to the position of the starting point.

The said MMI can be operated by more than one finger. The fingers can click on the interface to achieve the function of Space, Enter, and Syntax keys. When the fingers slide on the interface towards different directions, the interface will be toggled accordingly. The sliding of fingers on the interface towards different directions can achieve the function of CapsLock key, Backspace key, and Enter key. The sliding of fingers on the interface towards different directions can achieve selection from optional characters or words and selection of the last input content. The sliding of fingers on the interface towards different directions can achieve selection of word tense.

The said MMI can work with more than one circle. The interface can be designed to support circular interface on one side and handwriting input interface, mouse interface, or plot interface on the other side. Or the interface can work with two circles, wherein, one circle serves as primary circle, while the other circle serves as auxiliary circle and is dedicated to enlargement of the selection. Or both circles can be primary circles, wherein, when a word is input in one circle, the next word can be input in the other circle. The interface can be toggled among primary circle, auxiliary circle, handwriting input interface, plot interface, and mouse interface.

The said MMI supports direct input of high-frequency characters and words by click or a variety of quick input methods.

The said MMI supports phonetic input and letter/phonetic input.

In Chinese character input, the said MMI simultaneously provides phonetic input, character pattern input, phonetic/character pattern input, and stroke input, and support toggling among those input methods.

The said MMI provides a Syntax key function. When the system detects action of the Syntax key, it automatically accomplish input of the corresponding syntax word according to the part of speech of the currently input word.

| Syntax key | Noun | Verb | Pronoun | Number | Adjective, Adverb |
|---|---|---|---|---|---|
| Click | Plural form | Past tense | Reflexive pronoun | Cardinal number | Comparative degree |
| Click again | Singular form | Simple tense | Objective | | Positive degree |
| Double-click | Possessive | Perfect tense | Possessive pronoun | Ordinal number | Superlative degree |
| Long press | | Progressive | | | Superlative degree |

On the said MMI, CapsLock, Space, Backspace, and Enter keys are arranged within the four corner zones between circular frame and square frame. In addition, starting from any one of the four zones, sliding actions can be conducted towards different directions, to select from the alternative words, phrases or sentences prompted by the system; select from words, phrases or sentences input by the user before; select from commonly used words, phrases or sentences; toggle among input interfaces; achieve the function of Esc key, Tab key, cursor keys (Up, Down, Left, Right), PgUp key and PgDn key, Home key and End key; achieve editing function of copy, cut, paste, delete, undo and redo, etc.; achieve the function of upper case conversion of initial letter or all letters of previous word, or upper case conversion of initial letter of next word; achieve direct deletion of previous word or sentence, or direct deletion of next word or sentence, etc. In the Chinese character input interface, clicking in a corner zone can accomplish quick toggling between Simplified Chinese and Traditional Chinese, and sliding in the corner zone can accomplish toggling to handwriting recognition interface.

On the MMI, the user can confirm the input content in an angular cell in three methods.

| | Direct input, without any prompt | Direct input when the angular cell is pointed, and provide feedback by different display | When the angular cell is pointed, differentiate the display but don't input, wait for the user to confirm; after the user confirms the input, differentiate the display in a different way to provide feedback. |
|---|---|---|---|
| Initial morpheme | 1 | 2 | 3 |
| The rest morphemes | 4 | 5 | 6 |

The said MMI carries out fault-tolerant treatment for the user's input angle on the basis of word frequency.

With the said MMI, when the user inputs words or phrases that don't exist in the database, such as personal names, the user can input the morphemes one by one. Once the user input such a word or phrase, the system adds the word or phrase into the system database automatically, so that the user can input the word or phrase continuously from now on.

The said MMI can also work by detecting pressure direction and swaying direction, besides detecting sliding direction.

The said MMI supports toggling among different input interfaces by swaying the device.

With the said MMI, the hierarchical and incremental prompt function and angular cell enlargement function can be used alternately.

The said MMI can input the content displayed or prompted by the system when the user leaves the MMI, and can add or delete spaces automatically as required.

Compared with the prior art, the present invention has the following advantages:

1. The order of morphemes on the MMI of the present invention is adequate for the characteristics of all human languages and symbols, and thereby enable the user to input directly with the morphemes in his/her mother language; therefore, the user can almost start to use the MMI immediately without learning; particularly, the beginners who have never used electronic devices like computers don't need to spend a lot of time to get familiar with the layout of QWER keyboard and learn typewriting. For people whose mother language is not English, the MMI provides a natural mother language environment and a morpheme order that matches their speech order in mother language.

2. The MMI makes it possible to input vast information on a small surface quickly, and therefore brings wide application prospects to information input on portable electronic devices (such as mobile phones, MIDs, UMPCs, and Tablet PCs, etc.). The MMI overcomes the contradiction that a full-size QWER keyboard is required to process vast information while it is difficult to produce small and compact devices with such a QWER keyboard. (Though the BlackBerry mobile phone from RIM company is equipped with an integrated QWER keyboard, the keyboards are too small to input with ten fingers as the case with full-size keyboard; instead, the small QWER keyboard only permits input with two fingers at the same time. The IPHONE from APPLE company is equipped with an integrated soft QWER keyboard, but the keyboards are too small to use conveniently.) The MMI provided in the present invention is applicable to devices in all sizes, from mobile phones, to portable devices, computers, and large-screen TVs.

3. By arranging high-frequency morphemes in a separate angular cell and arranging other lower-frequency morphemes together in groups in an angular cell in the order of morpheme in the language, the basic morphemes of each language can be distributed in 8-12 angular cells. In this way, the angle of each angular cell is at least 30 degrees, enough for the user to slide, stroke, and apply force, without worrying about inaccurate operation.

4. By reducing the number of angular cells, the original morpheme units to be input can be reduced by 50% or more. For example, for English, the 26-letter units are substituted by 10 angular cells, reduced by 60%. For Japanese, the 50 Kanji Codes are substituted by 10 angular cells, reduced by 80%.

5. By arranging high-frequency morphemes in a separate angular cell, the actions required for selecting from the morphemes in the same angular cell can be reduced for input of initial morpheme, and the actions required for selecting from the morphemes in the same angular cell can be reduced for input of individual morphemes. For example, in the English interface, both the cumulative frequency and initial letter frequency of five high-frequency letters "A, E, I, O, T" are higher than 40%, and the cumulative frequency of six high-frequency letters "A, E, I, N, O, T" is higher than 50%, which is to say, when inputting the individual morphemes, the user can input directly in 40% or even half of the cases, and doesn't need to select from the letters in an angular cell. When inputting the initial morpheme, the user can input directly in more than 40% cases.

6. The users don't need to touch the required content actually so long as the extension line of the movement direction points to the required content. Therefore, the distance of movement is shorter and the input speed can be improved.

7. The angular cells are used in combination with input method, so that the actions for selecting from morphemes can be reduced and therefore the input speed can be improved.

8. In the case the initial morpheme is input separately and the second to the last morphemes are directly input in combination without expansion, the accuracy of directly input word can be as high as 92%~96%; if one word is prompted, what the user sees is right the word he/she expects in 98%~99.7% cases.

9. 98% or more of one-letter words and two-letter words can be input simply by only one sliding action. The total cumulative frequency of one-letter words and two-letter words accounts for 19%, which is to say, in almost 20% cases, the user can input the required content simply by a sliding action.

10. The MMI simultaneously provides phonetic input, character pattern input, phonetic/character pattern input, stroke input, number input, handwriting input, plotting board input and mouse input functions. In addition, the interface can be switched among these functions.

11. The MMI can automatically identify the demarcation points of morphemes (i.e., position information of morphemes in characters, words, phrases, or sentences) at different levels according to the position of starting point or the pause time at the starting point, so as to achieve smart input of word, phrase, or whole sentence, and alleviate the user's input and improve input speed.

12. With the help of hierarchically and incrementally expanded morpheme strings and morpheme combinations, the user can continue the movement along the original direction (or turn slightly) to input a longer morpheme string or morpheme combination; thus the changes of direction of sliding, stroking, and applying force can be reduced, and the input speed and convenience can be improved.

13. A specific morpheme in the morphemes in an angular cell can be input directly, according to the position of starting point and starting direction.

14. The angular cell enlargement function solves the problems related with input angle effectively.

15. The function of the Syntax key can reduce syntax errors of users.

16. The MMI supports operation with several fingers together.

17. The position of turning point can be utilized to input the accent of the language, and the position of starting point can be utilized to input the tone of the language.

18. High-frequency words can be input directly by clicking. For example, 10-12 high frequency Chinese characters, with cumulative frequency higher than 10%, are provided directly, so that these Chinese characters can be input directly by clicking. That is to say, in 10% of the cases, the user can input the expected content simply by clicking. These characters can be input in pairs by lining between them directly.

19. The category and part of speech of input content and structural information (such as strokes and component) of Chinese characters can be determined according to the position of the starting point.

20. The operating system icons can be operated by sliding in a convenient manner.

BRIEF DESCRIPTION OF THE DRAWINGS

The present invention will be further detailed hereunder with reference to the accompanying drawings, to make the skilled person in this art understand the present invention better and make the advantages of the present invention described above more apparently, wherein:

FIG. 15-1 shows sliding inward from the circumference;

FIG. 15-2 shows sliding from inside of the circle towards the circumference;

FIG. 15-3 shows pause at the starting point;

FIG. 15-4 shows direct sliding from inside of the circle to the circumference;

FIG. 15-5 shows sliding outward from the circumference;

FIG. 15-6 shows sliding outward from the circumference and sliding back;

FIG. 15-7 shows sliding between two adjacent angular cells;

FIG. 15-8 shows sliding between two adjacent angular cells;

FIG. 15-9 shows sliding in counter-clockwise direction in an angular cell;

FIG. 15-10 shows sliding in clockwise direction in an angular cell;

FIG. 15-11 shows inward retraction of two fingers from the circumference;

FIG. 15-12 shows outward extension of two fingers from the circumference;

FIG. 15-13 shows sliding of two fingers in counter-clockwise direction on the circumference;

FIG. 15-14 shows sliding of two fingers in clockwise direction on the circumference;

FIG. 15-15 shows a schematic diagram of combined sliding;

FIG. 18-1 is a schematic diagram indicating one prompt at each level;

FIG. 18-2 is a schematic diagram indicating multiple prompts at each level;

FIG. 22-1 shows multiple morphemes in an angular cell;

FIG. 22-2 shows selecting the morpheme at one end of the angular cell by clicking;

FIG. 22-3 shows sliding from one end to the center of the angular cell;

FIG. 22-4 shows sliding from one end to the other end;

FIG. 22-5 shows selecting the morpheme at the other end by clicking;

FIG. 22-6 shows sliding in reversed direction;

FIG. 23-1 shows expansion from a multi-morpheme angular cell towards the adjacent angular cell;

FIG. 23-2 shows that every angular cell with a single morpheme is enlarged;

FIG. 27 is a schematic diagram of input of English word "they";

FIG. 28 is a schematic diagram of selecting alternative words;

FIG. 43 shows an embodiment of layout of morphemes in squares;

FIG. 43-1 Layout of morphemes in squares;

FIG. 43-2 Layout of punctuation symbols in squares;

FIG. 43-3 Layout of English letters, punctuations, and numbers in squares;

FIG. 43-4 Layout of Japanese in squares;

FIG. 43-5 Layout of Arabic in squares;

FIG. 44 shows operation with multiple fingers;

FIG. 46-1 is a schematic diagram of using two circles together;

FIG. 46-2 is a schematic diagram of sliding, with a blank in the middle;

FIG. 46-3 shows a layout of two circles with a mouse in the middle;

FIG. 46-4 shows an embodiment of mouse and circle;

FIG. 46-5 shows an embodiment of the combination of handwriting recognition and circle;

FIG. 48 shows an embodiment of dividing English morphemes into two circles;

FIG. 49 shows an embodiment of other methods for detecting the direction of movement in the present invention;

FIG. 49-1 shows an MMI that detects a point in the pressure direction;

FIG. 49-2 shows an MMI that detects two points in the pressure direction;

FIG. 49-3 shows an MMI with a thumb touch pad;

FIG. 49-4 shows an MMI with a pointstick;

FIG. 51 is a schematic diagram of selecting tense by sliding;

FIG. 53-1 Japanese

FIG. 53-2 Korean

FIG. 53-3 Buginese

FIG. 53-4 Tai Le

FIG. 53-5 Greek

FIG. 53-6 Mandingo (West Africa)

FIG. 53-7 Uyghur Orkhon

FIG. 54-1 Icelandic

FIG. 54-2 Polish

FIG. 54-3 Czech

FIG. 54-4 Albanian

FIG. 54-5 Georgian

FIG. 54-6 Italian
FIG. 54-7 Romanian
FIG. 54-8 Lithuanian
FIG. 54-9 Estonian
FIG. 54-10 Finnish
FIG. 54-11 Turkish
FIG. 54-12 Latvian
FIG. 54-13 Croatian
FIG. 54-14 Slovenian
FIG. 54-15 Faroese
FIG. 54-16 Swedish
FIG. 54-17 German
FIG. 54-18 Portuguese
FIG. 54-19 Danish and Norwegian
FIG. 55-1 Bulgarian
FIG. 55-2 Belorussian
FIG. 55-3 Russian
FIG. 55-4 Ottoman
FIG. 55-5 Buhid
FIG. 55-6 Hanunoo
FIG. 55-7 Tagalog
FIG. 55-8 Tagbanwa
FIG. 55-9 Coptic
FIG. 55-10 Hebrew

DETAILED DESCRIPTION OF THE EMBODIMENTS

Figure 1:
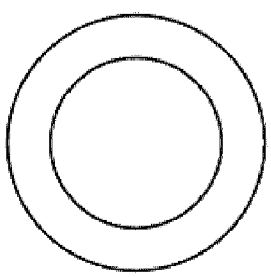
FIG. 1 shows the shapes of basic elements of the MMI.

FIG. 1 is a schematic diagram of basic elements of the MMI in the present invention. FIG. 1-1 shows the schematic diagram of the circumference, and FIG. 1-2 to FIG. 1-9 show the division of circumference into 3-10 angular cells; FIG. 1-10 shows the division of circumference into 12 angular cells; FIG. 1-11 shows division of circumference into more than 20 angular cells. FIG. 1-12 shows the triangular basic elements. FIG. 1-13 shows the quadrate basic elements. FIG. 1-14 shows a quadrate frame used for the basic elements making up the MMI; FIG. 1-15 shows a circular frame used for the basic elements making up MMI; FIG. 1-16 shows squares basic elements making up MMI.

Arrange the language symbols of human in a hollow end-to-end sequence according to the characteristics and sequence of the language symbol system, and divide the circumference into angular cells in varying amounts; the number of the angular cells is determined by the number and nature of basic morphemes of each language symbol system. Allocate the morphemes into the basic elements as shown in FIG. 1. The basic elements can be circles as shown in FIG. 1-1 to FIG. 1-11, triangles as shown in FIG. 1-12, or squares as shown in FIG. 1-13.

Figures 1, 2:
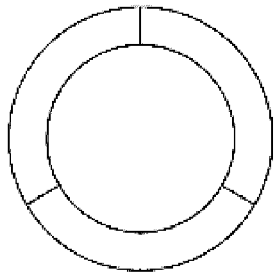
FIG. 2 shows an embodiment of combination of the basic elements of the MMI.
Figures 1, 2, 3:
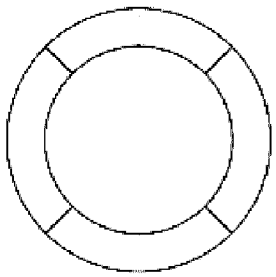
FIG. 3 is a space schematic diagram of four corners between the outer square and the inner circle.
Figures 1, 2, 3, 4:
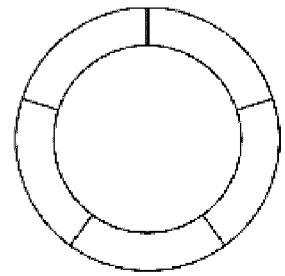
FIG. 4 is a schematic diagram of the zones within the circle.
Figures 1, 2, 3, 4, 5:
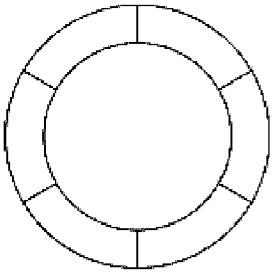
FIG. 5 is a schematic diagram of the contents in the angular cells.
Figures 1, 2, 3, 4, 5, 6:
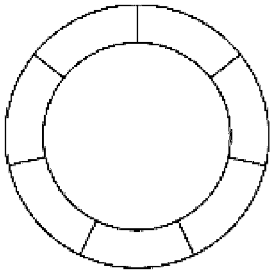
FIG. 6 is a schematic diagram of a combination of single morpheme and multiple morphemes.
Figures 1, 2, 3, 4, 5, 6, 7:
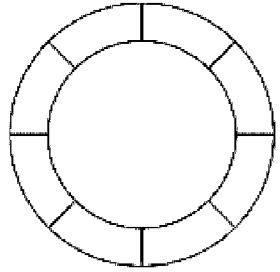
FIG. 7 is a schematic diagram of the content in a square within the circle.

FIG. 5 shows embodiments of a variety of hollow end-to-end sequences. 'A'~'An' in FIG. 5-1 represent the contents to be input by the user, wherein, 'A' represents the contents to be input, and 'n' represents the number of contents to be input. FIG. 5-2~FIG. 5-17 show embodiments of a variety of contents 'A'. FIG. 5-2 shows input of morphemes, which can be letters as shown in FIG. 5-3, characters as shown in FIG. 5-4, words as shown in FIG. 5-5, sentences as shown in FIG. 5-6, components as shown in FIG. 5-7, strokes as shown in FIG. 5-8, components and strokes as shown in FIG. 5-9, or phonetic symbols as shown in FIG. 5-10. The type of morphemes is determined according to the type of language to be input by the user. The input content 'A' can also be numbers as shown in FIG. 5-11, punctuations as shown in FIG. 5-12, symbols as shown in FIG. 5-13, categories as shown in FIG. 5-14, icons as shown in FIGS. 5-15 and 5-16, or programme as shown in FIG. 5-17; moreover, icons can also represent other contents and information (which is not listed) to be input by the user, such as files, file folders, etc.

FIG. 6 illustrates an arrangement in which some angular cells have only one morpheme while other angular cells have multiple morphemes. By placing some morphemes in combination in the same angular cell, the number of angular cells can be reduced, and the angle of each angular cell can be expanded. Placing high-frequency or special-purpose morphemes into an angular cell separately improves input accuracy.

Figures 1, 2, 3, 4, 5, 6, 7, 8:
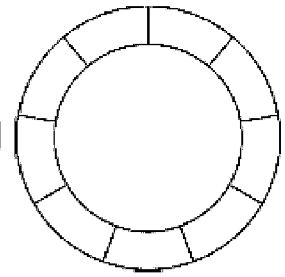
FIG. 8 is a schematic diagram of a circle of English.
Figures 1, 2, 3, 4, 5, 6, 7, 8, 9:
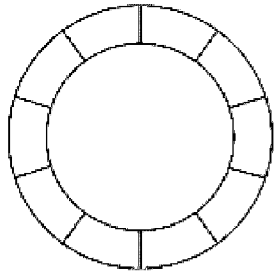
FIG. 9 is a schematic diagram of circle of phonetic symbols in English.
Figures 1, 2, 3, 4, 5, 6, 7, 8, 9, 10:
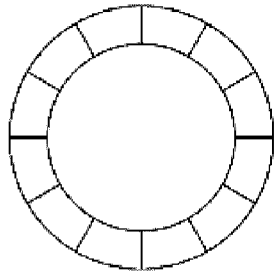
FIG. 10 is a schematic diagram of circle of punctuation symbols.
Figures 1, 2, 3, 4, 5, 6, 7, 8, 9, 10, 11:
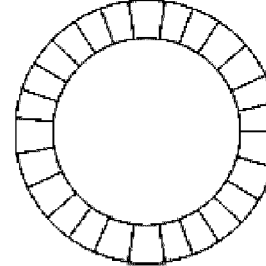
FIG. 11 is a schematic diagram of circle of numbers.
Figures 1, 2, 3, 4, 5, 6, 7, 8, 9, 10, 11, 12:
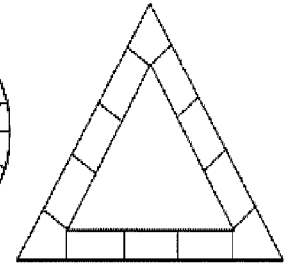
FIG. 12 shows a circle of Chinese character strokes and a circle of Chinese character components.
Figures 1, 2, 3, 4, 5, 6, 7, 8, 9, 10, 11, 12, 13:
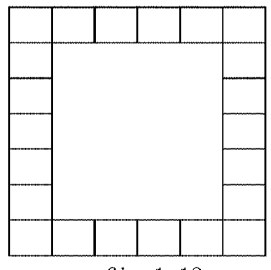
FIG. 13 is a schematic diagram of circle of phonetic symbols, phonetic notations, and Cantonese in Chinese.
Figures 1, 2, 3, 4, 5, 6, 7, 8, 9, 10, 11, 12, 13, 14:
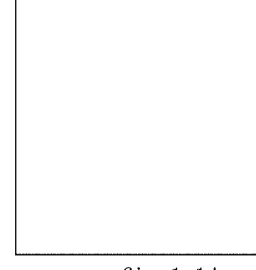
FIG. 14 is a schematic diagram of a circle of Japanese.
Figure 53:
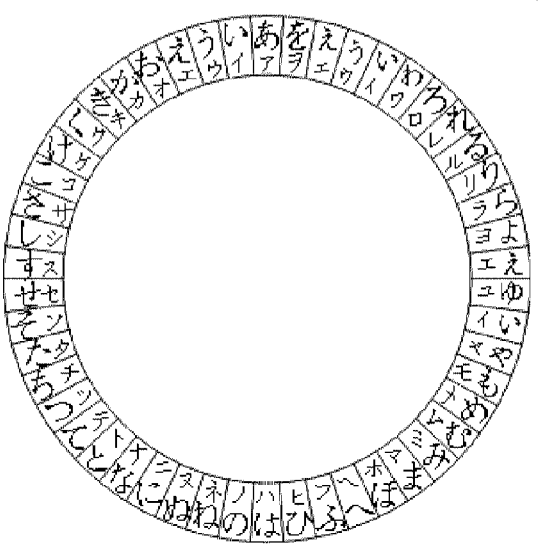
FIG. 53 shows an embodiment of a multi-language circular interface.
Figure 53:
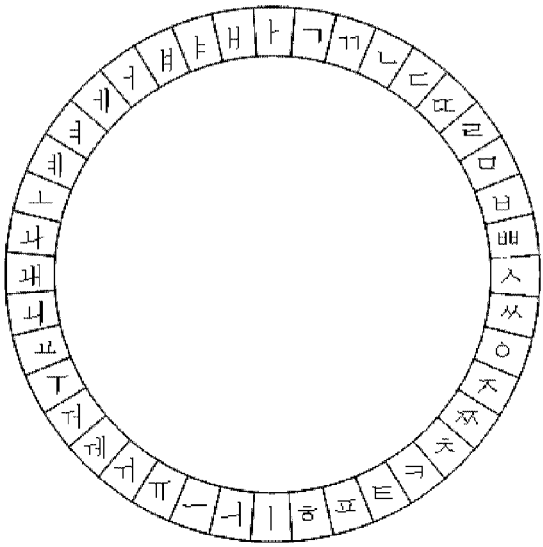
Figures 3, 53:
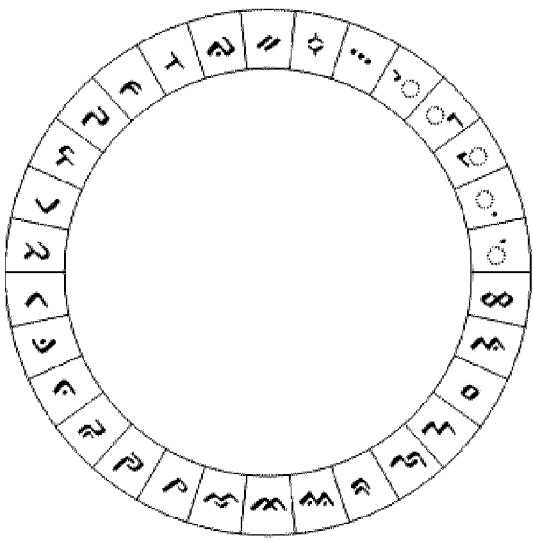
Figures 4, 53:
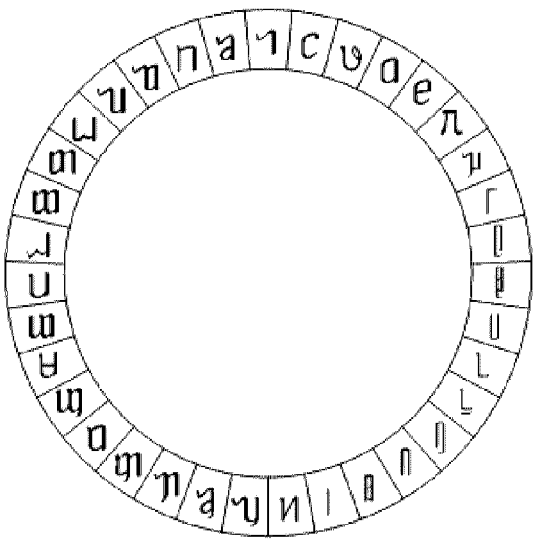
Figures 5, 53:
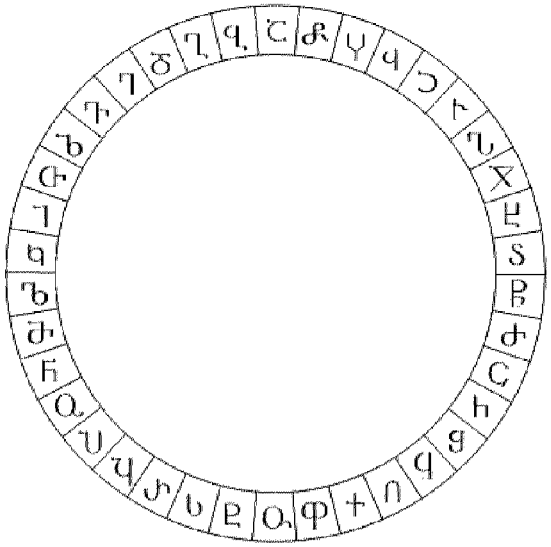
Figures 6, 53:
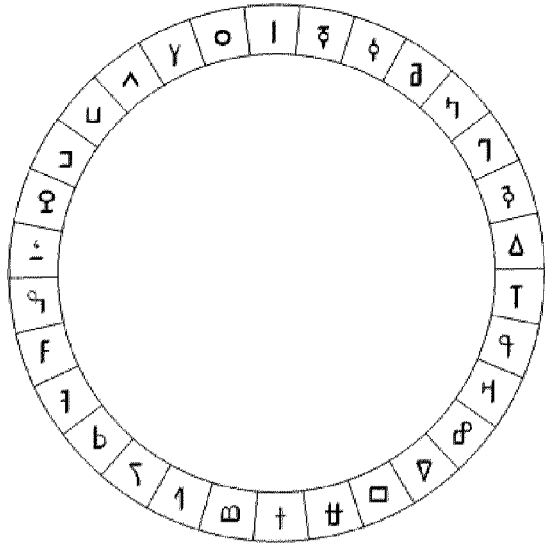
Figures 7, 53:
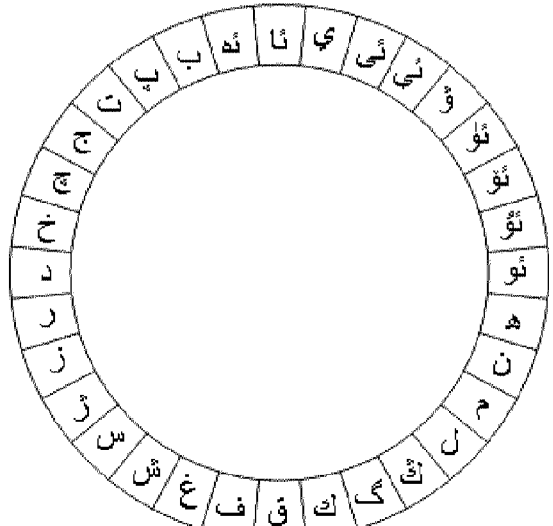
Figures 1, 54:
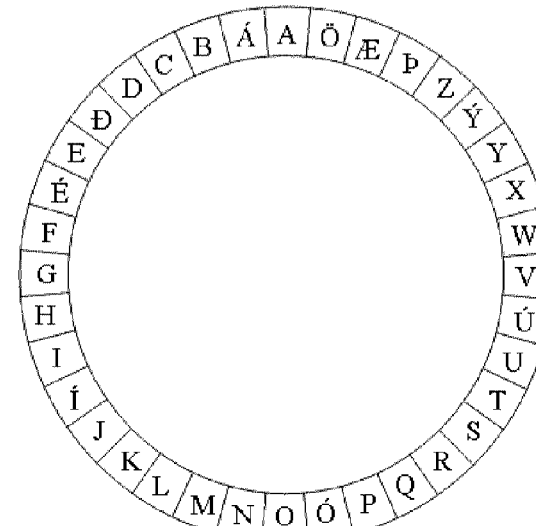
FIG. 54 shows an embodiment of a multi-language circular interface.
Figures 2, 54:
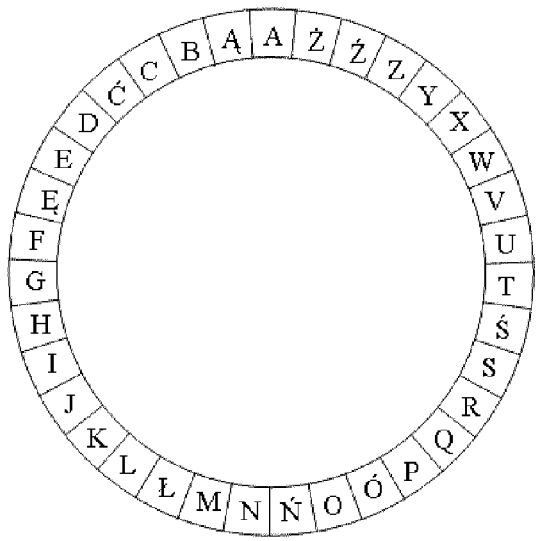
Figures 3, 54:
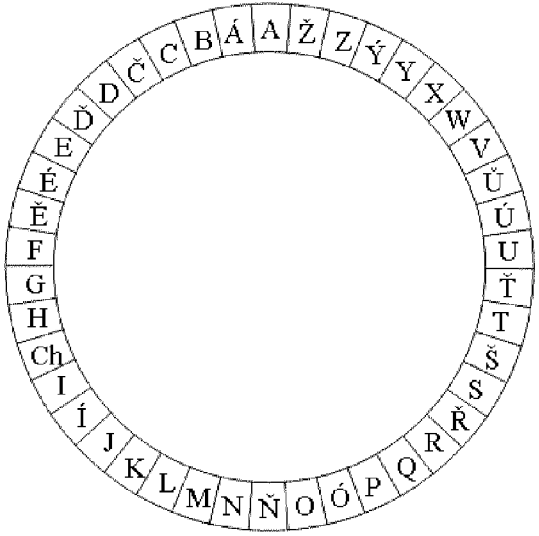
Figures 4, 54:
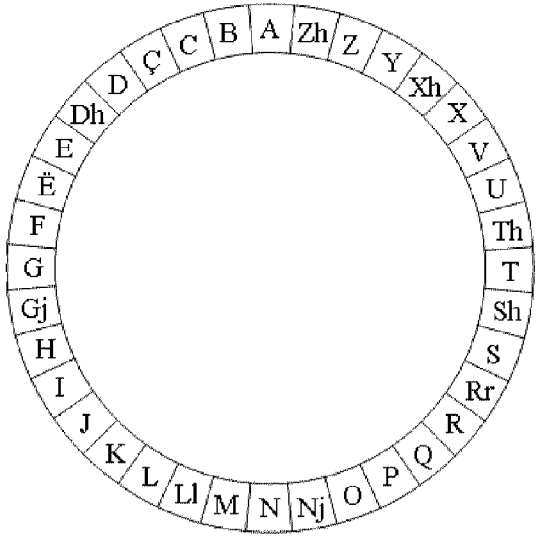
Figures 5, 54:
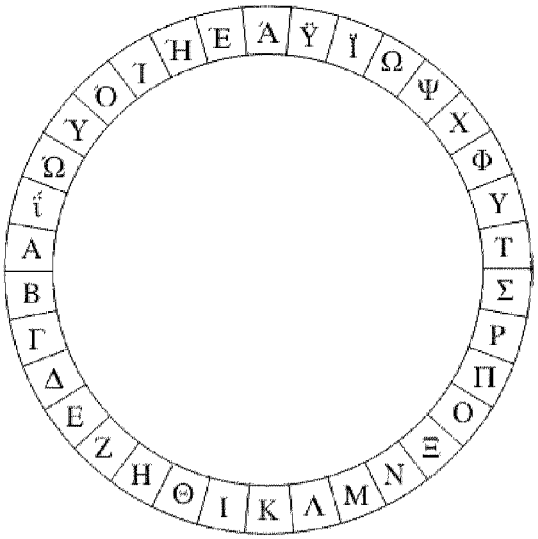
Figures 6, 54:
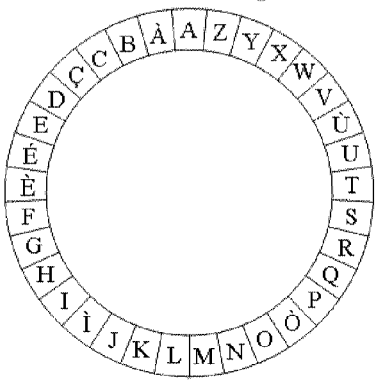
Figures 7, 54:
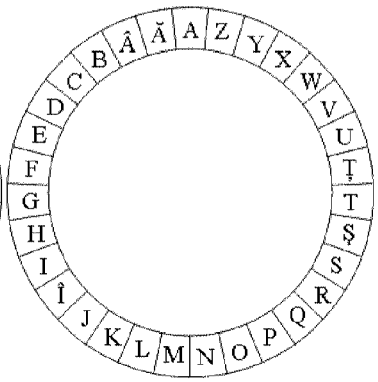
Figures 8, 54:
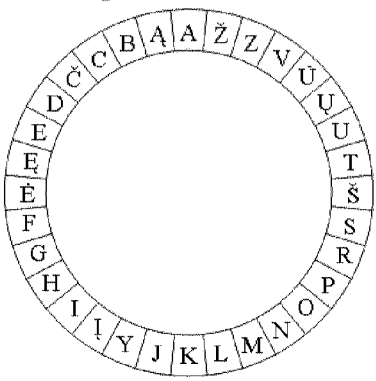
Figures 9, 54:
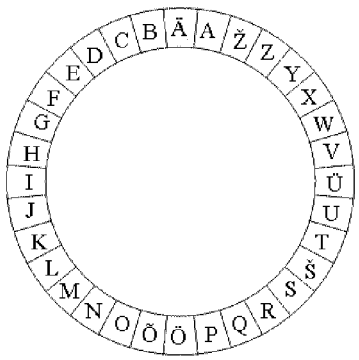
Figures 10, 54:
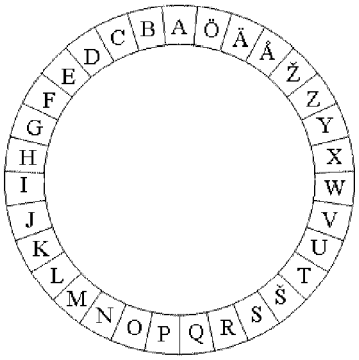
Figures 11, 54:
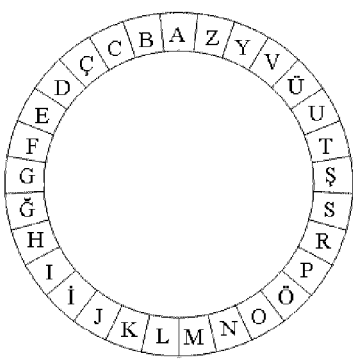
Figures 12, 54:
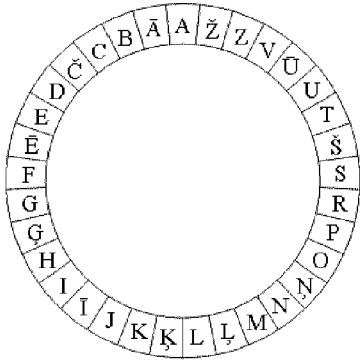
Figures 13, 54:
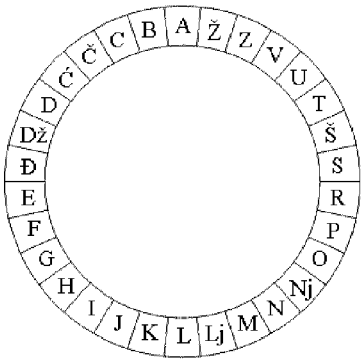
Figures 14, 54:
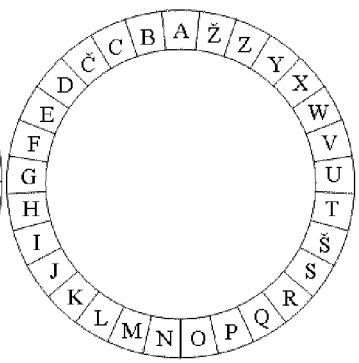
Figures 15, 54:
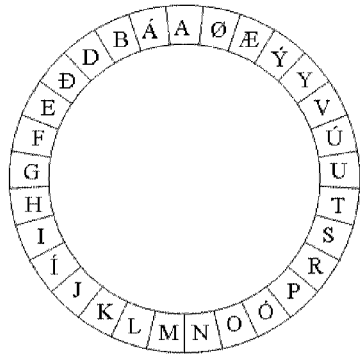
Figures 16, 54:
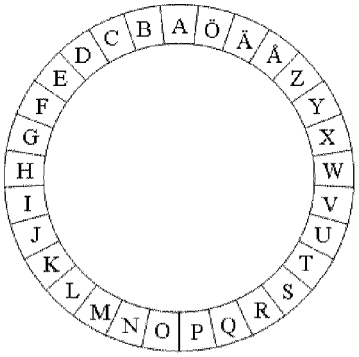
Figures 17, 54:
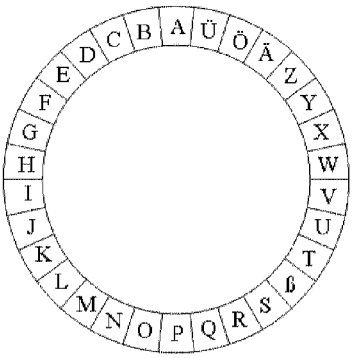
Figures 18, 54:
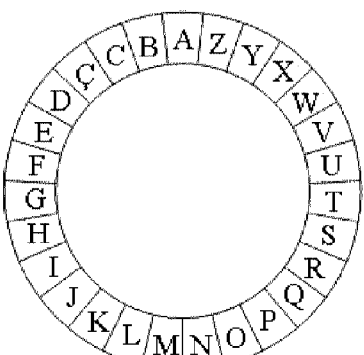
Figures 19, 54:
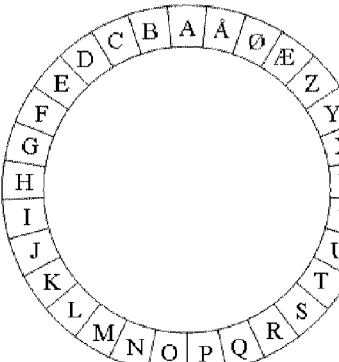
Figures 1, 55:
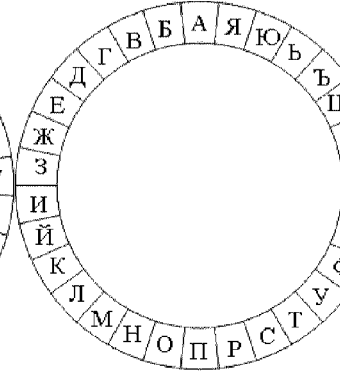
FIG. 55 shows an embodiment of a multi-language circular interface.
Figures 2, 55:
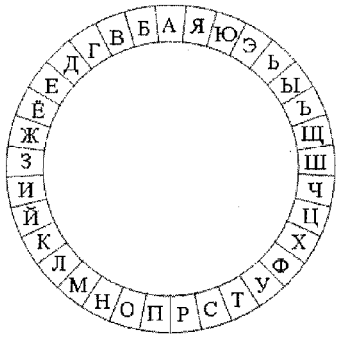
Figures 3, 55:
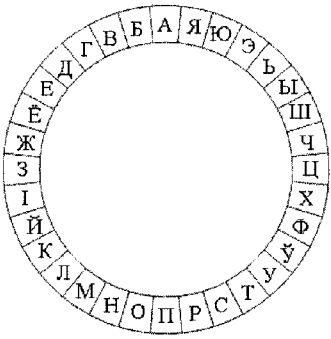
Figures 4, 55:
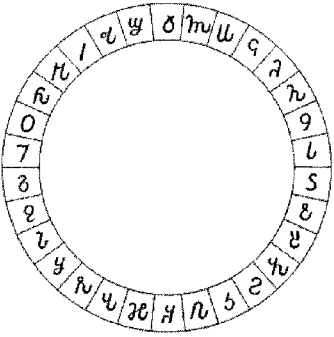
Figures 5, 55:
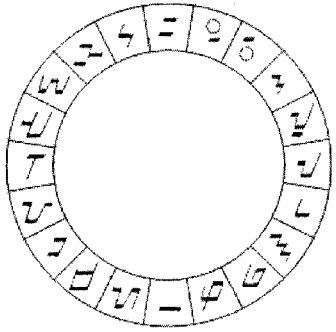
Figures 6, 55:
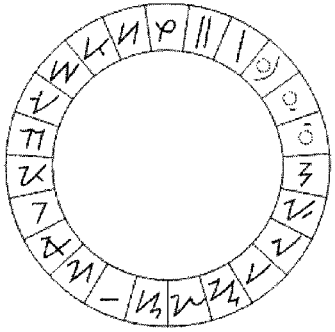
Figures 7, 55:
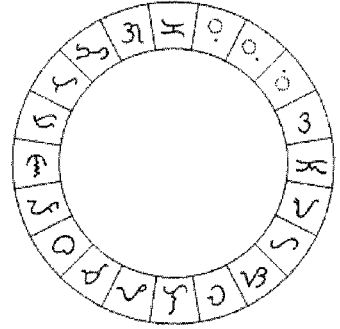
Figures 8, 55:
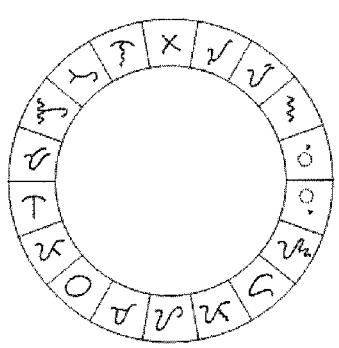
Figures 9, 55:
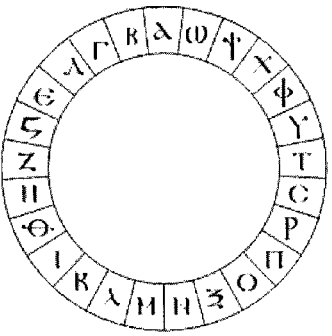
Figures 10, 55:
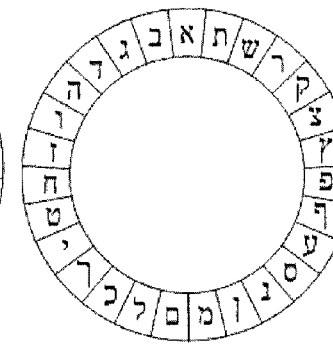

FIG. 8~FIG. 14 shows embodiments of the technical schemes shown in FIG. 5 and FIG. 6. FIG. 8-1 shows an embodiment of the 26 English letters, each of which is placed in an angular cell. FIG. 8-2 shows an arrangement of placing each of high-frequency English letters "A, E, I, O, T" in a separate angular cell, whereas, other letters are placed as follows: letters "B, C, D" are placed together in an angular cell; three letters "F, G, H" are placed together in an angular cell; five letters "J, K, L, M, N" are placed together in an angular cell; four letters "P, Q, R, S" are placed together in an angular cell; five letters "U, V, W, X, Y, Z" are placed together in an angular cell. FIG. 8-3 shows an arrangement of placing each of the five vowel letters "A, E, I, O, U" in a separate angular cell, respectively. FIG. 8-4 shows an arrangement of placing each of the letters "A, E, I, N, O, S, T" in a separate angular cell, respectively. FIG. 8-5 shows an arrangement of placing each of the letters "A, E, I, N, O, T" in a separate angular cell, respectively. FIG. 8-6 shows an arrangement of placing each of the letters "A, E, I, O, S, T" in a separate angular cell, respectively. FIG. 8-7 shows an arrangement of placing English letters in groups in angular cells according to the order of the letters. FIG. 9 is an embodiment of phonetic symbol circle shown in FIG. 5-10; FIG. 9-1 shows an arrangement of placing English phonetic symbols according to their order; FIG. 9-2 shows an arrangement of placing English phonetic symbols by type. FIG. 10 shows an embodiment of the punctuation circle shown in FIG. 5-12. FIG. 11 shows an embodiment of number circle shown in FIG. 5-11. FIG. 12 shows embodiments of a variety of Chinese character circles, wherein, FIG. 12-1 is an embodiment of the component circle shown in FIG. 5-7; FIG. 12-2, FIG. 12-3, and FIG. 12-4 are embodiments of component circle and stroke circle shown in FIG. 5-9; FIG. 12-2, FIG. 12-3 and FIG. 12-4 show an arrangement of placing each of the five basic strokes "—, |, ﾉ, ﹅, →" of Chinese in a separate angular cell, respectively. FIG. 12-5 and FIG. 12-6 show embodiments of the stroke circle shown in FIG. 5-8. FIG. 13-1 and FIG. 13-2 show an arrangement of placing the initial consonants of Chinese phonetic system on an outer circle and placing the last consonants on an inner square; wherein, FIG. 13-1 shows an arrangement in "bpmf" order; FIG. 13-2 shows an arrangement in "bcdf" order; FIG. 13-3 and FIG. 13-4 show embodiments of phonetic notations. FIG. 13-5 shows an embodiment of circle of combined initial consonants in Chinese phonetic system; FIG. 13-6 shows an embodiment of circle of combined initial consonants in phonetic notations. FIG. 13-7 shows an embodiment of circle of combined initial consonants and last consonants in Chinese phonetic system; FIG. 13-8 shows an embodiment of circle of combined initial consonants and last consonants in Cantonese; FIG. 13-9 shows an embodiment of circle of combined initial consonants and last consonants in phonetic notations. FIG. 14 shows an embodiment of circle of Japanese; wherein, FIG. 14-1 shows an arrangement of placing every five Kanji Codes in an angular cell in the order of fifty Kanji Codes; FIG. 14-2 illustrates toggling between Hiragana and Katakana; FIG. 14-3 shows an arrangement of placing every ten Kanji Codes in an angular cell. FIGS. 53-55 show a variety of embodiments of circles in other languages. In the embodiments shown in FIG. 8 to FIG. 14 and FIG. 53 to FIG. 55, in the examplea, 'A' to "An" are arranged in counter-clockwise direction, starting from the top point of the circle; actually, the items can be arranged in counter-clockwise direction, starting from any angular cell on the circle, or arranged in clockwise direction, starting from any angular cell on the circle.

The squares shown in FIGS. 1-16 include larger squares and smaller squares; FIG. 7 shows an embodiment of smaller squares arranged in the central part of the circle as shown in FIG. 1-16; FIG. 43 shows an embodiment of large squares as shown in FIG. 1-16. The 'A'~'An' in FIG. 7-1 and FIG. 43-1 have the same meaning as the 'A'~'An' in FIG. 5-1, and can be in any of the forms shown in FIG. 5. FIG. 7-2 shows an arrangement of words and numbers; in literal input applications such as writing articles, words can be input by single-click, while numbers can be input by double-click; in case of number input applications such as making phone calls, numbers can be input by single-click, while words can be input by double-click. FIG. 7-3 shows an English embodiment of FIG. 7-2. FIG. 7-4 shows an embodiment of placing numbers and punctuation symbols; FIG. 7-5 shows an embodiment of punctuation symbols. FIG. 7-6 shows an embodiment of placing Chinese characters and numbers, wherein, Chinese characters can be input directly by single-click, while numbers can be input by double-click. FIG. 7-7 shows an embodiment of FIG. 7-6. FIG. 7-8 to FIG. 7-14 show embodiments of placing phonetic symbols; wherein, FIG. 7-8 shows arrangement of pure vowels in British English; FIG. 7-9 shows an arrangement of pure vowels in American English; FIG. 7-10 shows an arrangement of pure vowels in Australian English; FIG. 7-11 shows an arrangement of pure vowels in international phonetic alphabets; FIG. 7-12 shows an arrangement of international phonetic alphabets with diphthongs; FIG. 7-13 shows arrangement of linguagram of international phonetic alphabets; FIG. 7-14 shows an arrangement of numbers and phonetic alphabets. FIGS. 7-15 and 7-18 show arrangements by category; FIGS. 7-16 and 7-19 show arrangements of icons; FIG. 7-17 show an arrangement of category and icons. FIG. 43-2 shows an arrangement of punctuation symbols in squares as shown in FIG. 43-1; FIG. 43-3 shows an arrangement of English squares; FIG. 43-4 shows an arrangement of Japanese squares; FIG. 43-5 shows an arrangement of Arabic squares. The user can switch the circular interface to the layout of large-size squares as shown in FIG. 43-1, to input in languages with a lot of punctuation symbols or morphemes in a click manner.

Figures 1, 2, 3, 4, 5, 6, 7, 8, 9, 10, 11, 12, 13, 14, 15:
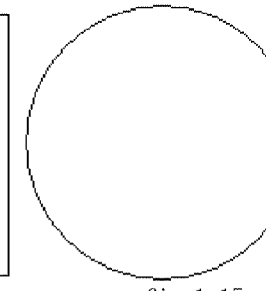
FIG. 15 is a schematic diagram of basic sliding actions.

FIG. 15 lists the basic sliding actions on the MMI provided in the present invention; Table 1 describes the operating method and function definition of each basic sliding action.

TABLE 1

| Fig. No. | Operation | Function |
|---|---|---|
| FIG. 15-1 | Slide inward from the circumference | Input the content in the angular cell at the starting point and the content in the angular cell in the direction of movement |
| FIG. 15-2 | Slide from inside of the circle towards the circumference | Input the content of the angular cell in the direction of the extension line |
| FIG. 15-3 | Pause at the starting point | Indicate the position of the morpheme in the word or sentence |
| FIG. 15-4 | Slide from inside of the circle directly to the circumference | Quick input of high-frequency word or phrase with the morpheme at end point as the initial |
| FIG. 15-5 | Slide outward from the circumference | Input upper case or letter variant, or quick input of word or phrase |
| FIG. 15-6 | Slide outward from the circumference and then slide back | Input letter variant, or quick input of word or phrase |
| FIG. 15-7 | Slide between two adjacent angular cells | Input a combination of the morphemes in the adjacent angular cells |
| FIG. 15-8 | Slide between two adjacent angular cells | Input a combination of the morphemes in the adjacent angular cells |
| FIG. 15-9 | Slide in counter-clockwise direction in an angular cell | Select a morpheme in angular cell, quick input of word or phrase |
| FIG. 15-10 | Slide in clockwise direction in an angular cell | Select a morpheme in angular cell, quick input of word or phrase |
| FIG. 15-11 | Two fingers retract inward from the circumference | Input a combination of the morphemes in the two angular cells at the two starting points |
| FIG. 15-12 | Two fingers extend outward from the circumference | Input a combination of the morphemes in the angular cells in the directions of two extension lines |
| FIG. 15-13 | Two fingers slide in counter-clockwise direction on the circumference | Revolve or toggle the interface |
| FIG. 15-14 | Two fingers slide in clockwise direction on the circumference | Revolve or toggle the interface |
| FIG. 15-15 | Combined sliding | Select a morpheme and input upper case, letter variant, or quick input |

Figures 1, 25:
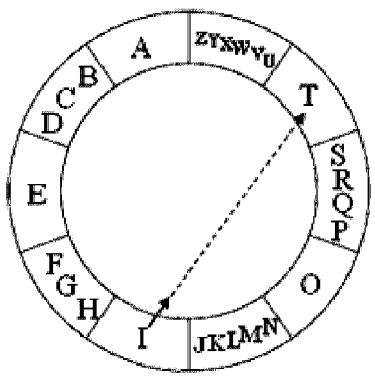
FIG. 25 shows an embodiment of basic sliding actions on an English interface.
Figures 2, 25:
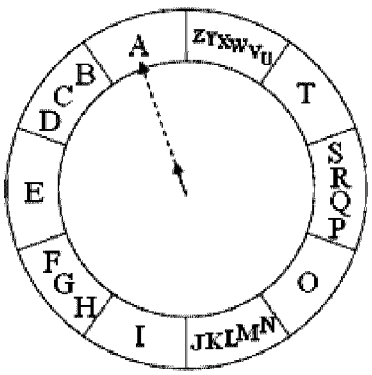
Figures 3, 25:
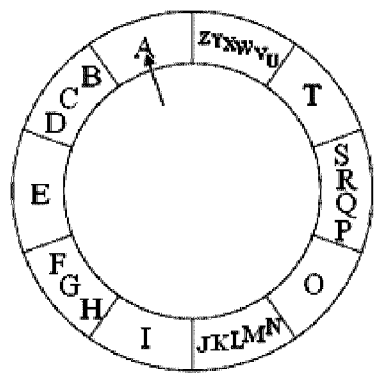
Figures 4, 25:
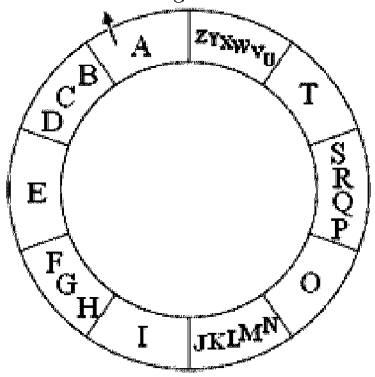
Figures 5, 25:
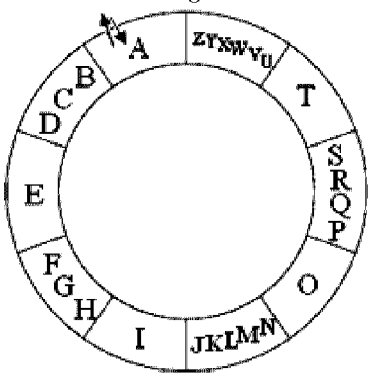
Figures 6, 25:
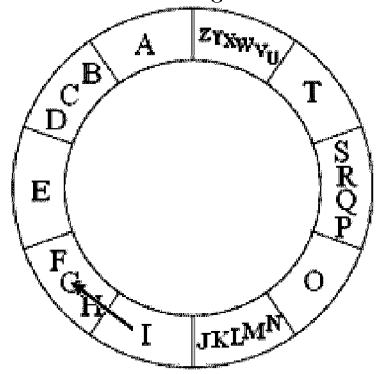
Figures 7, 25:
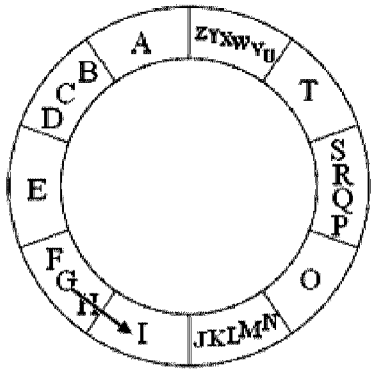
Figures 8, 25:
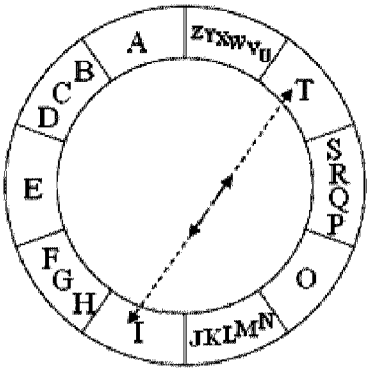
Figures 9, 25:
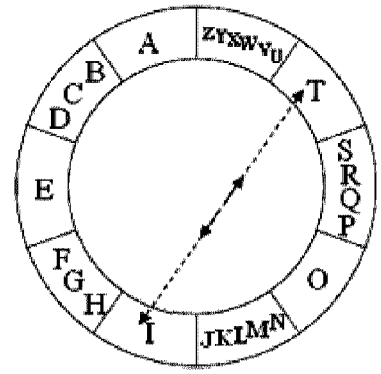
Figures 10, 25:
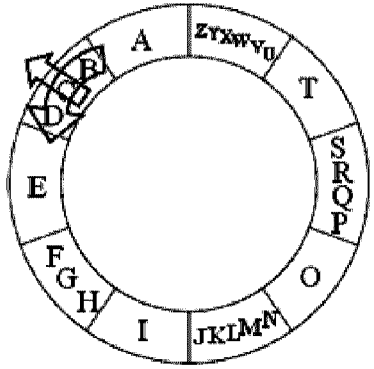

FIG. 25 lists some embodiments of English interface shown in FIG. 15, to further illustrate the basic sliding actions on the MMI provided in the present invention.

FIG. 15-1 illustrates sliding inward from the angular cell on the circumference. This action is to input a combination of the morpheme in the angular cell at the starting point and the morpheme in the angular cell in the direction of the extension line of the sliding direction. FIG. 25-1 shows an embodiment of English interface of FIG. 15-1. In FIG. 25-1, slide inward from the angular cell "I" at the starting point, and the extension line of the sliding direction points to angular cell "T"; when the user slides slightly as shown in FIG. 25-1 and leave the interface, the system will input the word "it", and add a space after the word automatically. Such a sliding action replaces the three keystrokes in the conventional keystroke input method: key 'i', 't', and space bar. This approach is very efficient and intuitive.

FIG. 15-2 illustrates sliding from inside of the circle towards the circumference. This action is to input the morpheme in the angular cell in the direction of the extension line of the sliding direction. FIG. 25-2 shows an embodiment of English interface of FIG. 15-2. In FIG. 25-2, when the user slides from inside of the circle towards the angular cell "A", the system will input 'a' and add a space automatically. Likewise, another commonly used letter 'I' can be input by sliding in the same way, and the system automatically select upper case and add a space after the letter.

Figures 1, 37:
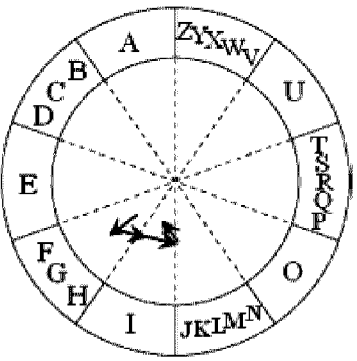
FIG. 37 shows an embodiment of input of an English phrase according to the pause time at the starting point.
Figures 2, 37:
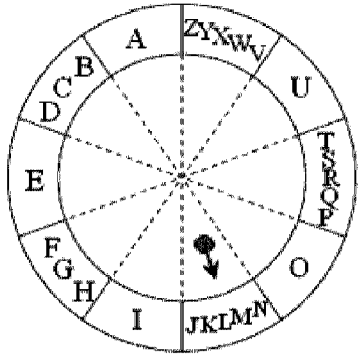
Figures 3, 37:
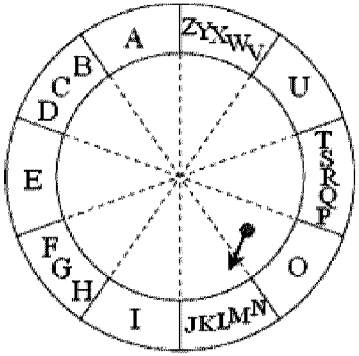
Figures 4, 37:
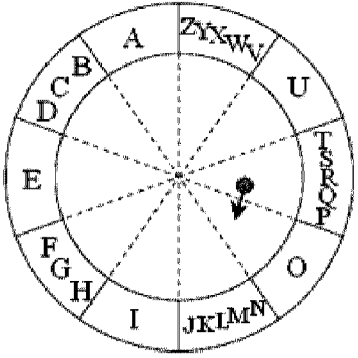

The action shown in FIG. 15-3 is similar to the action shown in FIG. 15-2, with the difference that the user makes a pause action at the starting point; accordingly, the system detects the pause duration and judges the exact position of the morpheme to be input by the user in the morpheme string on the basis of the pause duration. For example, the pause action may indicate input of the second word in a phrase, or the second, third, or $n^{th}$ word in a sentence in English; or the second, third, fourth, or $N^{th}$ character in a Chinese word. If the user doesn't pause at the starting point, it indicates the user expects to input the first character or word in a phrase or sentence; when the system detects the first pause action at the starting point, it will input the second letter, character or word; when the system detects the second pause action at the starting point, it will input the third letter, character or word, and so on; when the system detects the $N^{th}$ pause action at the starting point, it will input the N+1 letter, character or word. In this way, longer language units, such as words, phrases, idioms, or sentences can be input efficiently. FIG. 37 shows an embodiment of English interface of FIG. 15-3. As shown in FIG. 37-1, after the English word "good" is input, the user makes a pause action at the starting point when he/she inputs letter 'l'; thus, the system judges that the user expects to input a word initiated with letter 'l' after the word "good"; since common phrases beginning from "good" include "good luck", "good morning", "good night", "good time", etc., the system directly inputs "good luck" and adds a space or exclamation mark after the phrase. As shown in FIG. 37-3, the user makes a pause action at the starting point when he/she inputs letter 'm'; therefore, the system directly inputs "good morning". As shown in FIG. 37-4, the user makes a pause action at the starting point when he/she inputs letter 'n'; therefore, the system directly inputs "good night". Similarly, the zone where the starting point locates can also be used to play the same role, by configuring the system to use a start zone instead of a starting point, so as to input longer language units. Besides the starting point, the pause at turning points can also be configured to indicate inputting longer language units. As seen from above description: when longer language units such as words, phrases, or sentences are input with the MMI provided in the present invention, it is unnecessary to input the entire word, phrase, or sentence, starting from the second letter in the word or the second word in the phrase or sentence; instead, once one or two morphemes are input, the system can automatically predict and accomplish input; thus, the MMI implements smart phrase input and sentence input. With that method, in Chinese input, starting from the second character, the characters can be input simply by inputting some components or strokes. In English input, starting from the second word of common phrase or sentence, the words can be input simply by inputting one or two letters. FIG. 37 shows an embodiment of smart phrase input in English; the smart input method is also applicable to input of common sentences. By judging the position of morpheme within a word, phrase or sentence and analyzing the frequency of the content input by the user, the content to be input by the user can be predicted intelligently.

Moreover, pause period at turning points can also be used to judge long vowels in the language. For example, the user makes a pause action at the turning point of letter 'u' when he/she inputs the word "future"; accordingly, the system detects the pause action and judges here should be a long vowel. Assisted by judgment of long vowels, sometimes the user doesn't need to input all letters of a word to get the word. Furthermore, the pause is consistent to the user's habit of long vowel pronunciation, which is humanistic.

FIG. 15-4 illustrates sliding from inside of the circle towards the circumference and finally to an end point on the circumference. This action is a shortcut for inputting common words, phrases and sentences initiated with the morpheme in the angular cell where the end point is. Through this action, high-frequency words, phrases, or sentences can be input directly; or the user-defined words, phrases, or sentences can be input. FIG. 25-3 shows an embodiment of English interface of FIG. 15-4. As shown in FIG. 25-3, the user slides from inside of the circle directly to the angular cell "A" on the circumference, indicating direct input of word "and", or a default word initiated with letter 'a' in the system, or a user-defined word.

FIG. 15-5 illustrates sliding outwards from the circumference. This action is to define or input a letter in upper case, a letter variant, or a quick input of a word, as shown in FIG. 15-4. The exact function can be set, depending on the type of the language. FIG. 25-4 shows an embodiment of FIG. 15-4. In English input, the action can be defined as inputting 'A' in upper case; for other languages with a variant of letter 'A', the action can be set to input the variant. For example, in Spanish input, the action can be set to input a variant 'Á'.

FIG. 15-6 illustrates sliding outwards from the circumference and then back to the circumference. This action can be defined for quick input of a word or variant. FIG. 25-5 shows an embodiment of FIG. 15-5. In English input, the action can be defined as a quick input of the high-frequency word "anything". For other languages with a variant of letter 'A', the action can be set to input the variant. For example, in Swedish input, the action shown in FIG. 15-5 can be set to input 'Å', and the action shown in FIG. 15-6 can be set to input 'Ä'.

FIG. 15-7 illustrates sliding from an angular cell on the circumference towards an adjacent angular cell in clockwise direction. This action is to input a combination of the morphemes in the adjacent angular cells at the starting point and end point. The action and input content shown in FIG. 15-8 are the same as those shown in FIG. 15-7, with the difference that the sliding is in counter-clockwise direction. FIG. 25-6 shows an embodiment of English input of FIG. 15-7, which indicates inputting word "if", because other combinations "ig" and "ih" of the two letters are not commonly used words. FIG. 25-7 shows an embodiment of English input of FIG. 15-8, which indicates inputting word "Hi", because other combinations "fi" and "gi" of the two letters are not commonly used words. Through the two types of sliding actions shown in FIG. 15-1, FIG. 15-7, and FIG. 15-8, 98% or more common words composed of one or two letters can be input directly simply by a sliding action, and add a space after the input word automatically. Compared with the conventional keystroke input method, which requires two keystrokes of letter keys and one keystrokes of space bar, this approach can save two keystroke actions and four finger up-and-down actions. The total cumulative frequency of one-letter words and two-letter words accounts for 19%, which is to say, in almost 20% of the cases, the user can input the required content simply by a sliding action. With the quick input method for words as shown in FIG. 15-4, FIG. 15-5, FIG. 15-6, FIG. 15-9, and FIG. 15-10, many commonly used words composed of more than two letters can be input simply by a sliding action, respectively, and therefore the input speed and convenience can be further improved.

Figures 1, 22:
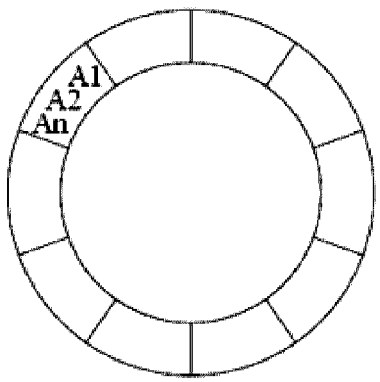
FIG. 22 shows a schematic diagram of selecting from multiple morphemes in an angular cell.
Figures 2, 22:
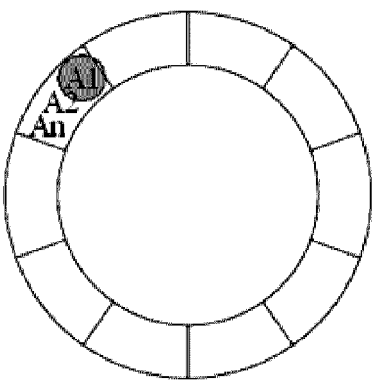
Figures 3, 22:
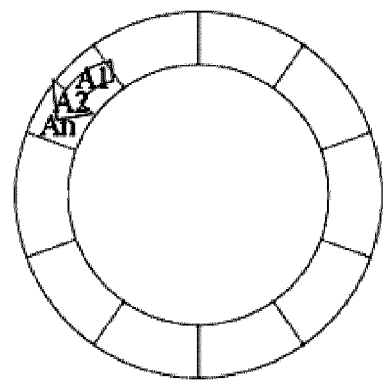
Figures 4, 22:
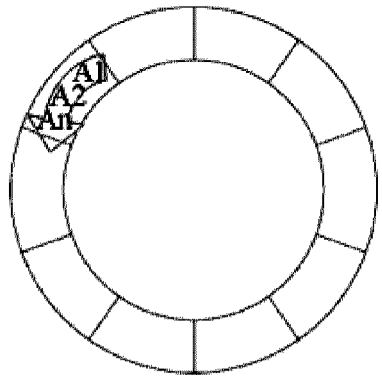
Figures 5, 22:
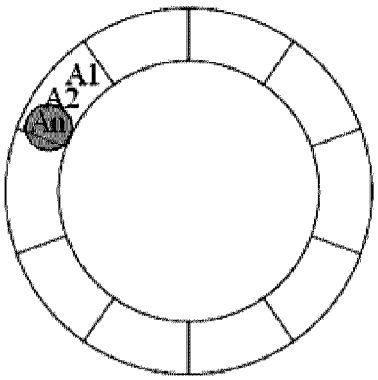
Figures 6, 22:
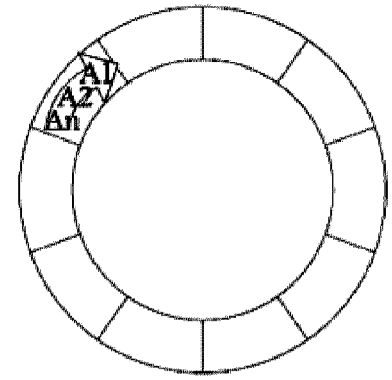

FIG. 15-9 and FIG. 15-10 illustrates sliding from the circumference in counter clockwise or clockwise direction, over a distance not exceeding the range of an angular cell. In an angular cell with multiple morphemes, this action indicates selecting from the morphemes. In an angular cell with only one morpheme, this action indicates quick input of a high-frequency word initiated with the morpheme. FIG. 22 illustrates the operating method in detail. FIG. 22-1 illustrates an angular cell with n morphemes; if the size and accuracy of the MMI are enough, the user can input any of the n morphemes by means of direct click; for example, on a resistive touch interface, the user can input any of the morphemes by clicking with the tip of a pen. As shown in FIG. 22-2, on a capacitive touch interface, if user presses with a finger at a position near a morpheme A1, the system will prompt A1 for input; if the user wants to input morpheme A1, he/she can lift up the finger, and the system will input A1 directly. If the user doesn't want to input A1, as shown in FIG. 22-3, he/she can continue to slide in counter clockwise direction, and the system will prompt A2 for input; if the user wants morpheme A2, he/she can lift up the finger, and thus the system will input A2 directly. If the user doesn't want A2, as shown in FIG. 22-4, he/she can continue to slide in counter clockwise direction, and the system will prompt the next morpheme as the user's finger moves, till the finger moves to An. As shown in FIG. 25-5, on a capacitive touch interface, if user presses with a finger at a position near a morpheme An, the system will prompt An for input; if the user wants the $n^{th}$ morpheme, he/she can lift up the finger, and the system will input An directly. However, if the user doesn't want An, he/she can slide in clockwise direction to select another morpheme, the procedures of which is reversed to those shown in FIG. 22-3 and FIG. 22-4.

Through the actions shown in FIG. 15-9 and FIG. 15-10, if the angular cell involved in the action has only one morpheme, a shortcut of a word can be defined on the basis of the morpheme, or a variant of the morpheme can be defined. For example, in FIG. 8-3, the actions shown in FIG. 15-9 and FIG. 15-10 are applied to angular cell with "A". In English input, a shortcut of a word can be defined: sliding in angular cell with "A" in counter clockwise direction indicates inputting high-frequency word "an", while sliding in clockwise direction indicates inputting high-frequency word "any". In Swedish input, sliding in angular cell with "A" in counter clockwise direction can be defined to input 'Å', while sliding in clockwise direction can be defined to input 'Ä'.

FIG. 15-11~FIG. 15-14 illustrate some embodiments of operation with multiple fingers on the MMI provided in the present invention. FIG. 15-11 illustrates retraction of two fingers inwards from the circumference, indicating input of a combination of the morphemes in the two angular cells at the two starting points. FIG. 15-12 illustrates extension of two fingers outwards from the circumference, indicating input of a combination of the morphemes in the two angular cells in the direction of the two extension lines. FIG. 25-8 shows an embodiment of English input of FIG. 15-11, which indicates inputting word "it"; FIG. 25-9 shows an embodiment of English input of FIG. 15-12, which indicates inputting word "it". FIG. 15-13 illustrates sliding with two fingers from the circumference in counter clockwise direction along the circumference; FIG. 15-14 illustrates sliding with two fingers from the circumference in clockwise direction along the circumference. The actions shown in FIG. 15-13 and FIG. 15-14 indicate revolving the MMI or switching the MMI to a different language system.

Two or more of the basic sliding actions shown in FIG. 15-1 to FIG. 15-14 can be performed consecutively, to accomplish further smart input. FIG. 15-15 illustrates a combination of the sliding actions shown in FIG. 15-9 and FIG. 15-5, indicating input of an upper case or a variant of a morpheme in a multi-morpheme angular cell, or a quick input of a word. FIG. 25-10 shows an embodiment of FIG. 15-15, which indicates inputting a 'C' in upper case in English input or a variant 'Ç' in Portuguese input.

Figures 1, 2, 3, 4, 5, 6, 7, 8, 9, 10, 11, 12, 13, 14, 15, 16:
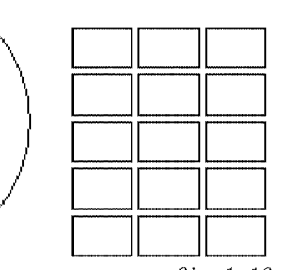
FIG. 16 is a schematic diagram of real-time prediction of user input.
Figures 1, 2:
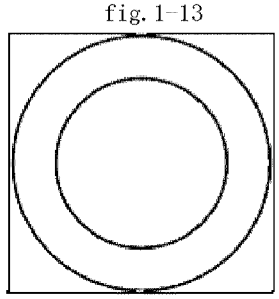
Figure 2:
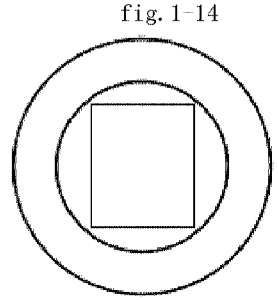
Figures 2, 3:
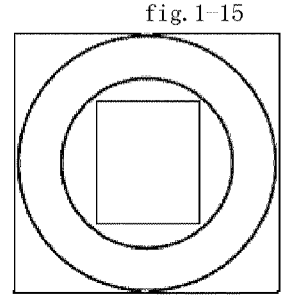
Figures 2, 3, 4:
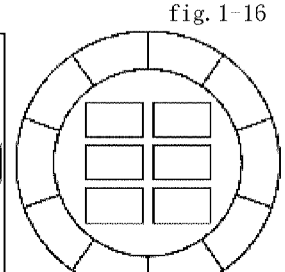
Figures 2, 3, 4, 5:
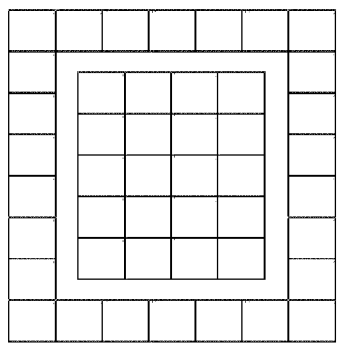
Figures 2, 3, 4, 5, 6:
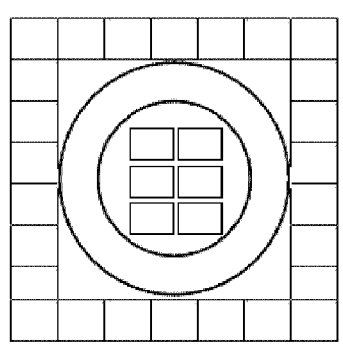
Figures 2, 3, 4, 5, 6, 7:
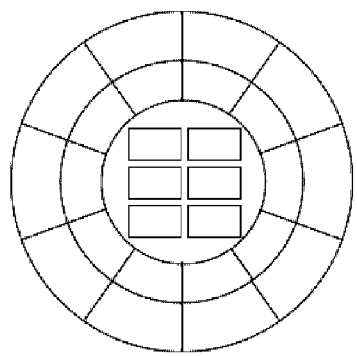
Figures 2, 3, 4, 5, 6, 7, 8:
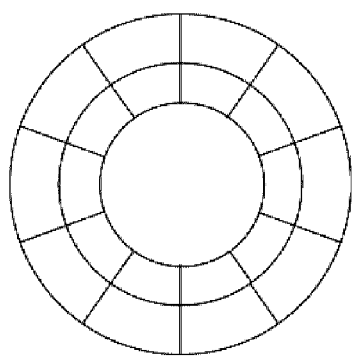
Figures 2, 3, 4, 5, 6, 7, 8, 9:
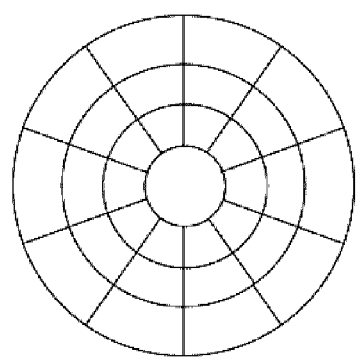
Figure 3:
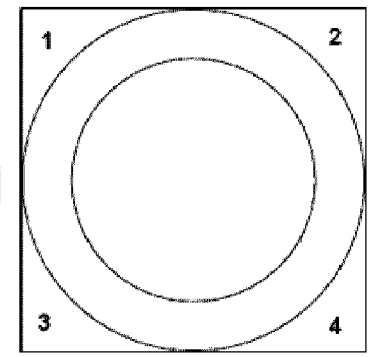
Figures 1, 4:
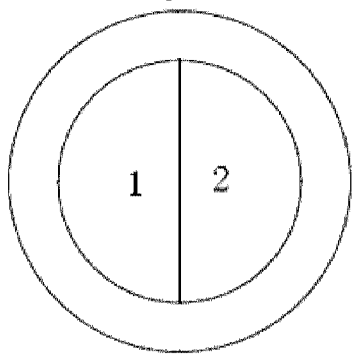
Figures 2, 4:
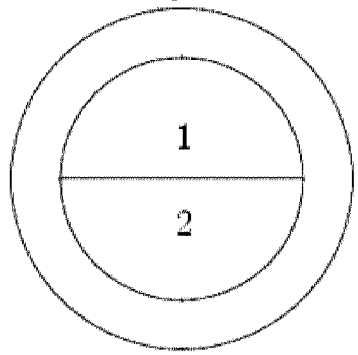
Figures 3, 4:
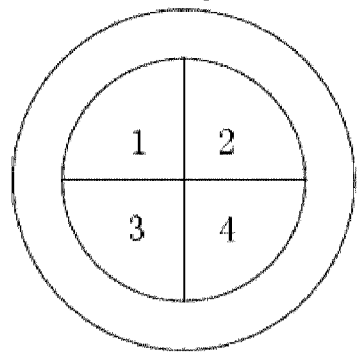
Figure 4:
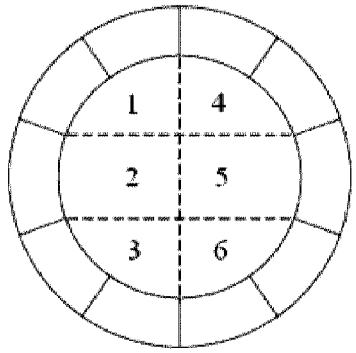
Figures 4, 5:
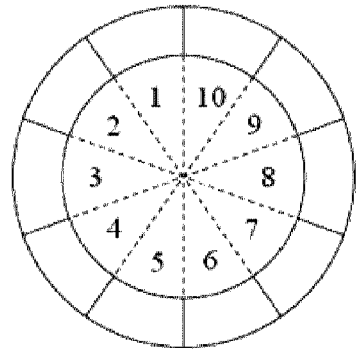
Figures 4, 5, 6:
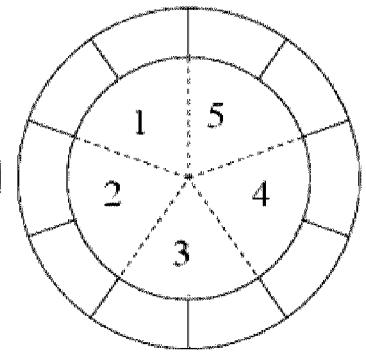
Figures 1, 5:
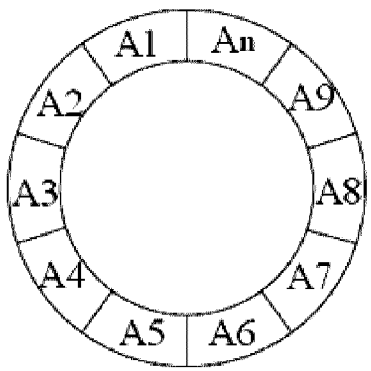
Figures 2, 5:
Figures 3, 5:
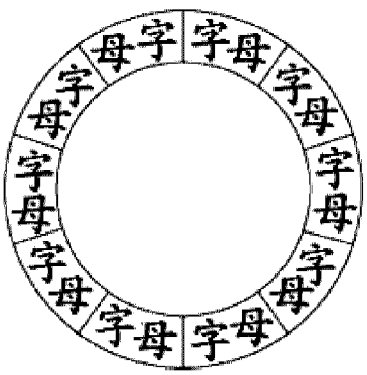
Figures 4, 5:
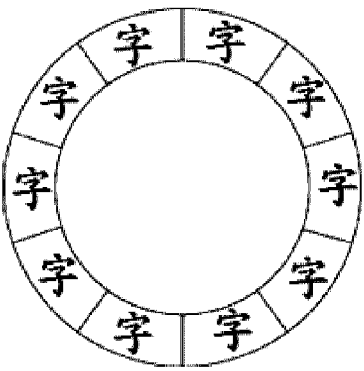
Figure 5:
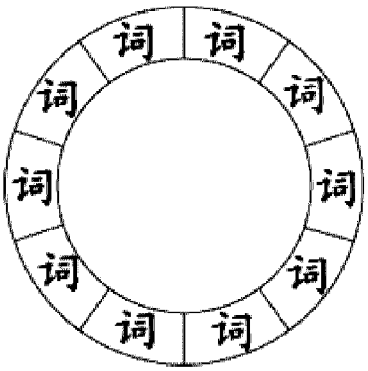
Figures 5, 6:
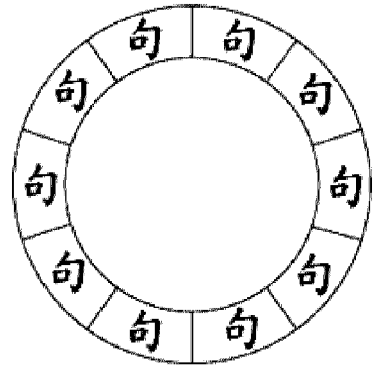
Figures 5, 6, 7:
Figures 5, 6, 7, 8:
Figures 5, 6, 7, 8, 9:
Figures 5, 6, 7, 8, 9, 10:
Figures 5, 6, 7, 8, 9, 10, 11:
Figures 5, 6, 7, 8, 9, 10, 11, 12:
Figure 10:
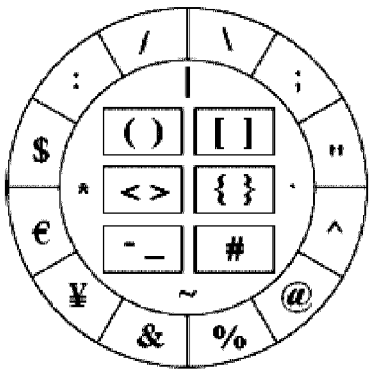
Figures 1, 11:
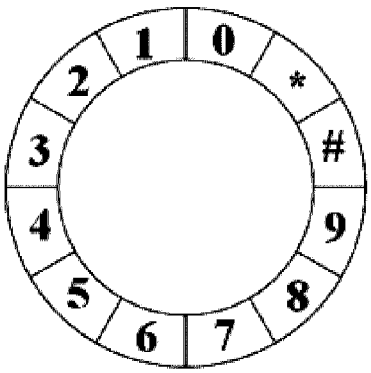
Figures 2, 11:
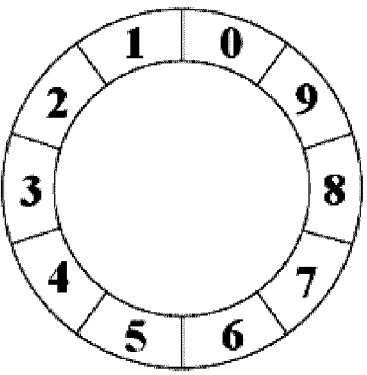
Figures 1, 12:
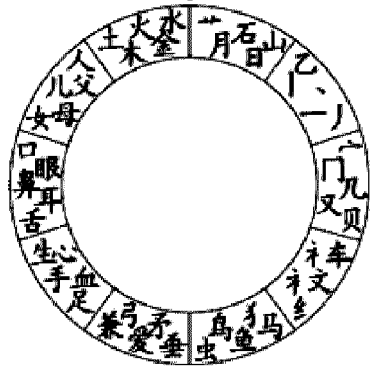
Figures 2, 12:
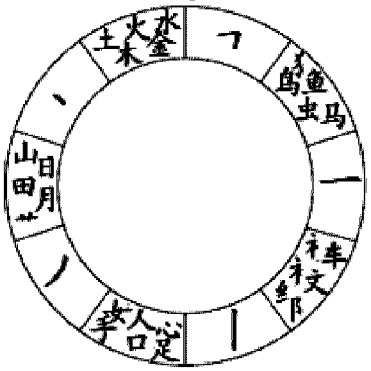
Figures 3, 12:
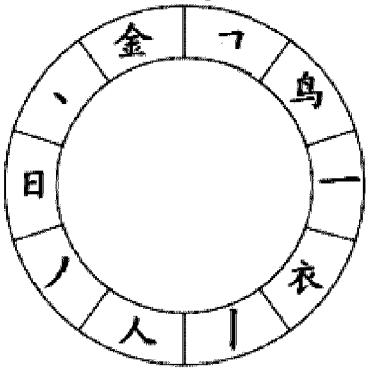
Figures 4, 12:
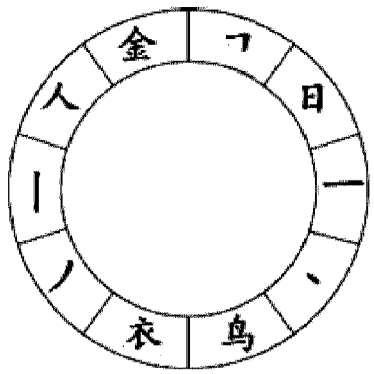
Figures 5, 12:
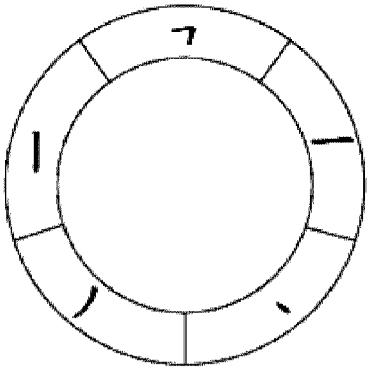
Figures 6, 12:
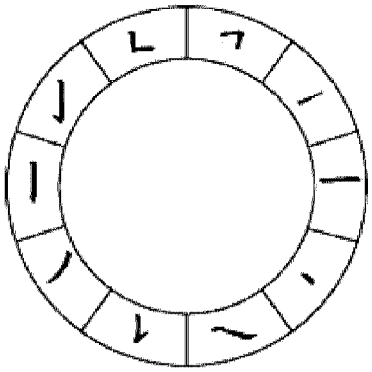
Figures 1, 13:
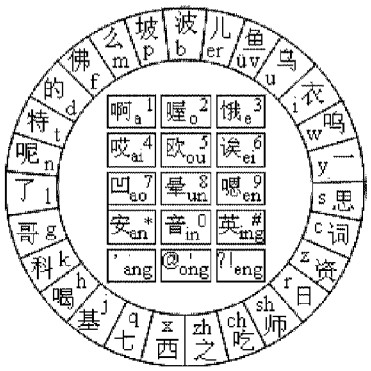
Figures 2, 13:
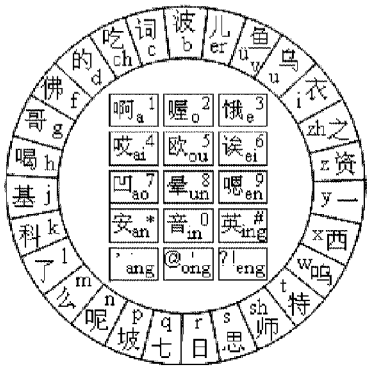
Figures 3, 13:
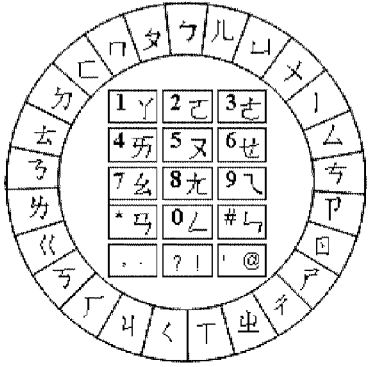
Figures 4, 13:
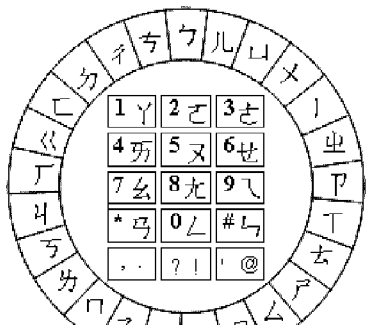
Figures 5, 13:
Figures 6, 13:
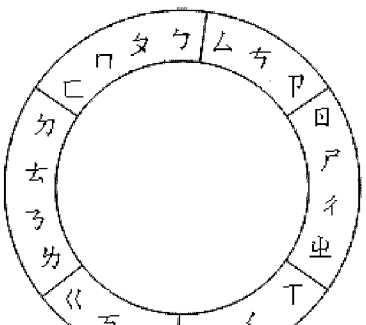
Figures 7, 13:
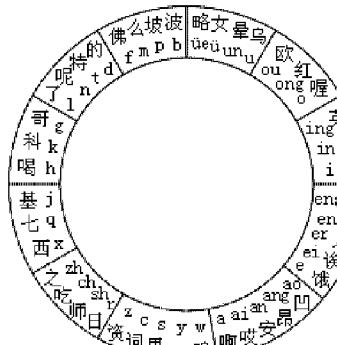
Figures 8, 13:
Figures 9, 13:
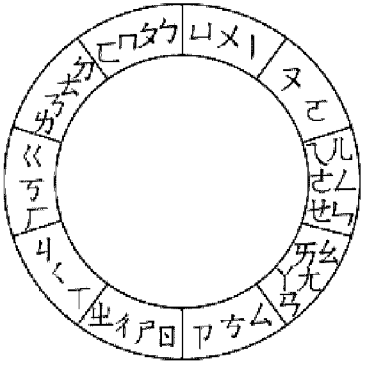
Figures 1, 14:
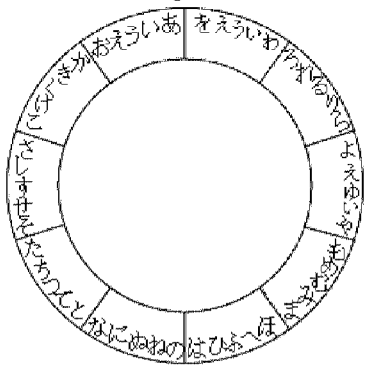
Figures 2, 14:
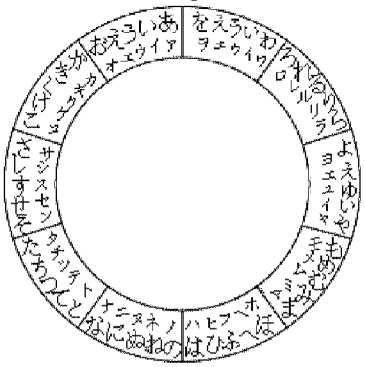
Figures 3, 14:
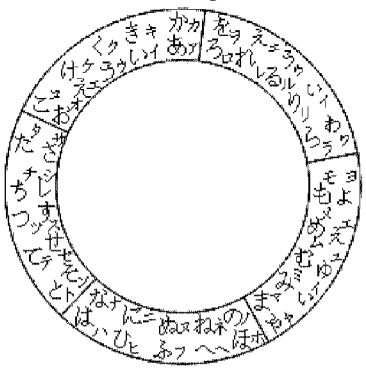
Figures 1, 15:
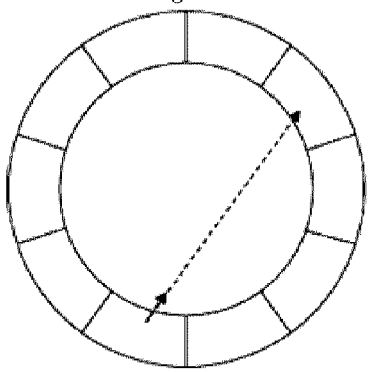
Figures 2, 15:
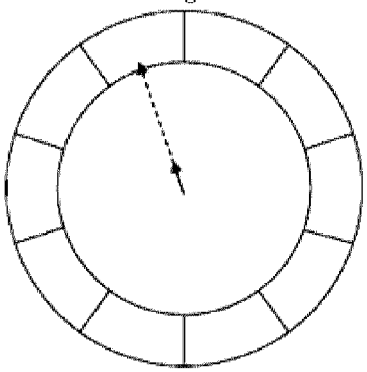
Figures 3, 15:
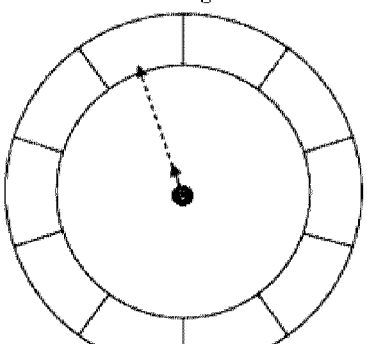
Figures 4, 15:
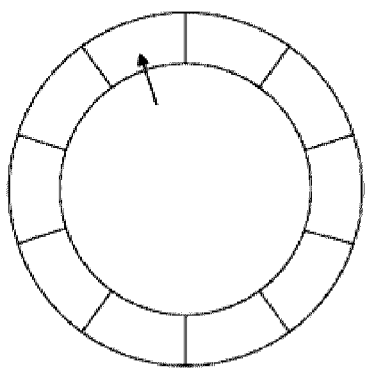
Figures 5, 15:
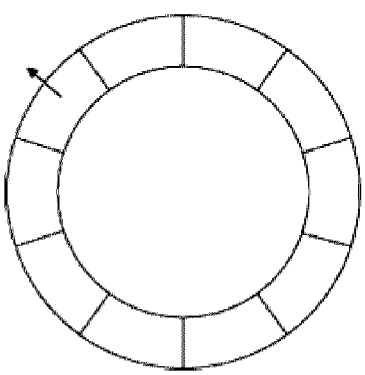
Figures 6, 15:
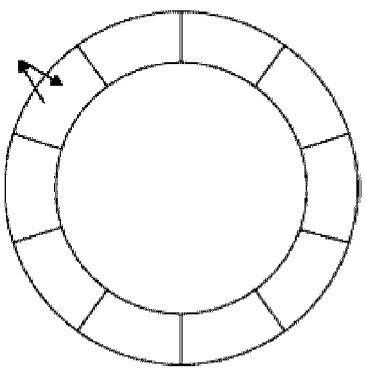
Figures 7, 15:
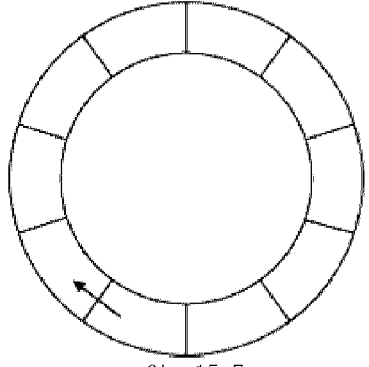
Figures 8, 15:
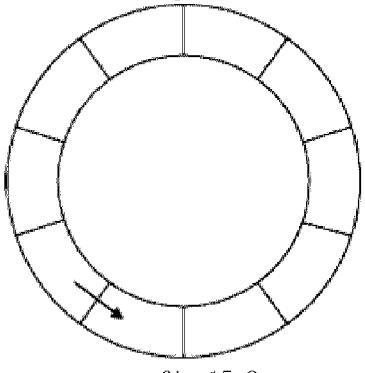
Figures 9, 15:
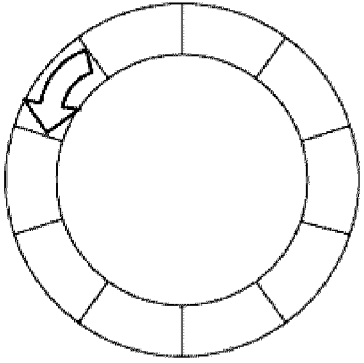
Figures 10, 15:
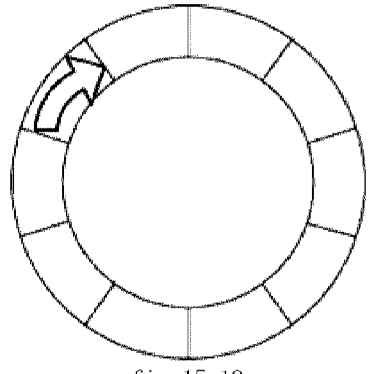
Figures 11, 15:
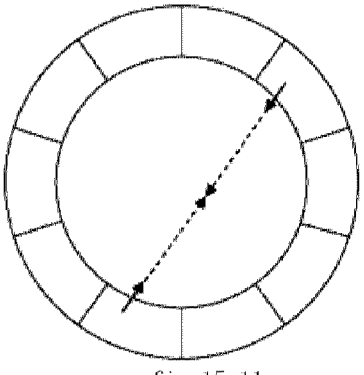
Figures 12, 15:
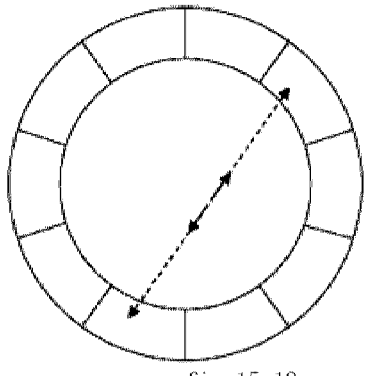
Figures 13, 15:
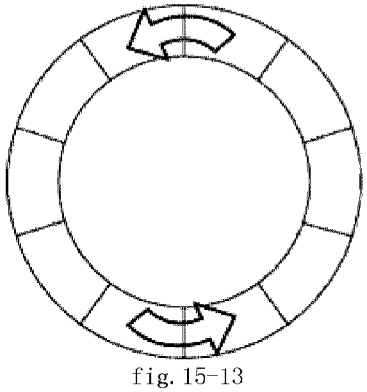
Figures 14, 15:
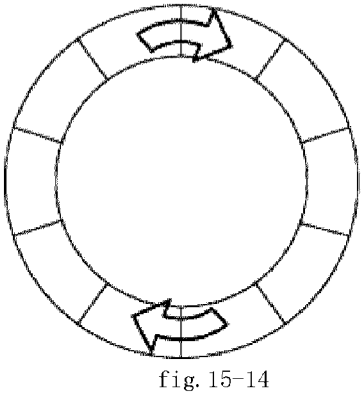
Figure 15:
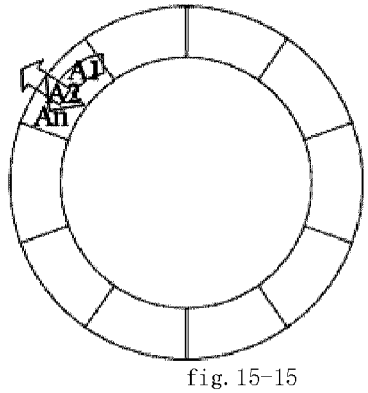
Figures 1, 16:
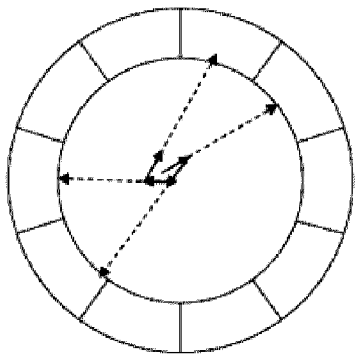
Figures 2, 16:
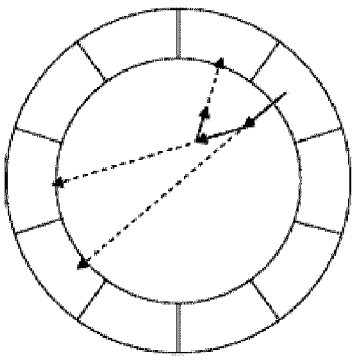
Figures 3, 16:
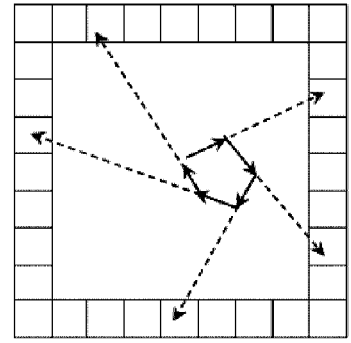

FIG. 16-1 illustrates multiple continuous running of the basic sliding actions shown in FIG. 15-2, to input all letters of a word by means of sliding actions, starting from the first letter of the word; or, if the word to be input by the user is prompted in real time prediction of the system, the user can stop sliding and leave the interface, and thus the system will directly input the word and add a space or punctuation symbol after the word automatically. In this way, the user can accomplish the input by touching the interface, sliding continuously on the interface, and then leaving the interface, instead of leaving the interface for several times. This approach can reduce up-and-down cycles of fingers or pen. Furthermore, since each word is suffixed with a space automatically, the keystrokes of high-frequency space bar are greatly reduced. In English input, the space bar is a key that is stroked at a much higher frequency than any other key. In addition, the MMI provided in the present invention detects the angular cell in the direction of the extension line of the user's movement direction in real time, so that the user can input the target morpheme before he/she touch the morpheme actually; whenever the user moves a very short distance, the system can detect the change of distance and direction in real time, and thereby predicts and intelligently determines the morpheme to be input by the user in real time. As shown in FIG. 16, the user can accomplish input very quickly, conveniently and intuitively, simply by sliding a very short distance continuously. FIG. 16-2 illustrates a combination of the actions shown in FIG. 15-1 and FIG. 15-2. FIG. 16-3 is a schematic diagram of operation on a square interface. By arranging the required input content on a hollow circle, the MMI provided in the present invention has two benefits: first, the user's sliding trace is within a circle and doesn't pass any morpheme; therefore, the sliding operation brings no interference and therefore doesn't require any complex error correction algorithm. Second, since the input content is arranged on the circumference, the angular cell pointed by the user is always unique, which is more efficient for prediction and judgment. Therefore, the technical scheme of the present invention is superior to any other technical scheme in which the sliding trace passes morphemes and the morphemes at the turning points have to be calculated or any other technical scheme in which the angular cell pointed by the extension line is unique.

FIG. 27 shows embodiments of English interfaces of FIG. 16, wherein, FIG. 27-1 and FIG. 27-2 shown embodiments of the interface of FIG. 16-1 and FIG. 27-3 and FIG. 27-4 show embodiments of the interface of FIG. 16-2. The position of the starting point (on the circumference or within the circumference) can also be used to judge the length of the word to be input. For example, the system can be configured as: input a word composed of 3 or fewer letters if the starting point is on the circumference, and input a word composed of more than 3 letters if the starting point is within the circumference; or, input a word composed of 4 or fewer letters if the starting point is on the circumference, and input a word composed of more than 4 letters if the starting point is within the circle. Alternatively, as shown in FIG. 4, input a word composed of 3 or fewer letters if the starting point of sliding is within zone 1; input a word composed of 3-4 letters if the starting point of sliding is within zone 2; input a word composed of 5-6 letters if the starting point of sliding is within zone 3; input a word composed of more than 6 letters if the starting point of sliding is within zone 4. Assisted by judgment of word length, the system prediction can be more accurate.

FIG. 27 illustrates input of English word "they". Since the first letter of word "they" is 't', which is placed in a separate angular cell, the user can input 't' directly by sliding towards the angular cell "T" or pressing the angular cell with "T". According to the user's demand and habit, the system can be set to input 't' directly and feed back to the user with different display when the user points to the angular cell "T". Alternatively, the system can display the angular cell "T" in a different manner first, to indicate that the user is pointing to "T"; when the user moves on towards this direction, the system will confirm input of 't', and provide feedback to the user with different display. With the first method, the system directly inputs the content, and therefore the input speed is quicker; with the second method, the system prompts the user with different display first, and therefore the input speed is lower, but this method avoid wrong input. The user can select either method as required. Or, the user can directly slide from the angular cell where the initial morpheme exists towards the angular cell where the second morpheme exists. As shown in FIG. 27-3 and FIG. 27-4, the user can directly slide from the angular cell with "T" of the initial morpheme towards the angular cell with "FGH" where the second morpheme exists. The input speed with this method is quicker.

Once the first morpheme is input, the user can directly slide (line) towards the angular cell for each subsequent morpheme continuously, or press in the angular cell for each subsequent morpheme continuously to obtain the combined input of morphemes. Once the last morpheme is input, the user can lift the finger(s) or input pen, as shown in step A00 of FIG. 52. FIG. 27 illustrates input of English word "they" in step A00. From the second morpheme to the last morpheme of "they" ("hey"), the user can slide continuously towards the angular cell "FGH" where letter 'h' exists, towards angular cell "e" where letter 'e' exists, and towards angular cell "UVWXYZ" where letter 'y' exists. In FIG. 27-1, the continuous line represents the actual sliding trace, while the dotted line represents the direction pointed by the user. In FIG. 27-2, only the user's actual input trace is displayed. To help the reader to see clearly, the trace of continuous line is illustrated with a longer line; however, virtually, the system can judge the user's direction of movement and input the correct content once the user slide over a very short distance or apply very slight force. As shown in FIG. 27, when the user inputs "they", he/she virtually selects four angular cells consecutively: "T", "FGH", "E" and "UVWXYZ". There are altogether 18 combinations of morphemes in the four angular cells include: "they", "theu", "they", "thew", "thex", "thez", "tgeu", "tgev", "tgew", "tgex", "tgey", "tgez", "tfeu", "tfev", "tfew", "tfex", "tfey", and "tfez", wherein, only "they" and "thew" are meaningful words. This process is shown in step A01 in the flow chart in FIG. 52. Since there are only two possible combinations and the word "they" is a high-frequency word while "thew" is a low-frequency word, the system will directly input the high-frequency word "they" and add a space automatically, and display the word "thew" in a different manner (different color, different font, different background, etc.) under word "they". FIG. 27-5 shows the system display after the user's directly input by sliding. This process is shown in step A03 in the flow chart in FIG. 52. If the user wants to input "they", he/she can directly continue to input the next word; once the user begins to touch the MMI and input the next word, the word "thew" displayed in a different manner will disappear automatically. This process is shown in step A51 in the flow chart in FIG. 52. If the user wants the input low-frequency word "thew" instead of the high-frequency word "they", he/she can press the space bar or other specific key to confirm, just as illustrated in FIG. 28-2; in that case, the system will directly input the word "thew" and add a space after the word automatically. This process is shown in step A52 in the flow chart in FIG. 52. FIG. 27-6 illustrates: after the user input morphemes from several angular cells continuously, if only a few of words can be determined from all combinations of the morpheme in the angular cells, the system will directly display these possible combinations on the circular MMI, regardless of whether the user continues to input the next morpheme or not. In that case, the user can revolve the direction directly on the interface to select the expected word, instead of selecting with space bar or by sliding; the approach can reduce movement of the user's eyes and fingers, and improve input speed. Alternatively, the user can select to disable this function. As shown in FIG. 27-2 or 27-4, after the user select angular cell "T", "FGH", "E" and "UVWXYZ", there are only two possible combinations "they" and "thew" if the user decides to leave the interface and terminate the input; there are only five possible combinations "theurgist", "theurgy", "thewless", "thews", and "thewy" if the user decides to continue the input. That is to say, after the user inputs the four angular cells "T", "FGH", "E", and "UVWXYZ", there are only 7 possible combinations altogether, regardless of whether the user continues the input or not. In addition, "theurgist" is a variant of "theurgy", and "thewless", "thews", and "thewy" are the variants of "thew". Therefore, as shown in FIG. 27-6, the system directly prompts "theurgy", "they", and "thew" on the circle for the user to select directly. If the user wants to input "they", he/she can lift the fingers or input pen from the interface, and finish the input directly. If the user wants to input "theurgy", as shown in FIG. 27-7, he/she can revolve towards the angular cell where "theurgy" exists. If the user wants to input "thew", as shown in FIG. 27-8, he can revolve towards the angular cell where "thew" exists. If the user wants to input a variant of "theurgy" or "thew", he/she can continue to change the direction as shown in FIG. 27-7 or FIG. 27-8 towards the corresponding angular cell.

FIG. 28-1 illustrates the system display when only two combinations are possible, wherein, the high-frequency combination is directly input, while the low-frequency combination is displayed in a different manner under the high-frequency combination. FIG. 28-2 illustrates the case that the user wants to input the low-frequency combination, wherein, when the user presses in the space bar zone, the system will input the low-frequency combination.

Figure 52:
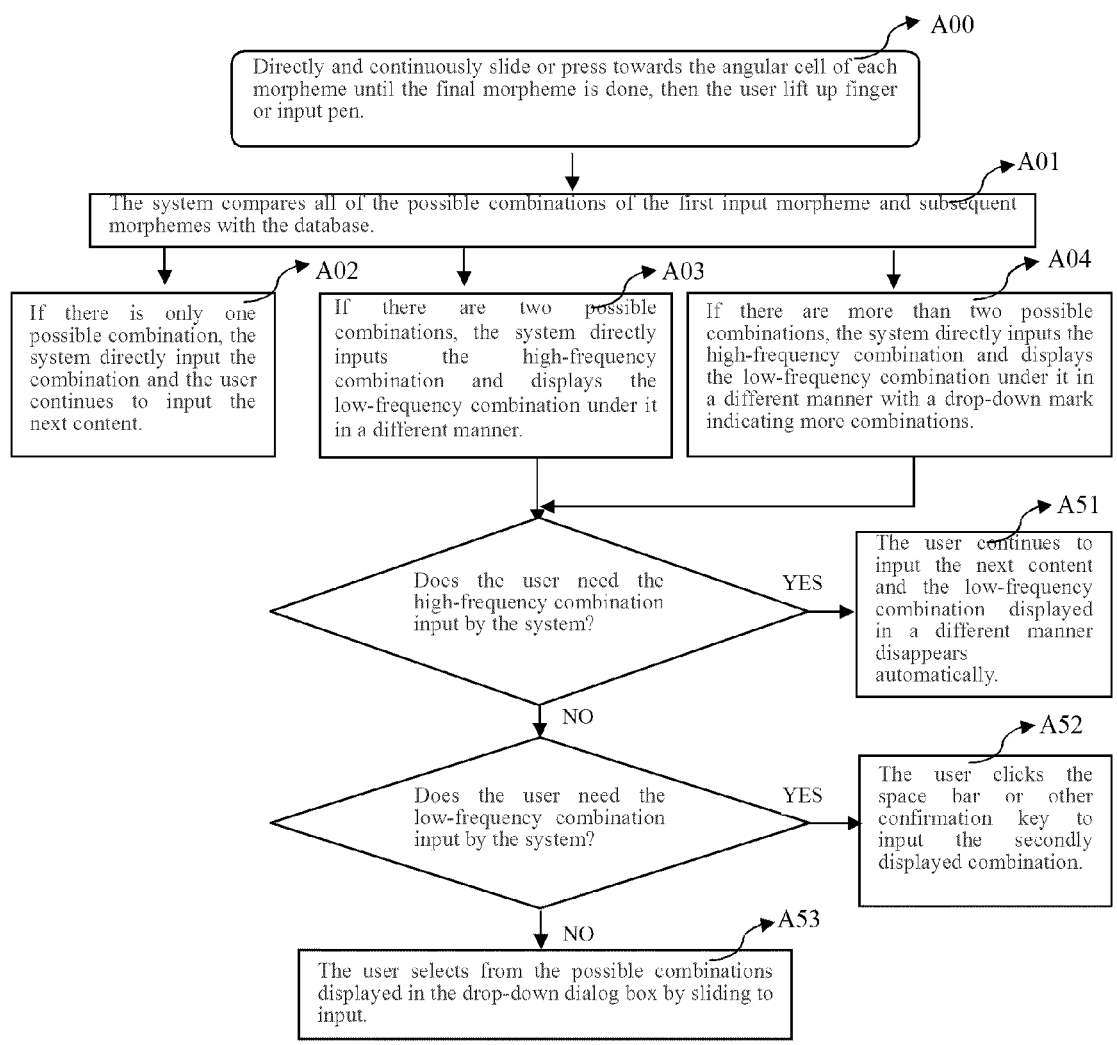
FIG. 52 shows the flow chart of input method by means of direct combination of cells.

Compared with the database, if only one combination can be determined from all combinations of morphemes in the angular cells, the system will directly input the combination and the user can continue to input the next word, as shown in step A02 of FIG. 52.

Compared to the database, if the possible combinations determined from all combinations of morphemes in the angular cell are more than two combinations, the second high-frequency combination will be displayed under the first high-frequency combination, with a small pull-down arrow under the second high-frequency combination to indicate there are more that two combinations, as shown in FIG. 28-3. If the user wants to input the first high-frequency combination, he/she can operate as indicated in step A51; if the user wants to input the second high-frequency combination displayed in a difference manner, he/she can operate as indicated in step A52. If the user wants to input another combination other than the two combinations, he/she can slide to select from all possible combinations in the pull-down dialog box. This process is shown in step A53 of the flow chart of FIG. 52. FIG. 28-4 illustrates that the user selects the input by sliding. Starting from the time when the user slides downwards from the space bar zone to the position on the circle, the system displays all possible combinations, as shown in FIG. 28-5. FIG. 28-6 illustrates the process that the user slides up and down with his/her fingers or a input pen to select from all possible combinations.

By default, the MMI in the present invention prompts one alternative word, to minimize the disturbance to the user's sight. Of course, the MMI provided in the present invention can also be set to display two alternative words, or directly list all alternative words, as shown in FIG. 28-5 (the difference to the display in FIG. 28-5 lies in: the first frequency word is displayed in the first line, and the rest words are displayed under the first line in sequence).

Figures 1, 42:
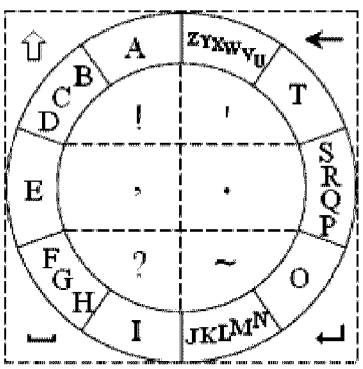
FIG. 42 shows an embodiment of MMI in different languages and different forms in the present invention.
Figures 2, 42:
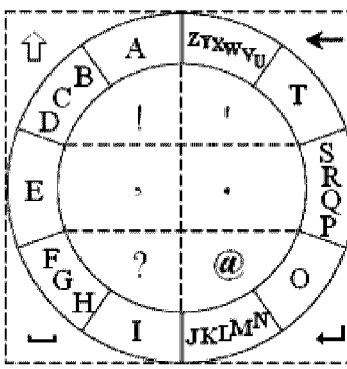
Figures 3, 42:
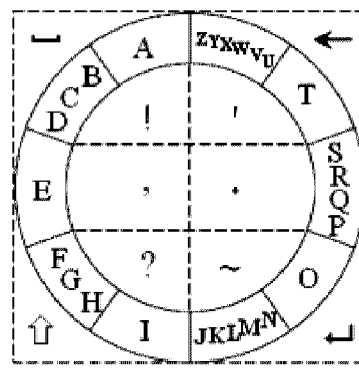
Figures 4, 42:
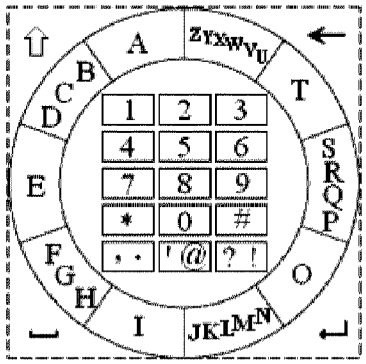
Figures 5, 42:
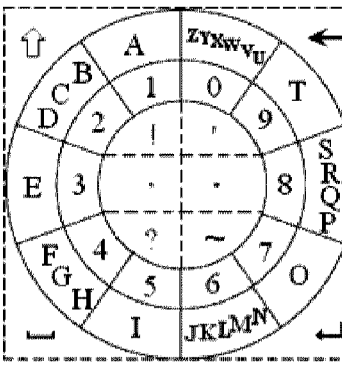
Figures 6, 42:
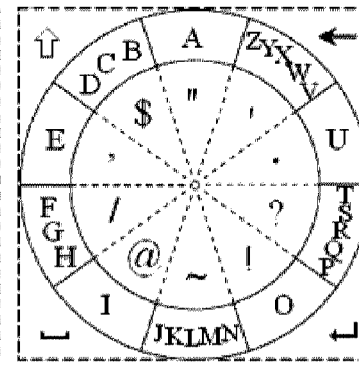
Figures 7, 42:
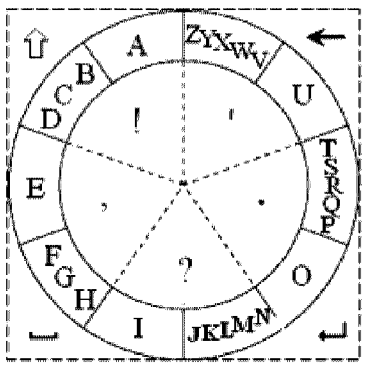
Figures 8, 42:
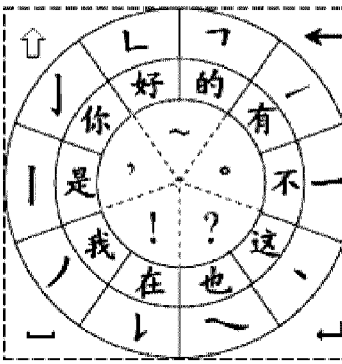
Figures 9, 42:
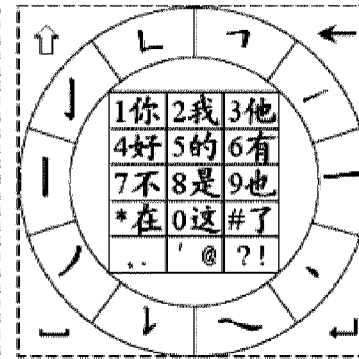
Figures 10, 42:
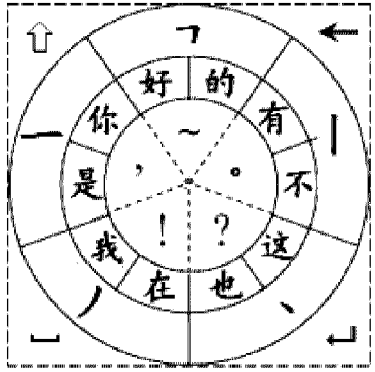
Figures 11, 42:
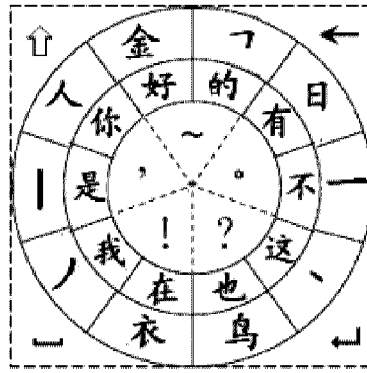
Figures 12, 42:
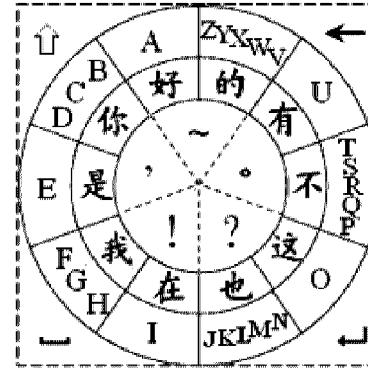
Figures 13, 42:
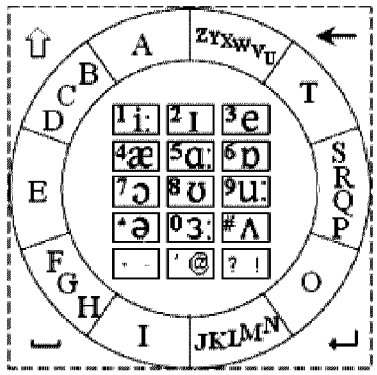
Figures 14, 42:
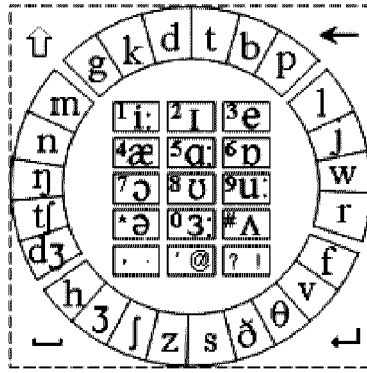
Figures 15, 42:
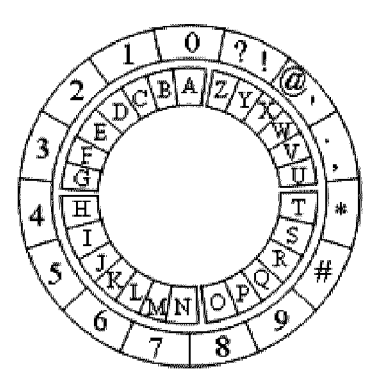
Figures 16, 42:
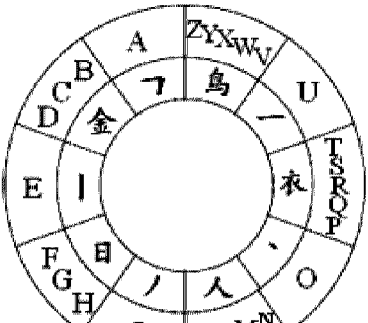
Figures 17, 42:
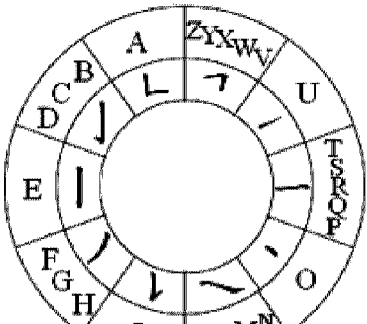
Figures 18, 42:
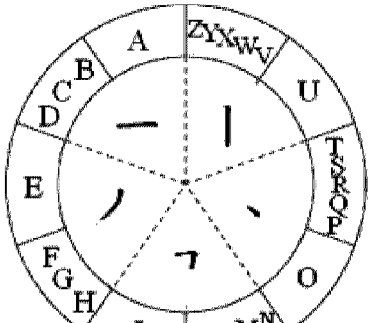
Figures 19, 42:
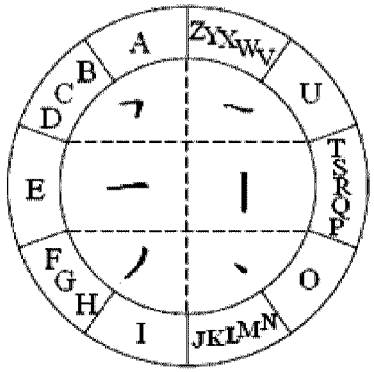
Figures 20, 42:
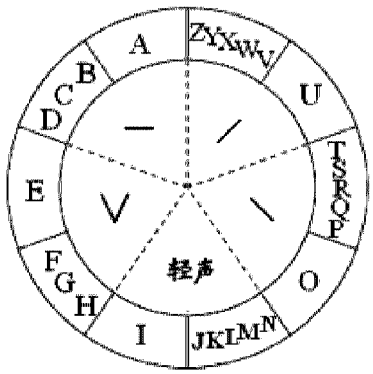
Figures 21, 42:
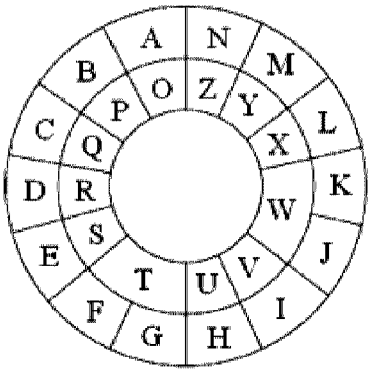

FIG. 3 shows a combination of circular and square frame. There are four corner zones, Zone 1, 2, 3, and 4 as labeled in FIG. 3, which can be used to arrange four function keys including Backspace key, Enter key, Caps Lock key and Space key. FIG. 42 shows an arrangement of the four function keys in the four corner zones. Corresponding functions can be implemented by click, double-click or sliding.

Figures 1, 17:
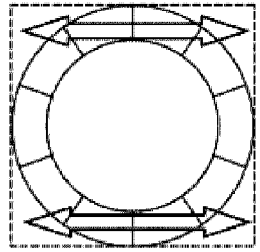
FIG. 17 is a schematic diagram of extended sliding actions.
Figures 2, 17:
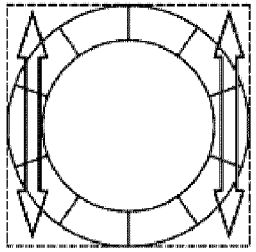
Figures 3, 17:
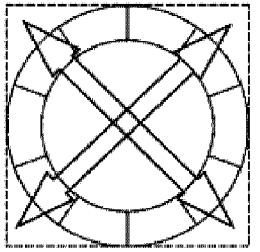
Figures 4, 17:
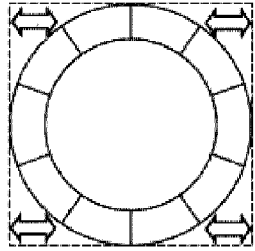
Figures 5, 17:
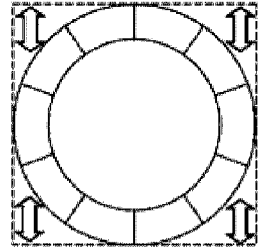
Figures 6, 17:
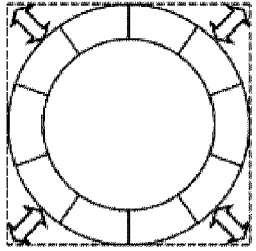
Figures 7, 17:
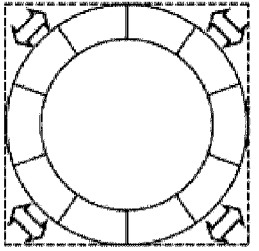
Figures 8, 17:
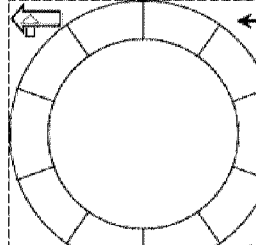
Figures 9, 17:
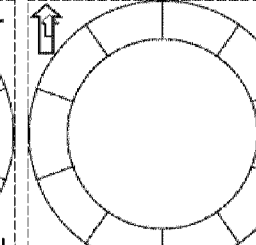
Figures 10, 17:
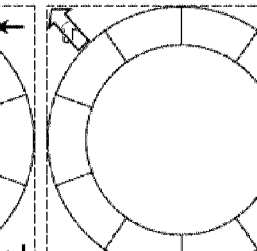
Figures 11, 17:
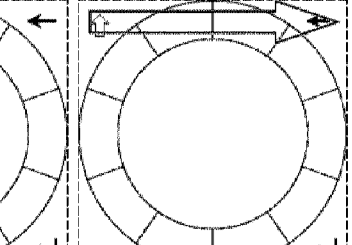
Figures 12, 17:
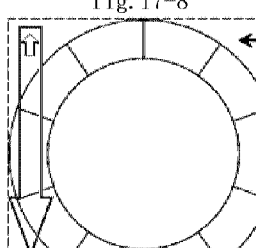
Figures 13, 17:
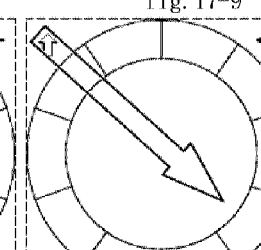
Figures 14, 17:
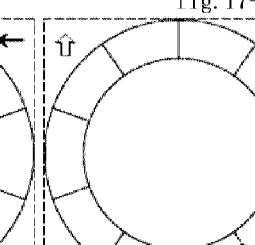
Figures 15, 17:
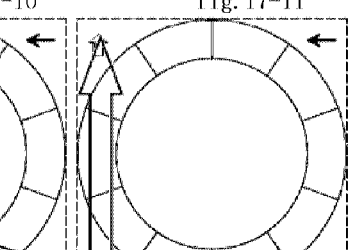

FIG. 17 shows the sliding operation method in the four corner zones. FIG. 17-1 shows horizontal sliding among the four corners; FIG. 17-2 shows vertical sliding among the four corners; FIG. 17-3 shows oblique sliding among the four corners; FIG. 17-4 shows horizontal sliding within a corner; FIG. 17-5 shows vertical sliding within a corner; FIG. 17-6 and FIG. 17-7 shows oblique sliding within a corner.

Table 2 lists the sliding operation in the four corner zones and their definitions.

TABLE 2

Figures 1, 18:
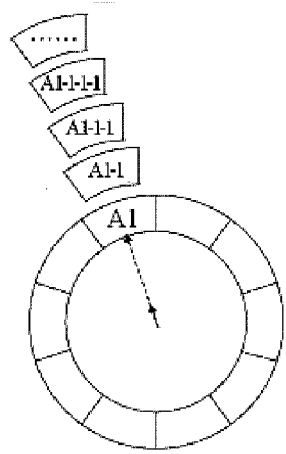
FIG. 18 is a schematic diagram of hierarchical and incremental predictive prompt function.
Figures 2, 18:
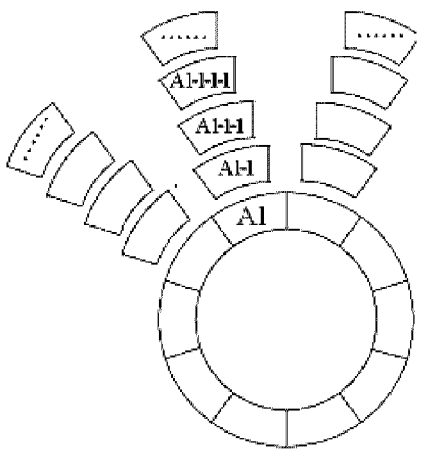
Figures 1, 19:
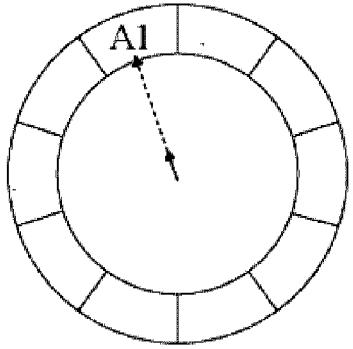
FIG. 19 shows the steps of hierarchical and incremental predictive prompt function.
Figures 2, 19:
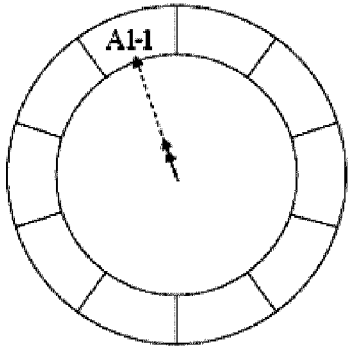
Figures 3, 19:
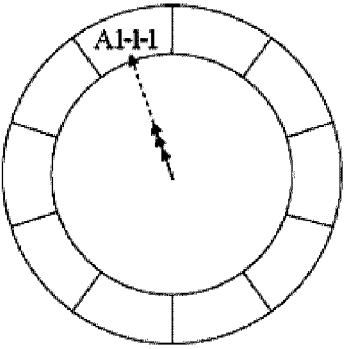
Figures 4, 19:
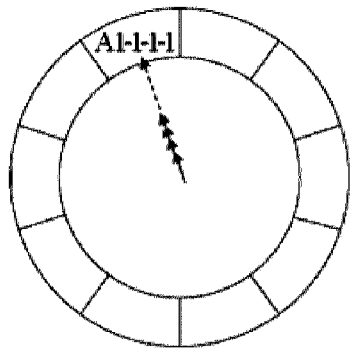
Figures 5, 19:
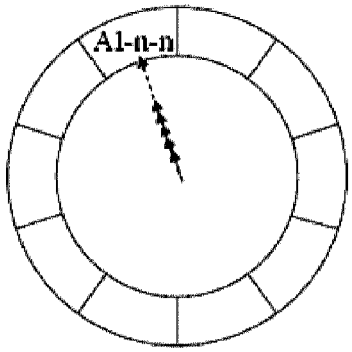

| Fig. No. | Operation | Function |
|---|---|---|
| FIG. 17-8 | Slide to left within Caps Lock key | All letters input previously are converted to upper case |
| FIG. 17-9 | Slide upwards within Caps Lock key | The initial letters of all letters input previously are converted to upper case |
| FIG. 17-10 | Slide upwards obliquely within Caps Lock key | ESC key |
| FIG. 17-11 | Slide to right from Caps Lock key | Select a phrase |
| FIG. 17-12 | Slide downwards from Caps Lock key | Select an alternative word |
| FIG. 17-13 | Slide downwards obliquely from Caps Lock key | Select a sentence |
| FIG. 17-14 | Slide to right from Space key | Select the last input sentence |
| FIG. 17-15 | Slide upwards from Space key | Select a commonly used sentence |
| FIG. 17-16 | Slide upwards obliquely from Space key | Switch the interface |
| FIG. 17-17 | Slide to left within Space key | Copy key |
| FIG. 17-18 | Slide downwards within Space key | Paste key |
| FIG. 17-19 | Slide to left obliquely within Space key | Tab key |
| FIG. 17-20 | Slide to left from Backspace key and pass more than a half of the width | Delete the previous sentence |
| FIG. 17-21 | Slide to left from Backspace key | Delete the previous word |
| FIG. 17-22 | Slide downwards from Backspace key | Select the last input word |
| FIG. 17-23 | Slide to right within Backspace key | Delete key |
| FIG. 17-24 | Slide upwards within Backspace key | Delete the next word |
| FIG. 17-25 | Slide upwards obliquely within Backspace key | Cut key |
| FIG. 17-26 | Slide downwards obliquely from Backspace key | Switch the interface |
| FIG. 17-27 | Slide upwards obliquely from Enter key | Undo key |
| FIG. 17-28 | Slide upwards within Enter key | Cursor ↑ key |
| FIG. 17-29 | Slide downwards within Enter key | Cursor ↓ key |
| FIG. 17-30 | Slide to left within Enter key | Cursor ← key |
| FIG. 17-31 | Slide to right within Enter key | Cursor → key |
| FIG. 17-32 | Slide downwards obliquely within Enter key | Page Down key, End key |
| FIG. 17-33 | Slide to left from Enter key | Page Up key |
| FIG. 17-34 | Slide upwards from Enter key | Home key |
| FIG. 17-35 | Slide upwards from Enter key and pass more than a half of the height | Home key |

The definitions of operations shown in Table 2 are reference settings of the system; the operations can be designed to provide other functions as required. Starting from any one of the four zones, the user can slide towards different directions, to select from the alternative words, phrases, or sentences prompted by the system; select from words, phrases or sentences that have been input by the user; select from commonly used words, phrases or sentences; toggle among input interfaces; achieve the function of Esc key, Tab key, cursor keys (Up, Down, Left, Right), PgUp key and PgDn key, Home key, and End key; achieve editing function of copy, cut, paste, delete, undo and redo, etc.; achieve upper case conversion of initial letter or all letters of previous word, or upper case conversion of initial letter of next word; achieve direct deletion of previous word or sentence, or direct deletion of next word or sentence, etc. In the Chinese character input interface, click in a corner zone can accomplish quick toggling between Simplified Chinese and Traditional Chinese, and sliding in the corner zone can accomplish toggling to handwriting recognition interface. For example, after inputting a word "How", the user can select directly from phrases "How many", "How about", "How far" and so on by sliding, as shown in FIG. 17-11. When the user slides as shown in FIG. 17-13, the system will display commonly used sentence "How are you!", "How do you do?", "How old are your?" and so on., which start from the word "how", arranged according to the frequencies of use of these sentences; the user can lift up the finger or input pen when he/she slides to the expected sentence, and the system will automatically input the sentence, with the corresponding punctuation symbol (question mark or exclamation mark, etc.), and add a space after the sentence automatically. Furthermore, the system can memorize the sentences input by the user before (this option can be disabled by the user), so that the user can conveniently input commonly used sentences and sentences input by him/her before. The user can define an own database of phrases and sentences, so as to input a great deal of text more quickly and conveniently. Such a phrase and sentence input mode avoids problems in existing software products, such as occupation of screen space by option boxes and disturbance to the user's sight, etc. In addition, such an approach improves the user's experience about smart input.

Figures 1, 20:
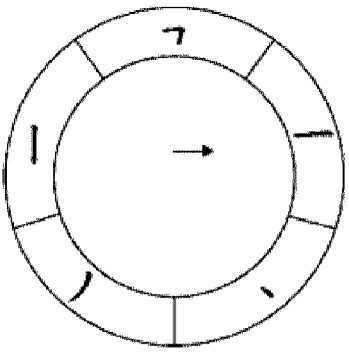
FIG. 20 shows an embodiment of hierarchical prompt for Chinese character strokes.
Figures 2, 20:
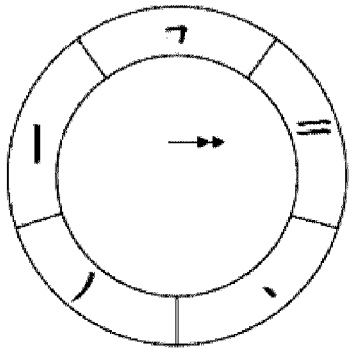
Figures 3, 20:
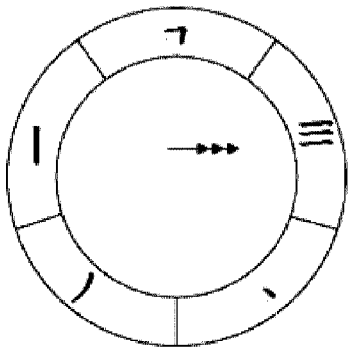
Figures 4, 20:
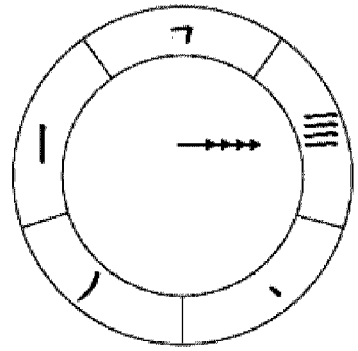
Figures 1, 21:
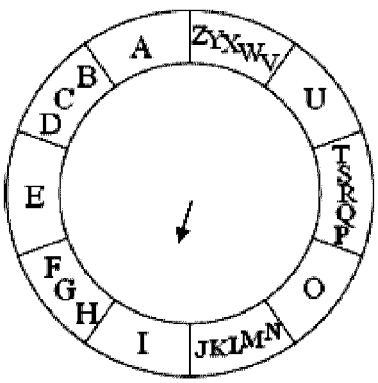
FIG. 21 shows an embodiment of hierarchical prompt for English and phonetics in Chinese.
Figures 2, 21:
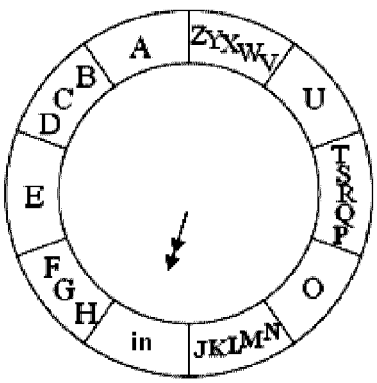
Figures 3, 21:
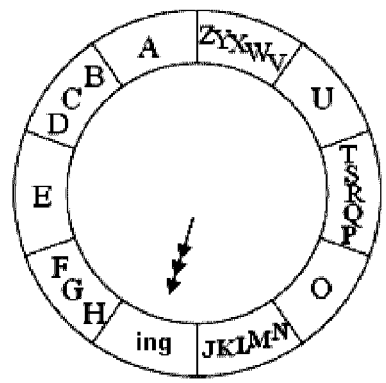

FIG. 18 is a schematic diagram of the hierarchical and incremental prompt function for angular cells of the present invention. FIG. 18-1 illustrates only one option is prompted at each level; FIG. 18-2 illustrates multiple options are prompted at each level. FIG. 19 is the detail description of FIG. 18. As shown in FIG. 19-1, when the user slides towards an angular cell "A1", the system inputs morpheme A1; after that, the content displayed in the angular cell is changed from A1 to the most commonly used morpheme combination A1-1 initiated with morpheme A1, as shown in FIG. 19-2. If the user doesn't want to input A1-1, he/she can simply change the direction of movement, and the morpheme displayed in the angular cell will recover to the original "A1". If the user wants to input A1-1, he/she can continue the movement along the original direction of movement, and the system will input A1-1; then, the content displayed in the angular cell is changed from A1-1 to the most commonly used morpheme combination A1-1-1 initiated with A1-1, as shown in FIG. 19-3. FIG. 19-4 and FIG. 19-5 are similar. The user can input longer morpheme combination A1-1-1-1 and continue, till the longest and possible morpheme combination is achieved. FIG. 20 shows an embodiment of the Chinese stroke input interface shown in FIG. 19. As shown in FIG. 20-1, when the user points to "—", the system will input a horizontal stroke, and display ⇉ in the angular cell automatically, as shown in FIG. 20-2. If the user wants to input a different stroke other than ⇉ next, he/she can change the direction, and the system recovers the display to ⇉. If the user wants to input ⇉, he/she can move on, and the system will input ⇉, and change the display to "三" automatically, as shown in FIG. 20-3. If the user wants to input "三", the system will change the display to prompt "三", as shown in FIG. 20-4. In this way, the user can conveniently input some components such as "氵", "彡", "刂" and "艹"s, etc. FIG. 21 shows another embodiment of the MMI shown in FIG. 19. As shown in FIG. 21-1, when the user points to the angular cell "I", the system will input 'i' and automatically prompt "in", as shown in FIG. 21-2; if the user moves on and input "in", the system will prompt "ing", as shown in FIG. 21-3. In that way, the user can conveniently input commonly used prefixes, suffixes, and high-frequency adjacent letter strings in English. The user can also conveniently input last vowels 'a', 'an', 'ang'; 'e', 'en', 'eng'; 'i', 'in', 'ing'; 'o', 'ong'; 'u', 'un', and 'ü' in Chinese phonetic system. This is a simple method for implementing Double-Pin Input in Chinese. The hierarchical and incremental prediction and prompt function during Chinese stroke and phonetic input is shown in the following Table:

| Angular cell | First prompt | Second prompt | Third prompt | Angular cell | First prompt | Second prompt |
|---|---|---|---|---|---|---|
| — |  | 二 | 三 | a | an | ang |
| 丨 | ‖ | ‖‖ | ‖‖‖ | e | en | eng |
| 丿 | 丿丿 | 彡 | | i | in | ing |
| 丶 | 氵 | 囗 | 灬 | o | ou | ong |
| → |  |  | 乙 | u | un | ü |
| 𠃌 | ㄱ |  | 3 | ∠ | ㄴ |  |
| し | レ | ∖ |  | ｊ | ｊ | 3 |

This method can also be used to achieve simple and quick input on the MMI provided in the present invention for other languages with first and last consonants system and phonetic rules similar to Chinese. The MMI prompts alphabetic variants during input of Latin language, which is similar to English. The method shown in FIG. 19 can also be used to prompt alphabetic variants hierarchically. In FIG. 21, if Italian is to be input, the system will prompt 'ì' automatically for the user to select after the user inputs letter 'I'.

Figures 1, 23:
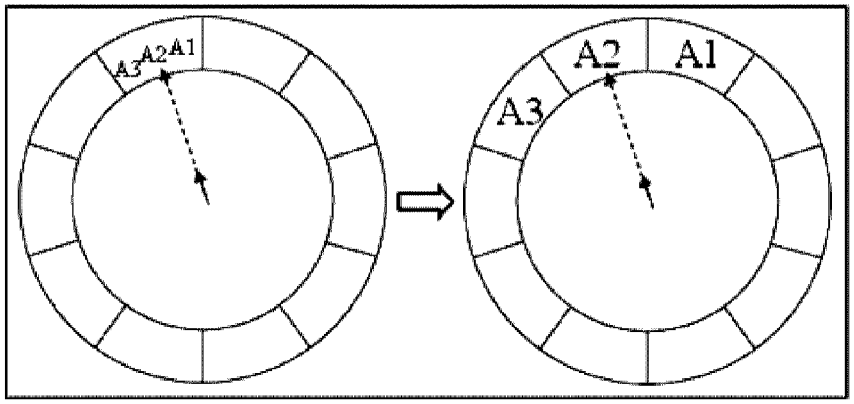
FIG. 23 shows a schematic diagram of enlargement function of angular cell.
Figures 2, 23:
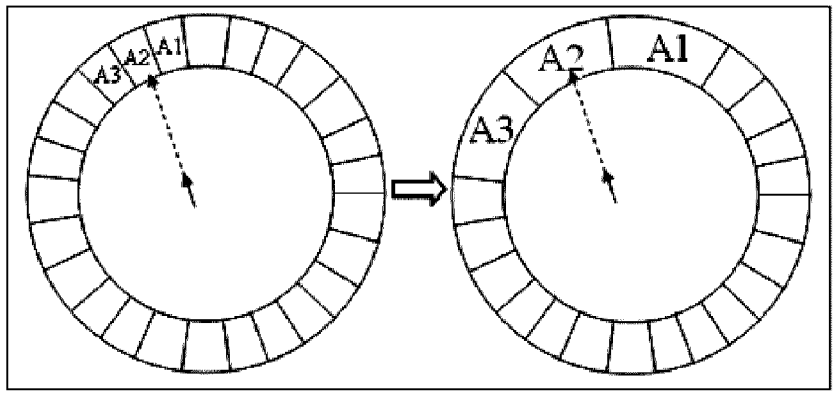
Figures 1, 24:
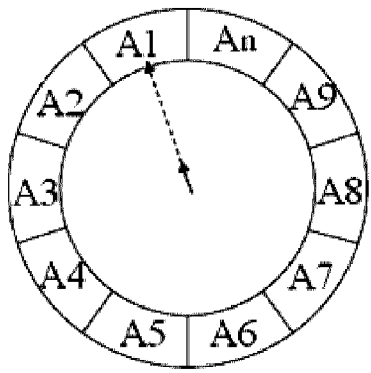
FIG. 24 is a schematic diagram of hierarchical and incremental expansion and enlargement of angular cell.
Figures 2, 24:
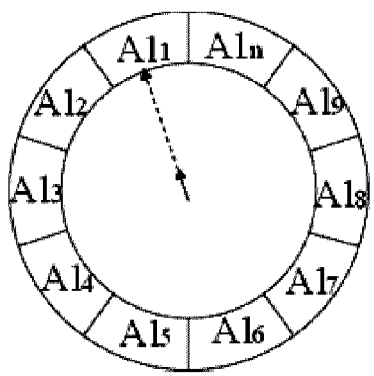
Figures 3, 24:
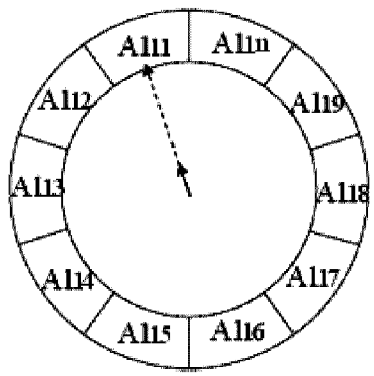
Figures 4, 24:
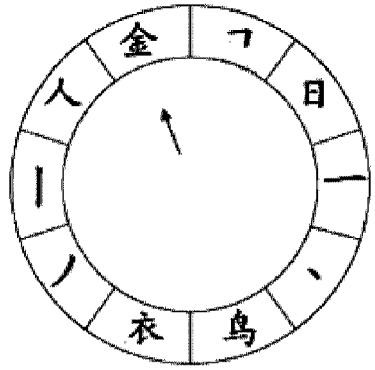
Figures 5, 24:
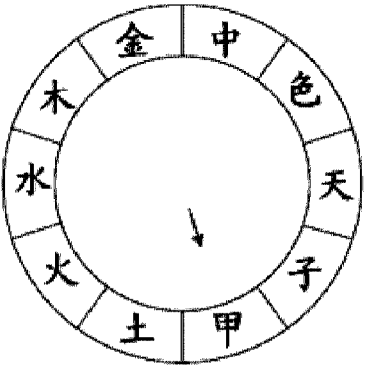
Figures 6, 24:
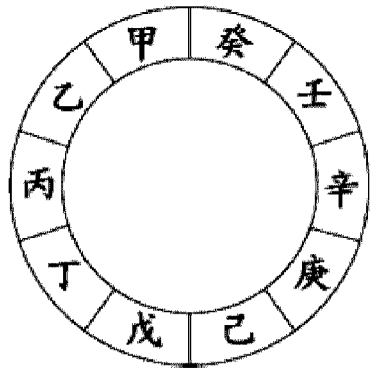
Figures 7, 24:
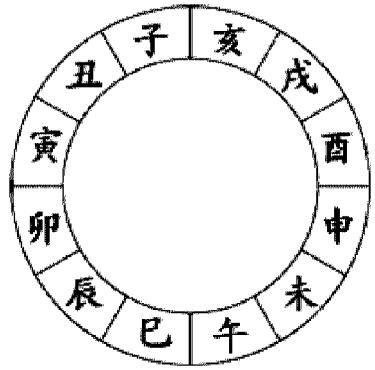
Figures 8, 24:
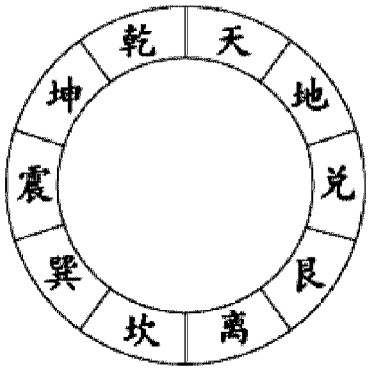
Figures 9, 24:

FIG. 23 illustrates the angular cell enlargement function of the MMI provided in the present invention. FIG. 23-1 illustrates expansion and enlargement of morphemes in an angular cell into the adjacent angular cell, with the angle of the angular cell kept unchanged. FIG. 23-2 illustrates that the angle of each angular cell is enlarged. FIG. 24 shows an embodiment of hierarchical expansion of the MMI shown in FIG. 23-1, designed to expand icons, categories, and folders, etc. hierarchically for the user to select. Wherein, FIG. 24-4 to FIG. 24-9 show embodiments of a Chinese character circle. As shown in FIG. 24-4, when the user points to an angular cell that represents an elemental component 'gold(金)', the angular cell is enlarged, as shown in FIG. 24-5, and ten components of Chinese character "金、木、水、火、土、甲、子、天、色、中" are displayed for the user to select. When the user select the component ''甲 (the first of the ten Celestial Stems)', the system expends the selection again, as shown in FIG. 24-6, and ten Celestial Stem components "甲、乙、丙、丁、戊、己、庚、辛、壬、癸" are displayed for the user to select. In FIG. 24-5, if the user select a component '子', the system will display twelve Terrestrial Branch components for the user to select, as shown in FIG. 24-7. In FIG. 24-5, if the user select a component '天 (heaven)', the system will display the eight components in the Eight Trigrams for the user to select, as shown in FIG. 24-8. In FIG. 24-5, if the user select a component '色 (color)', the system will display nine color components for the user to select, as shown in FIG. 24-9. In this way, the user can assemble words by selecting components hierarchically.

Figures 1, 32:
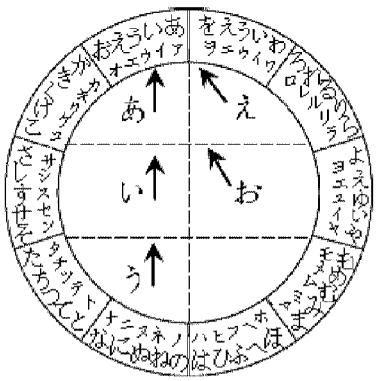
FIG. 32 is a schematic diagram of selecting a morpheme in an angular cell in Japanese on the basis of the position of starting point.
Figures 2, 32:
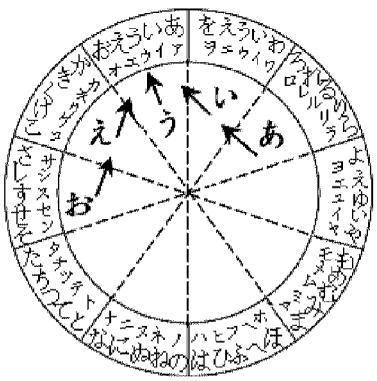
Figures 1, 33:
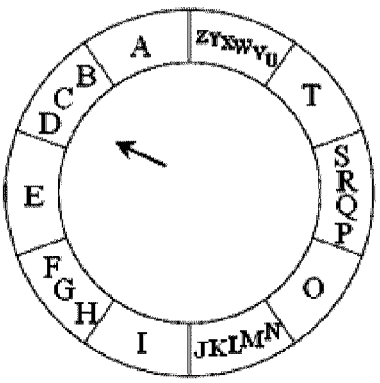
FIG. 33 shows an embodiment of expansion of a multi-morpheme angular cell towards different directions.
Figures 2, 33:
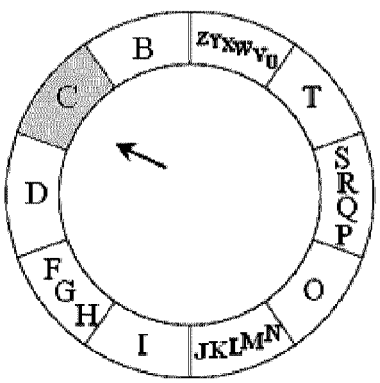
Figures 3, 33:
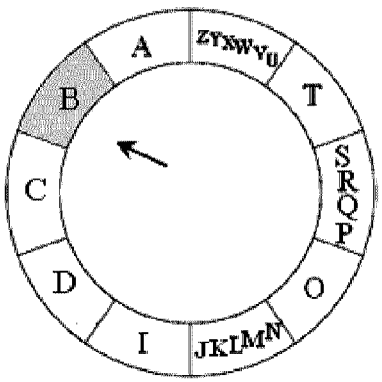

FIG. 33 shows an embodiment of the English interface shown in FIG. 23-1. As shown in FIG. 33-1, the user wants to input letter 'B', 'C', or 'D'. The three letters don't occupy a separate angular cell respectively; instead, they are placed together in an angular cell. When the user moves towards that angular cell, the system expands the morphemes in the angular cell "BCD" into the two adjacent angular cells and replaces the original contents in the two angular cells, as shown in FIG. 32-2 and FIG. 32-3. In FIG. 23-1, there are three options for expansion: the first option is to expand into the angular cells at both sides, centering on the middle morpheme in the angular cell. FIG. 33-2 illustrates expansion towards both sides, centering on the middle letter 'C'. The second option is to expand on the basis of the little difference of user's movement direction. That is to say, expand towards both sides in the order of the morphemes, centering on the morpheme nearest to the position pointed by the present movement direction. A benefit of such expansion is to enable the user to feel the difference of his/her movement direction, and is favorable for the user to build up the direction-sense. The third option is to expand towards the adjacent angular cells at both sides, centering on the high-frequency morpheme in the angular cell.

Figures 1, 34:
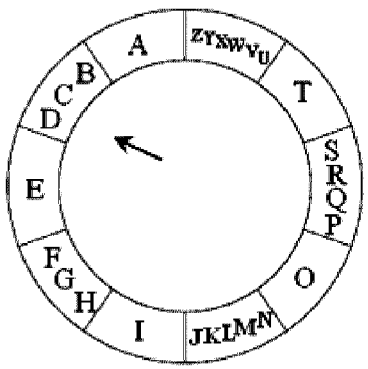
FIG. 34 shows an embodiment of selecting a morpheme in a multi-morpheme angular cell in an enlarged manner.
Figures 2, 34:
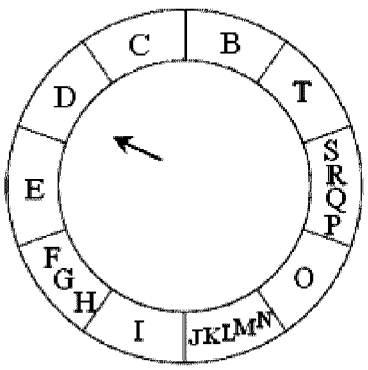
Figures 3, 34:
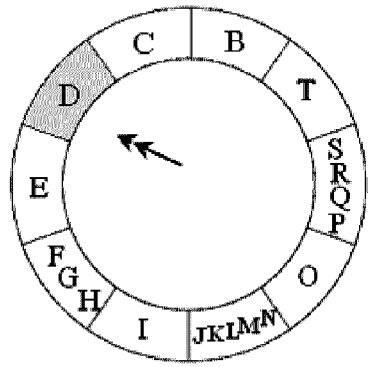
Figures 4, 34:
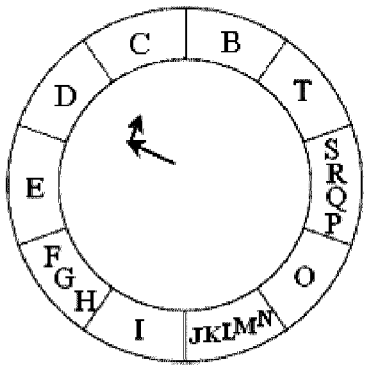
Figures 5, 34:
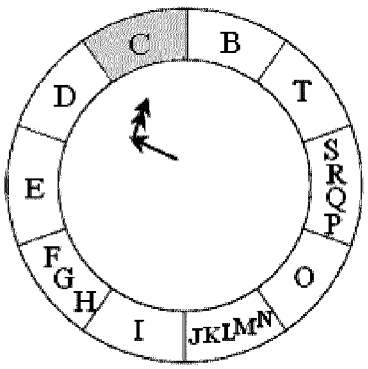
Figures 6, 34:
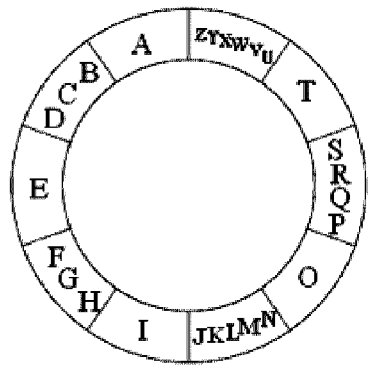

FIG. 34 shows an embodiment of FIG. 32-1. As shown in FIG. 34-1, when the user points to the angular cell "BCD", the system will expands towards both sides, centering on the high-frequency letter 'D' in the angular cell, as shown in FIG. 34-2. If the user wants to input letter 'D', as shown in FIG. 34-3, he/she can move on in the present movement direction, and the system will confirm the input of 'D'. However, if the user wants to input letter 'C' other than letter 'D', he/she can change the direction movement, and the system will prompt the user to point to a new morpheme, as shown in FIG. 34-4; then, the user's movement direction points to the expanded new angular cell "C". Next, the user can move on in the movement direction, to confirm the input of letter 'C', as shown in FIG. 34-5. In FIG. 34-3 or FIG. 34-5, after the user inputs the expected letter, the system will switch back to the original interface automatically, as shown in FIG. 34-6. Alternatively, after the user inputs the expected letter, the system doesn't switch back to the original interface, and the user continues to input a letter among letter 'B', 'C', and 'D'; if the user wants to input another letter different from letter 'B', 'C', and 'D', he can move back in the movement direction, and the system will switch back to the original interface for the user to input further.

Figures 1, 36:
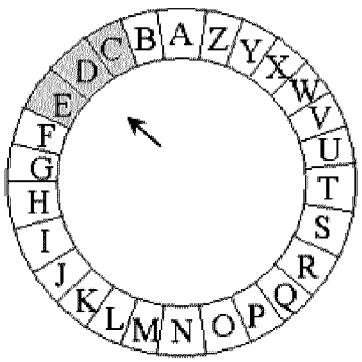
FIG. 36 shows that all of the 26 letters in English are enlarged, respectively.
Figures 2, 36:
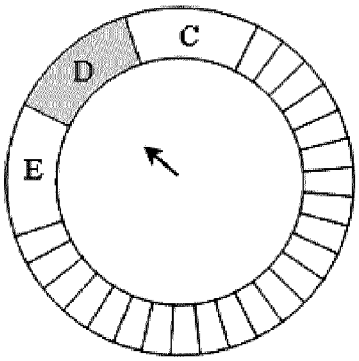
Figures 3, 36:
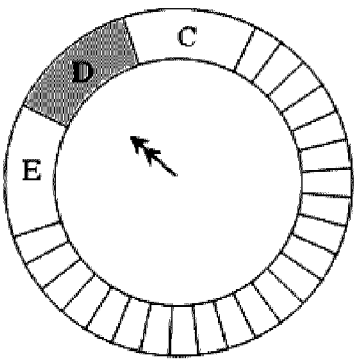
Figures 4, 36:
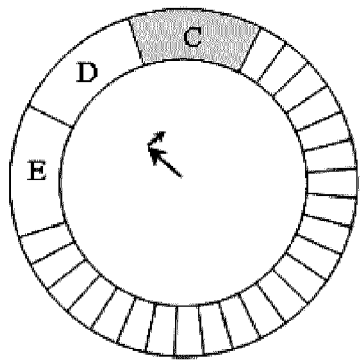
Figures 5, 36:
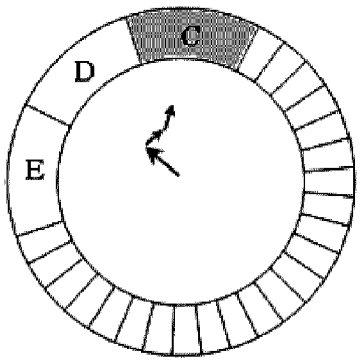

FIG. 36 shows an embodiment of the English interface shown in FIG. 23-2. As shown in FIG. 36-1, when the user slides towards a direction, the system enlarges the angle of several adjacent angular cells in the direction, as shown in FIG. 36-2. If the enlarged cell "D" pointed by the user at present is right the cell expected by the user, the user can move on to confirm the input of 'D', as shown in FIG. 36-3. If the user wants to input 'C', he/she can change the direction to input 'C', as shown in FIG. 36-4 and FIG. 36-5.

Figures 1, 35:
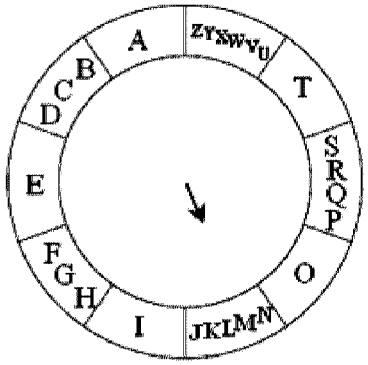
FIG. 35 shows an embodiment of enlarged input of the initial letter of word "kind" in English.
Figures 2, 35:
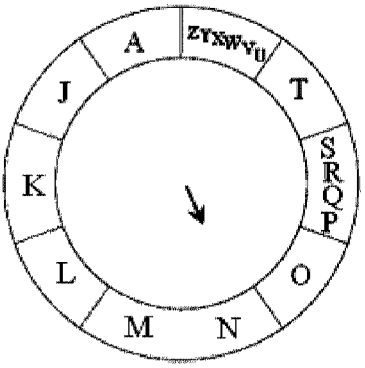
Figures 3, 35:
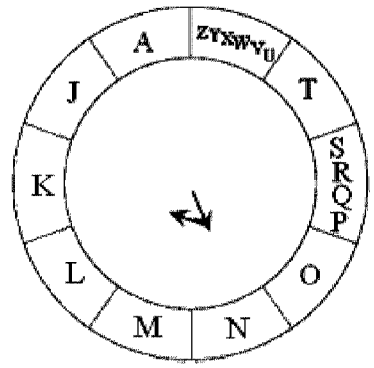
Figures 4, 35:
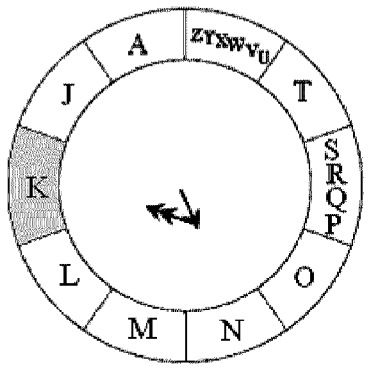
Figures 5, 35:
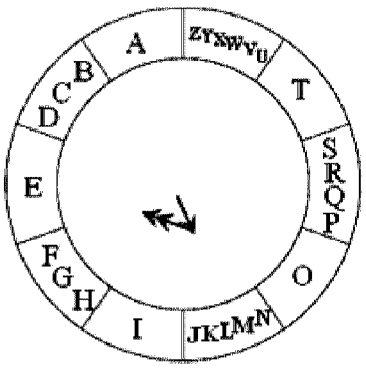
Figures 6, 35:
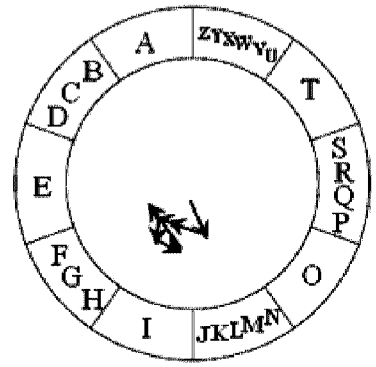

FIG. 35 illustrates inputting a word "kind" by enlarging the initial morpheme. The initial letter 'k' of the word "kind" doesn't occupy a separate angular cell, but is placed together with other letters in the angular cell "JKLMN". The user moves towards the angular cell "JKLMN" first, as shown in FIG. 35-1. The system enlarges "J, K, L, M, N" into adjacent angular cells, as shown in FIG. 35-2. The user changes the direction and points to a new angular cell "K", as shown in FIG. 35-3. The user moves on in the movement direction to confirm inputting letter 'k', as shown in FIG. 35-4. Then the system recovers the interface to the original state, as shown in FIG. 35-5. Next, the user slides among the angular cells "I", "JKLMN", and "BCD" where the rest letters "ind" exist, as shown in FIG. 35-6. There are altogether 15 possible combinations among morphemes in angular cell "k", "I", "JKLMN", and "BCD": "kijb", "kijc", "kijd", "kikb", "kick", "kikd", "kilb", "kilc", "kild", "kimb", "kimc", "kimd", "kinb", "kinc", and "kind", wherein, only the word "kind" is meaningful. Therefore, the system automatically inputs the word "kind", and adds a space after the word automatically.

As shown in FIG. 18-2, once the user confirms the input of a morpheme, the system can display several commonly used and high-frequency morpheme combinations that begin with the morpheme in the angular cell. If the user doesn't want to input any of these morpheme combinations, he/she can directly change the direction to input the next morpheme. If the next morpheme combination expected by the user is among the displayed morpheme combinations, the user can move on in the present movement direction, and the system will expand and enlarge the current angular cell, so that each morpheme combination occupies a new angular cell separately after expansion. The user can select a morpheme combination from the new angular cells. When the user confirms the input of a morpheme combination, the system will display longer morpheme combinations that begin with the morpheme combination for the user to select, so that the user can input a longer morpheme combination by expanding the angular cell again. This process can be conducted progressively in a cyclic manner, till the user accomplishes the input of entire expected content. The user can define whether to use the hierarchical expansion function, the number of morpheme combinations prompted at each expanded level, and the maximum number of expanded levels.

Figures 1, 38:
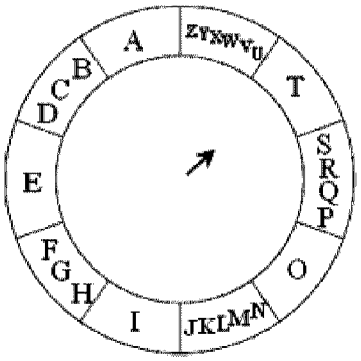
FIG. 38 shows an embodiment of providing multiple prompts at each level in the hierarchical and incremental prompt mechanism for English.
Figures 2, 38:
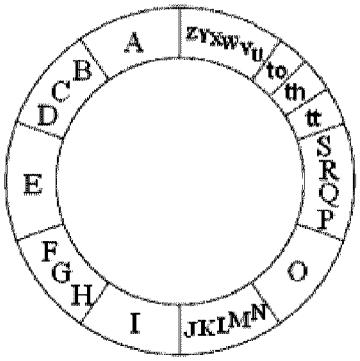
Figures 3, 38:
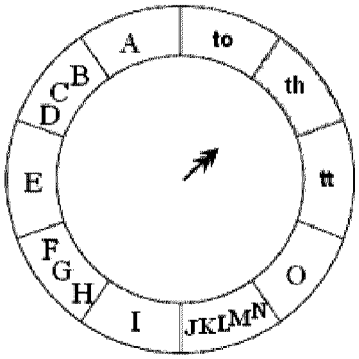
Figures 4, 38:
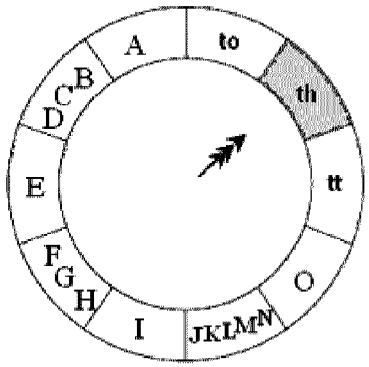
Figures 5, 38:
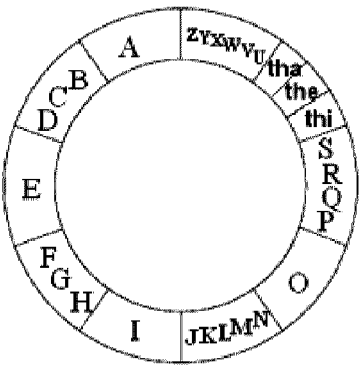
Figures 6, 38:
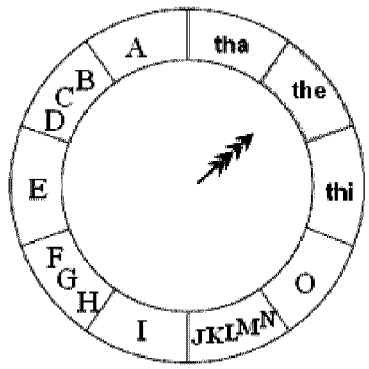
Figures 7, 38:
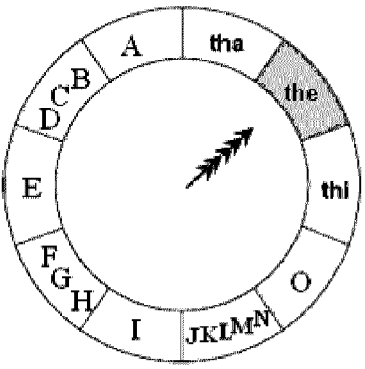

FIG. 38 shows an embodiment of the English interface shown in FIG. 18-2. As shown in FIG. 38-1, the user's movement direction points to an angular cell "T". After the system inputs the letter 't', the content in the angular cell "T" is changed to three commonly used letter combinations "to", "th", and "tt" that begin with letter 't', as shown in FIG. 38-2. If the user doesn't want to input any of the three letter combinations, the user can change the movement direction, and the system interface will recovers to the original interface; then, the user can continue to input other letters. If the user wants to input a letter combination among "to", "th", and "tt", he/she can move on in the present movement direction, and the system will expand and enlarge the angular cell, so that "to", "th", and "tt" occupy a new angular cell separately after expansion, as shown in FIG. 38-3. If the user wants to input "th", he/she can move on in the original movement direction and confirm the input of "th", as shown in FIG. 38-4. If the user wants to input "to", he/she can change the movement direction to input "to". After the user inputs "th", the content in the angular cell "th" is changed to commonly used letter combinations that begin with "th" (i.e., "tha", "the", "thi"), as shown in FIG. 38-5. If the user doesn't want to input any of the displayed letter combinations, he/she can change the movement direction. If the user wants to input a letter combination among "tha", "the", and "thi", he/she can move on in the present movement direction, and "tha", "the", "thi" will be expanded and occupy a new angular cell separately after expansion, as shown in FIG. 38-6. The user can move on in the present movement direction to confirm the input of "the", as shown in FIG. 38-7. Such a hierarchical expansion process can be conducted progressively in a cyclic manner; once the user accomplishes the input of a complete word, the system will prompt longer morpheme strings, such as phrases, idioms, and sentence, etc. In this way, the user can quickly input high-frequency morpheme combinations, words, phrases, idioms, and sentences, etc. simply by sliding. The user can even input a word, phrase, or sentence quickly along a straight line in a direction. The system can be configured in a way that it doesn't prompt longer language units any more after the user accomplishes the input at a specific level of language units.

FIG. 18 illustrates that different contents are prompted in English input, depending on the exact angular cell. When the contents in the first and second angular cells are input, the prompt function prompts commonly used prefixes or letter strings initiated with the morpheme in the angular cell for the user to select; when the contents in the second and third angular cells are input, the prompt function prompts commonly used letter strings initiated with the morpheme in the angular cell for the user to select; when the contents in the third and further angular cells are input, the prompt function prompts commonly used suffixes or letter strings initiated with the morpheme in the angular cell for the user to select. For example, once the user inputs the first angular cell "T", the system will prompt the most commonly used initial letter string "th"; when the user inputs the second angular cell "T", the system will prompt commonly used letter strings "tt", "ti", etc.; when the user inputs the third or further angular cell "T", the system will prompt commonly used suffixes such as "tion". The method of prompting one or a few of options at each time according to the position of a letter in the word can not only improve the user's input speed but also avoid the drawback of disturbance to the user's sight and thought resulted from a lot of word options prompted in the prompt box in many input software products. In addition, the sliding method provided in the present invention doesn't require any additional word selection key; the user can move on to select directly, or change the direction of movement to select other options, and input the current option by lifting up the finger. This approach is very convenient and highly efficient.

Figures 1, 39:
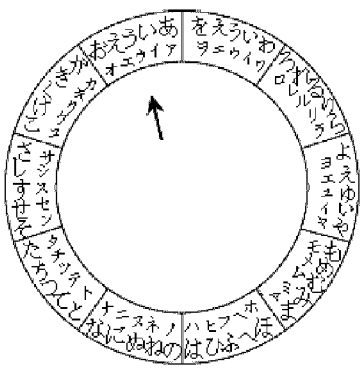
FIG. 39 shows an embodiment of enlarging Japanese angular cells.
Figures 2, 39:
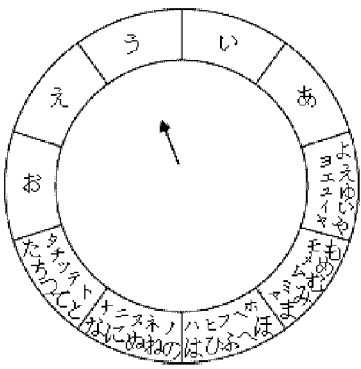

FIG. 39 shows an embodiment of enlargement for input on a Japanese Kana circle. As shown in FIG. 39-1, when the user points to the angular cell "あ い う え お", the system expands "あ","い","う","え", and "お", as shown in FIG. 39-2.

The present invention puts forward a method for determining characters and words, wherein, the first morpheme of a word is input separately, and the second to the last morphemes of the word are input in combination in the angular cells. The system compare all possible combinations of initial morpheme and subsequent morphemes with the character database or word database in the language, to select the combinations in the character database or word database.

Figures 1, 26:
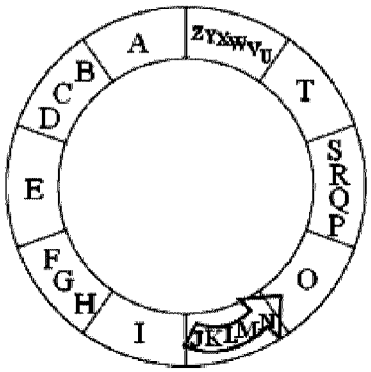
FIG. 26 is a schematic diagram of initial morpheme input by direct sliding.
Figures 2, 26:
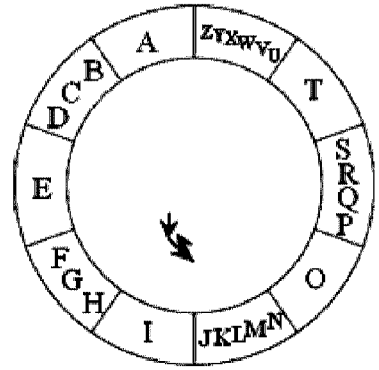

FIG. 26 illustrates input of English word "kind". The initial morpheme can be input directly by sliding; as shown in FIG. 26-1, letter 'k' can be selected by sliding in the angular cell; the rest morphemes are input in combination in the angular cells, as shown in FIG. 26-2. As described above, the work "kind" is the only possible combination among angular cell "k", "I", "JKLMN", and "BCD". Thus the system inputs the word "kind" directly.

FIG. 4 illustrates that the zone within the circle is divided into several zones. Each zone is designed not only to accommodate morphemes such as punctuation symbols but also to determine the type of language on the basis of the information in the zone, or determine the position of the morpheme in a word, or select a morpheme from a multi-morpheme angular cell. FIG. 4-1 illustrates that the zone within the circle is divided into a left zone and a right zone; FIG. 4-2 illustrates that the zone within the circle is divided into an upper zone and a lower zone; FIG. 4-3 illustrates that the zone within the circle is divided into four zones; FIG. 4-4 illustrates that the zone within the circle is divided into six zones; FIG. 4-5 illustrates that the zone within the circle is divided into ten zones; FIG. 4-6 illustrates that the zone within the circle is divided into five zones.

As shown in FIG. 42-16, when the circles for two languages are nesting together, or two forms of circles for the same language are nesting together, the type of language to be input by the user can be identified automatically according to the position of the starting point of input operation. For example, if the starting point is within zone 1 as shown in FIG. 4-1 and FIG. 4-2, it indicates inputting the language on the outer circle; if the starting point is within zone 2, it indicates inputting the Language on the inner circle; or vice versa. The user can define the language types corresponding to zone 1 and zone 2 by himself. The user can define different forms of the same language corresponding to zone 1 and zone 2 by himself. As shown in FIG. 42-16, the user can define the outer circle for English input and define the inner circle for Chinese input; or the user can define the outer circle for Chinese phonetic input and define the inner circle for mixed phonetic/character pattern input.

If there is only one language, zone 1 and zone 2 can be used to identify the boundary between characters or words. For example, if the starting point is within zone 1, it indicates inputting the first letter of a word or the first word of a phrase; if the starting point is within zone 2, it indicates inputting the second letter of a word or the second word of a phrase. In FIG. 4-3 and FIG. 4-4, the zone within the circle is divided into four zones, which can be used to identify the language type and the demarcations between letters and words in each language.

For example, after inputting the English word "how", the user lifts the input pen and then puts the input pen in the lower part (zone 2), indicating to input a phrase that begins with "how". Commonly used phrases that begin with "how" include "how far", "how about", "how now", "how many", and "how to", etc. However, if the user points to letter 'm' in the lower part (zone 2), the system will automatically input "how many"; if the user points letter 'a' in the lower part (zone 2), the system will automatically input "how about".

The zone information shown in FIG. 4 can also be used to select a specific morpheme from a multi-morpheme angular cell. When the user starts in a specific zone and slides towards a multi-morpheme angular cell, it indicates inputting the morpheme corresponding to the zone number of the angular cell.

Figures 10, 29:
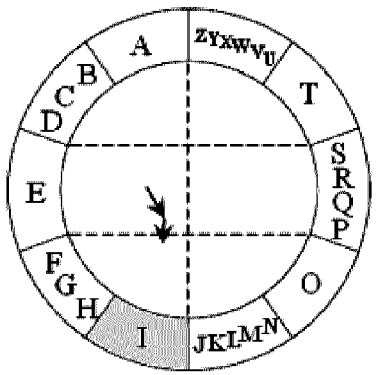
FIG. 29 is a schematic diagram of selecting a morpheme in an angular cell in English on the basis of the position of starting point.
Figures 11, 29:
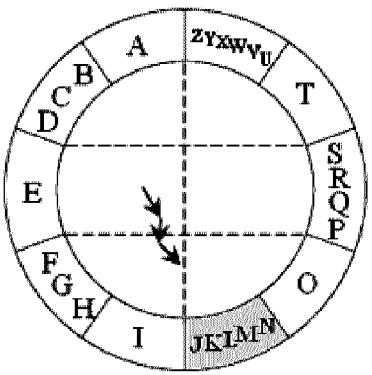
Figures 12, 29:
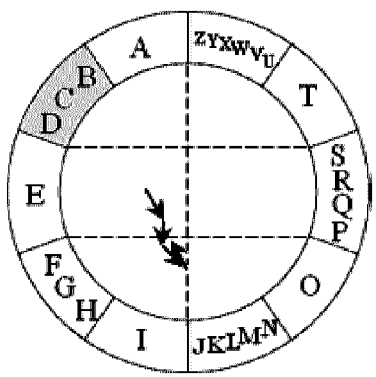

FIG. 29-1 illustrates an embodiment of FIG. 4-4. FIG. 29-2 illustrates an embodiment of sliding from the first, second, and third zones labeled as 1, 2, and 3 to an angular cell "BCD", respectively. In the angular cell "BCD", the first morpheme is 'B', the second morpheme is 'C', and the third morpheme is 'D'. Therefore, as shown in FIG. 29-3, sliding from zone 1 towards the angular cell "BCD" indicates inputting the first morpheme 'B'. As shown in FIG. 29-4, sliding from zone 2 towards the angular cell "BCD" indicates inputting the second morpheme 'C'. As shown in FIG. 29-5, sliding from zone 3 towards the angular cell "BCD" indicates inputting the third morpheme 'D'. FIG. 29-6 illustrates the process of inputting letter 'U', 'V', 'W', 'X', 'Y', and 'Z' with the method based on identification of the position of starting point. When the user slides from a specific zone towards an angular cell, the system can directly prompt the morpheme corresponding to the zone number in the angular cell. For example, as shown in FIG. 29-7, sliding from zone 3 towards angular cell "UVWXYZ" indicates inputting the third morpheme 'W' in the angular cell; thus, the system directly prompts 'W'. In this way, the user can see the morpheme to be input so as to avoid wrong input and makes the user relieved.

FIG. 29-8 to FIG. 29-12 illustrate the process of inputting "kind" with the method based on identification of the position of starting point. As shown in FIG. 29-8, sliding from zone 2 towards angular cell "JKLMN" indicates inputting letter 'k'; thus, the system prompts letter 'k' to the user, just like in the case shown in FIG. 29-9. Next, the user slides among the angular cells "I", "JKLMN", and "BCD" where the rest letters "ind" exist, as shown in FIG. 29-10, FIG. 29-11, and FIG. 29-12. As described above, the work "kind" is the only possible combination among angular cell "k", "I", "JKLMN", and "BCD". Thus the system inputs the word "kind" directly.

Figures 1, 30:
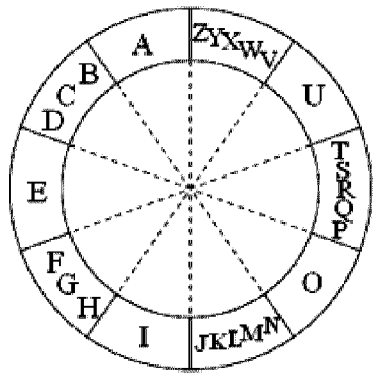
FIG. 30 is a schematic diagram of selecting a morpheme in an angular cell in English on the basis of the position of starting point.
Figures 2, 30:
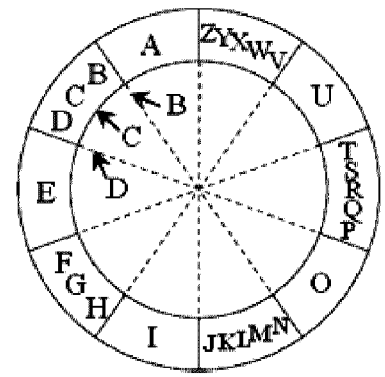
Figures 3, 30:
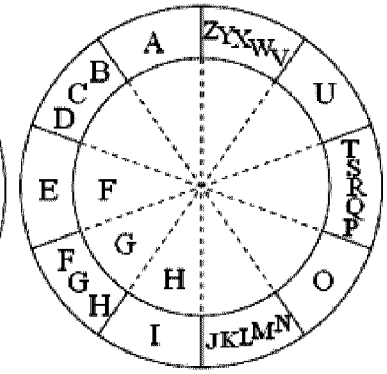
Figures 4, 30:
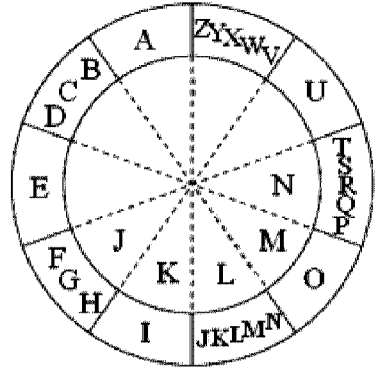
Figures 5, 30:
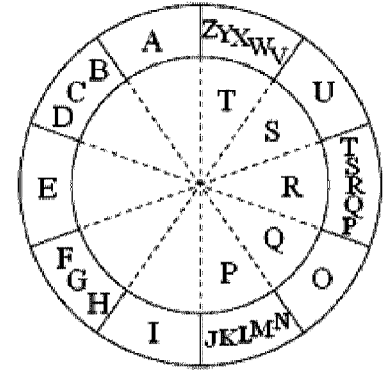
Figures 6, 30:
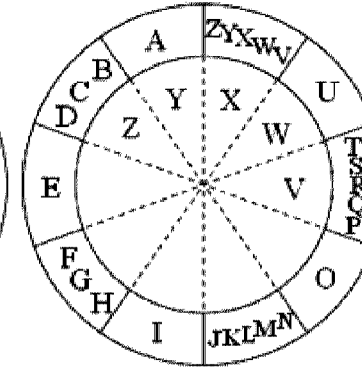
Figures 7, 30:
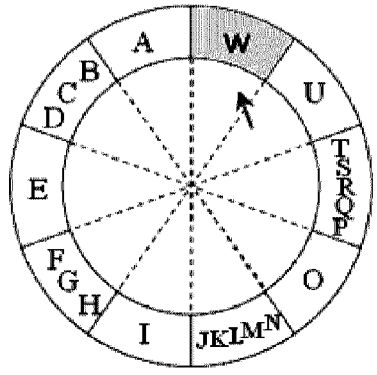
Figures 8, 30:
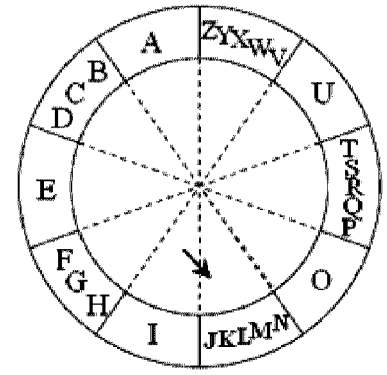
Figures 9, 30:
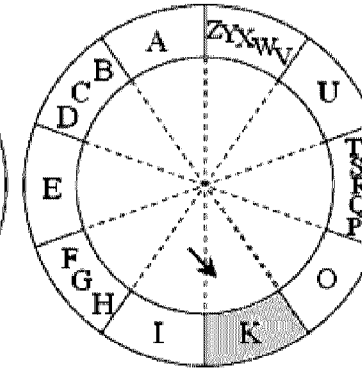
Figures 10, 30:
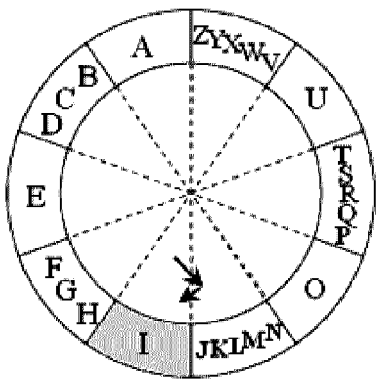
Figures 11, 30:
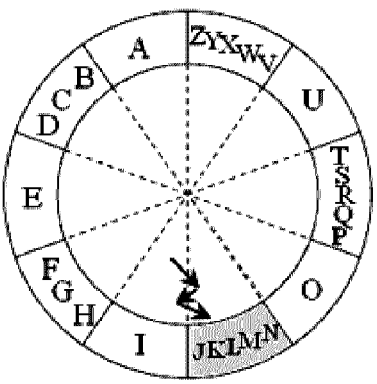
Figures 12, 30:
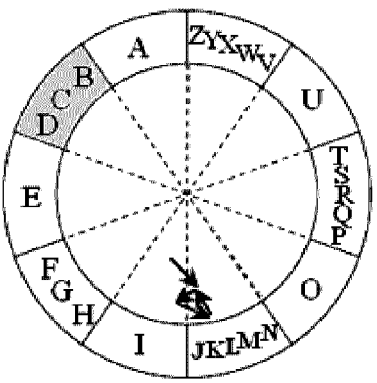

FIG. 30-1 illustrates that the zone in the circle is divided into sectional zones by lines that pass through the center of circle. The sectional zone that directly faces an angular cell corresponds to the middle morpheme in the angular cell. The adjacent sectional zone at either side corresponds to the morpheme at the corresponding side in the angular cell. FIG. 30-2 illustrates a sectional zone that faces the angular cell "BCD". Sliding from the sectional zone that directly faces the angular cell "BCD" indicates inputting the middle letter 'C' in the angular cell "BCD". Sliding from an adjacent sectional zone at a side of the angular cell "BCD" indicates inputting letter 'B' or 'D' at the corresponding sides. FIG. 30-3 illustrates an embodiment of inputting letter 'F', 'G', and 'H' by using sectional zones. FIG. 30-4 illustrates an embodiment of inputting letter 'J', 'K', 'L', 'M', and 'N' by using sectional zones. FIG. 30-5 illustrates an embodiment of inputting letter 'P', 'Q', 'R', 'S', and 'T' by using sectional zones. FIG. 30-6 illustrates an embodiment of inputting letter 'V', 'W', 'X', 'Y', and 'Z' by using sectional zones. FIG. 30-7 illustrates that the system directly prompts letter 'W' to the user when the user expects to input letter 'W'.

FIG. 30-8 to FIG. 30-12 illustrate the process of inputting a word "kind" with the method based on identification of the position of starting point within sectional zones. First, the user slides from the sectional zone corresponding to letter 'k' towards the angular cell "JKLMN", indicating inputting letter 'k', as shown in FIG. 30-8. The system prompts letter 'k' to the user, just like in the case shown in FIG. 30-9. Secondly, the user slides among the angular cells "I", "JKLMN", and "BCD" where the rest letters "ind" exist, as shown in FIG. 30-10, FIG. 30-11, and FIG. 30-12. As described above, in a of the possible combinations, only the word "kind" is meaningful. Therefore, the system automatically inputs the word "kind", and adds a space after the word automatically.

Figures 1, 31:
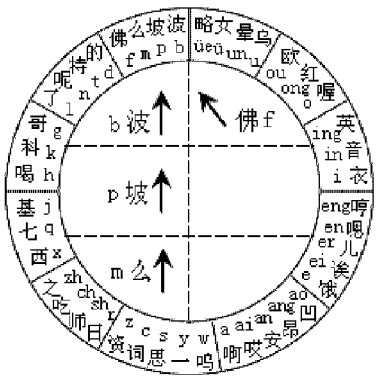
FIG. 31 is a schematic diagram of selecting a morpheme in an angular cell on the basis of the position of starting point for phonetic symbols, phonetic notations, and Cantonese in Chinese.
Figures 2, 31:
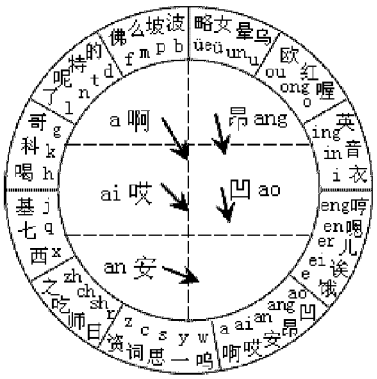
Figures 3, 31:
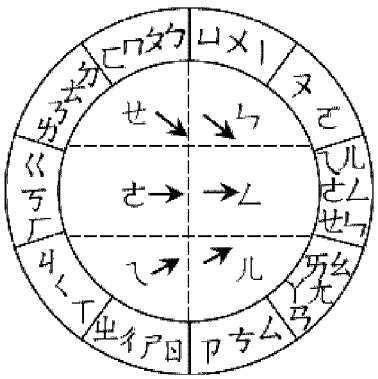
Figures 4, 31:
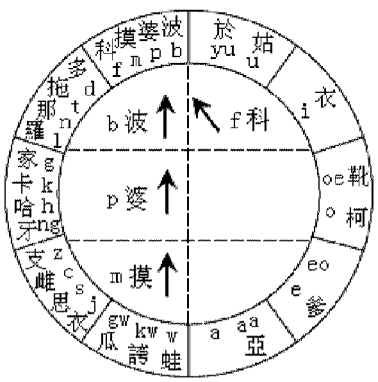

FIG. 31-1 illustrates an embodiment of selecting and inputting initial consonants of Chinese phonetic system on the basis of the position of starting point; FIG. 31-2 illustrates the embodiment of selecting and inputting last consonants in Chinese phonetic system; FIG. 31-3 illustrates the embodiment of selecting and inputting phonetic notations on the basis of position of starting point; FIG. 31-4 illustrates the embodiment of Cantonese.

FIG. 32 illustrates an embodiment of selecting and inputting Japanese Kana 'あ','い', 'う','え', 'お' on the basis of the position of starting point.

The zone information shown in FIG. 4 can also be used to assist the judgment of meaning category of the input content. For example, as shown in FIG. 4-5, sliding from zone 1 indicates inputting words for art and literature, sliding from zone 2 indicates inputting words for health and medicine, sliding from zone 3 indicates inputting words for history, sliding from zone 4 indicates inputting words for daily life, sliding from zone 5 indicates inputting words for philosophy and religion, sliding from zone 6 indicates inputting words for science and mathematics, sliding from zone 7 indicates inputting words for social science, sliding from zone 8 indicates inputting words for sports and entertainment, sliding from zone 9 indicates inputting words for science and technology and sliding from zone 10 indicates inputting words for earth and geography.

The zone information shown in FIG. 4 can also be used to assist the judgment of the part of speech of the input content. For example, in FIG. 4-3, using zone 1 as starting point indicates inputting a noun, using zone 2 as starting point indicates inputting a verb, using zone 3 as starting point indicates inputting an adjective and using zone 4 starting point indicates inputting a preposition.

The zone information shown in FIG. 4 can also be used to assist the judgment of the structural information of input Chinese characters. For example, in FIG. 4-5, using zone 1 as starting point indicates inputting the upper part of a Chinese character, using zone 2 as starting point indicates inputting the left part of a Chinese character, using zone 3 as starting point indicates inputting the lower part of a Chinese character, using zone 4 as starting point indicates inputting other parts of a Chinese character, and using zone 5 as starting point indicates inputting the right part of a Chinese character. For example, in FIG. 42-10, using zone "~" as starting point towards the angular cell "点 (dot stroke)" and selecting two dots indicates inputting the two points in the upper part of character '兑'; sliding from zone "," towards the angular cell "点 (dot stroke)" and selecting two dots indicates inputting 冫; sliding from zone "!" towards the angular cell "点 (dot stroke)" and selecting two dots indicates inputting the splay lower part of character '只'. This method is also applicable to the type of language with characters containing two-dimensional spatial information similar to Chinese characters, such as Korean.

Figures 1, 40:
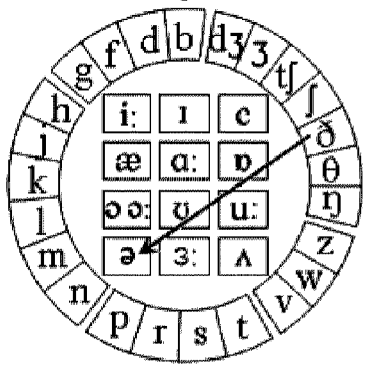
FIG. 40 shows an embodiment of input of English phonetic symbol.
Figures 2, 40:
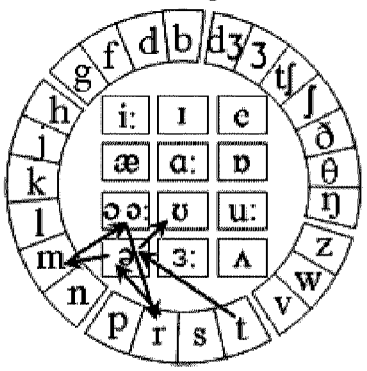
Figures 3, 40:
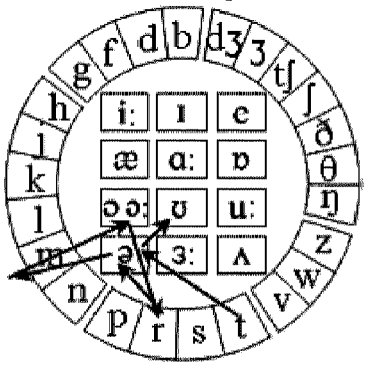

FIG. 40 is an embodiment of English word input application by utilizing pronunciations in the present invention. As shown in FIG. 40, phonetic consonants in English are arranged on the circle, while phonetic vowels in English are arranged within the circle. FIG. 40-1 illustrates the input of a word "there" by connecting lines. Such monosyllabic words can be input conveniently by means of a straight line or a line with a turning point. This approach matches the user's pronunciation habit, and can also solve the problem of spelling mistake of words, and therefore can reduce spelling errors. FIG. 40-2 and FIG. 40-3 illustrate the input of a word "tomorrow" by connecting lines. FIG. 40-3 illustrates the input of accent marks of words with the MMI provided in the present invention. As shown in FIG. 40-3, if the turning point of a broken line is beyond the circle, it indicates the phonetic alphabet at the turning point should be an accent. For example, since the accent of "tomorrow" is at the syllable 'mo', the line goes beyond the circle at the letter 'm'. By differentiating with accent marks, words can be differentiated according to language characteristics, so as to improve the recognition rate and reduce input of corresponding phonetic alphabets.

Figures 1, 41:
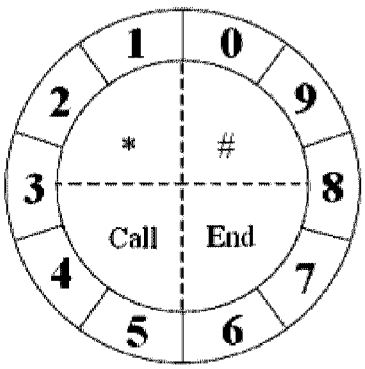
FIG. 41 shows an embodiment of operation in a number circle.
Figures 2, 41:
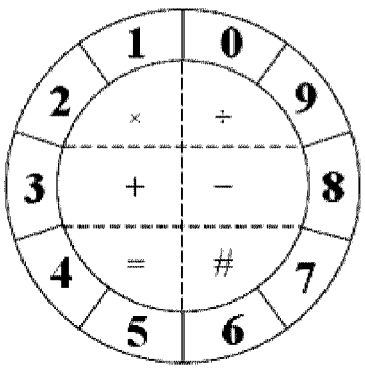
Figures 3, 41:
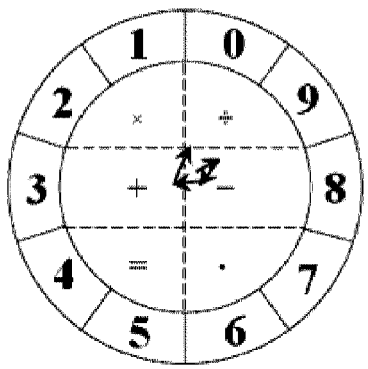
Figures 4, 41:
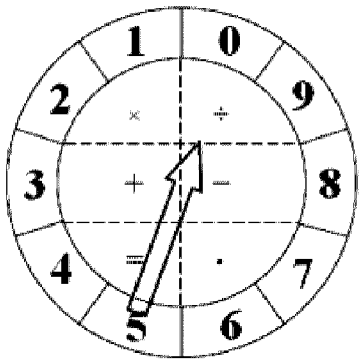
Figures 5, 41:
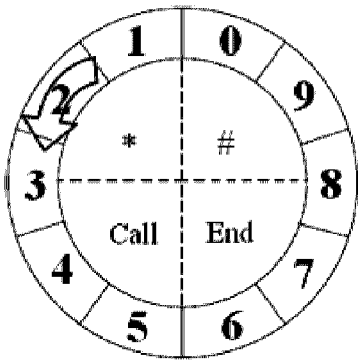
Figures 6, 41:
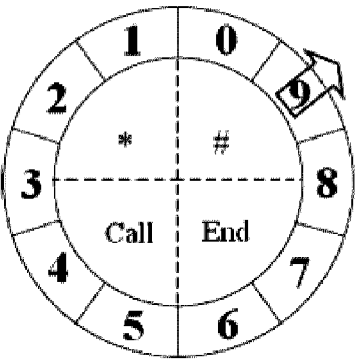

FIG. 41 illustrates operation embodiment of a number circle. FIG. 41-1 shows an interface for dialing; FIG. 41-2 shows an interface for number input; FIG. 41-3 shows the process of continuous input of "9530". In FIG. 41-4, the user slides from number '5' on the circumference towards number '0', indicating the input of five '0'. This is a special application of the number circle shown in FIG. 15-1, i.e., sliding inwards from the circumference to inside of the circle, which indicates the quantity of a number to be input. This function is very useful for bank employees, accountants, and engineers who often cope with a great deal of numbers. FIG. 41-5 shows a special application of the number circle shown in FIG. 15-9, i.e., input of phone numbers. For example, sliding in counter clockwise direction on number '2' indicates inputting mother's phone number, while sliding in clockwise direction on number '6' indicates inputting colleague Mr. Zhang's phone number. FIG. 41-6 illustrates the input of emergency phone number "911".

The two or more of basic elements of the MMI shown in FIG. 1 can be combined in a variety of ways. FIG. 2 illustrates some combination embodiments. FIG. 2-1 illustrates the combination of "circle in square"; FIG. 2-2 illustrates the combination of "square in circle"; FIG. 2-3 illustrates the combination of FIG. 2-1 and FIG. 2-2. FIG. 2-4 illustrates a combination of "square in circle". FIG. 2 illustrates the combination of "square in square", FIG. 2-6 illustrates the combination of "circle in square with smaller square in circle". FIG. 2-7 and FIG. 2-8 illustrate the combination of two nesting circles. FIG. 2-9 illustrates the combination of three nesting circles.

FIG. 42 illustrates some embodiments of language interfaces shown in FIG. 2. FIG. 42-1, FIG. 42-2, and FIG. 42-3 illustrate English interfaces, with 6 punctuation symbols in a circle. FIG. 42-4 illustrates an embodiment of an English circle with 10 number squares in it. FIG. 42-5 illustrates two nesting circles, wherein, the outer circle is for English letter, while the inner circle is for numbers. FIG. 42-6 illustrates an embodiment of a circle divided into 10 diagonal sections. FIG. 42-7 illustrates an embodiment of a circle divided into 5 diagonal sections. FIG. 42-8 illustrates an embodiment of an outer circle for strokes with an inner circle for commonly used Chinese characters. The 10 commonly used Chinese characters can be input directly by click in the angular cells on the inner circle; commonly used Chinese words such as "你好", "好的", "有的", "你是", "是你", "我在", "是 我", "我是", "这不", "这也", "也在", etc., can be input by directly lining between a pair of Chinese characters on the inner circle. With this method, 10-12 high frequency Chinese characters, with cumulative frequency higher than 10%, are provided directly and can be input simply by click which is to say, in 10% cases, the user can input Chinese characters simply by single click. These characters can be input in pairs by lining between them directly. FIG. 42-9 illustrates a combination of an outer circle for strokes with small squares for Chinese character in it. FIG. 42-10 illustrates a combination of an outer circle for five strokes with an inner circle for commonly used Chinese characters. FIG. 42-11 illustrates a combination of an outer circle for components and strokes with an inner circle for commonly used Chinese characters. FIG. 42-12 illustrates a combination of an outer circle for Chinese phonetic symbols with an inner circle for commonly used Chinese characters. FIG. 42-13 illustrates a combination of an outer circle for letters with an inner circle for phonetic alphabets. FIG. 42-14 illustrates a combination of an outer circle for phonetic consonants with an inner circle for phonetic vowels. FIG. 42-15 illustrates a combination of an outer circle for numbers with an inner circle for letters. FIG. 42-16 illustrates a combination of an outer circle for phonetic symbols with an inner circle for components and strokes. FIG. 42-17 illustrates a combination of an outer circle for phonetic symbols with an inner circle for strokes. FIG. 42-18 and FIG. 42-19 illustrate a combination of an outer circle for phonetic symbols with inner zones for strokes. With the interfaces shown in FIG. 42-18 and FIG. 42-19, phonetic and character pattern input methods can be implemented, on the basis of the position of starting point; phonetic input method, character pattern input method, and phonetic/character pattern input method can be provided on the same interface. For example, pure phonetic input can be used, with the stroke being ignored; or, input by directly clicking five strokes; or, slide from the zone of five strokes towards a phonetic zone, to input a character that begins with the stroke and has the pronunciation. For example, in FIG. 42-18 and FIG. 42-19, sliding from the zone of stroke "—" towards the cell "A" can input character "阿", which begins with the stroke "—", sliding from the zone of "|" towards cell "A" can input character "啊", which begins from "|". FIG. 42-20 illustrates a circle for phonetic symbols, with five tones in the circle, which can be used to input even tone, rising tone, rising-falling tone, falling tone, and neutral tone. One input method is to directly input the tonetic phonetic symbols, according to the tone zone of the starting point; the other method is to select the tone after the phonetic symbols are input. For example, when starting from the zone of even tone and inputting phonetic symbols "ba", the character "八" is preferred; when starting from the zone of rising-falling tone and inputting phonetic symbols "ba", the character "把" is preferred. Other languages with a tone system can be input in a way similar to input of Chinese characters. FIG. 42-21 illustrates the combination of two nesting letter circles. In the Chinese character circle shown in FIG. 42-8~FIG. 42-12, the CapsLock key in the zone at the top left corner is used to toggle quickly between Simplified Chinese Character and Traditional Chinese Character.

Figure 45:
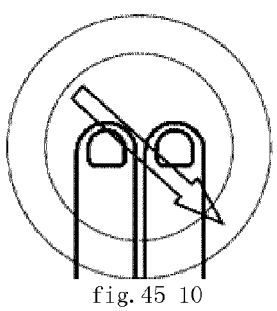
FIG. 45 shows sliding actions with multiple fingers.
Figure 45:
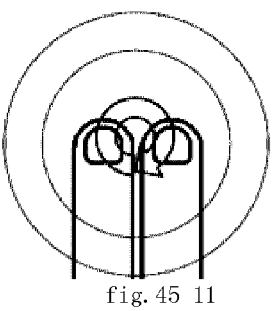
Figure 45:
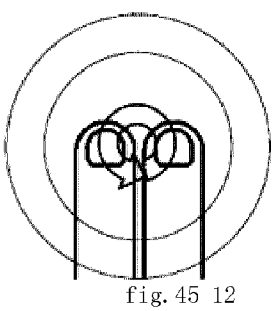

The MMI provided in the present invention supports simultaneous operation with multiple fingers, as shown in FIG. 44. FIG. 44-1 illustrates simultaneous operation with two fingers; FIG. 44-2 illustrates simultaneous operation with three fingers; FIG. 44-3 illustrates simultaneous operation with four fingers. FIG. 45 illustrates a variety of multi-point touch control operations with two fingers for example. Table 3 lists the operating actions and their definitions.

TABLE 3

| Fig. No. | Operation mode | Definition of Operation with Two Fingers | Definition of Operation with Three Fingers |
| --- | --- | --- | --- |
| FIG. 45-1 | Slide to left and right | Toggle the interface | Toggle the interface |
| FIG. 45-2 | Slide to right | Toggle the interface | Toggle the interface |
| FIG. 45-3 | Slide to left | Toggle the interface | Toggle the interface |
| FIG. 45-4 | Slide up and down | Select an alternative word | Input the last input word |
| FIG. 45-5 | Slide upwards | Convert the initial letter to upper case | Convert all letters of the word to upper case |
| FIG. 45-6 | Slide downwards | Select an alternative word | Enter key |
| FIG. 45-7 | Slide to up-right | Delete key | Delete the next word |
| FIG. 45-8 | Slide to left-down | Cut key | Undo key |
| FIG. 45-9 | Slide to left-up | Backspace key | Delete the previous word |
| FIG. 45-10 | Slide to right-down | Tab key | Input the last input sentence |
| FIG. 45-11 | Slide in clockwise | Select tense | Select tense |
| FIG. 45-12 | Slide in counter-clockwise | Select tense | Select tense |

Single click in the circle with two fingers at the same time indicates selecting the Syntax key; single click in the circle with three fingers at the same time indicates selecting the Space key. Or, single click in the circle with two fingers at the same time indicates selecting Space key, and single click in the circle with three fingers at the same time indicates selecting Enter key.

The user can toggle among the language interfaces quickly using multiple fingers. For example, sliding to left with two fingers indicates toggling to number circle; sliding to right with two fingers indicates toggling to punctuation symbol square; sliding to left with three fingers indicates toggling to Chinese component circle; sliding to right with three fingers indicates toggling to icon square to input expression icons.

The fingers can click on the interface to achieve the function of Space, Enter, and Syntax keys. When the fingers slide on the interface towards different directions, the interface will be toggled accordingly. The sliding of finger on the interface towards different directions can achieve the function of CapsLock key, Backspace key, and Enter key. The sliding of fingers on the interface towards different directions can achieve selection from alternative characters or words and selection of the last input content. The sliding of finger on the interface towards different directions can achieve selection of word tense.

A Syntax key is added on top of the circle of the MMI of the present invention; or single click within the circle with two fingers indicates selecting the Syntax key. After the user inputs a word and if the word belongs to a noun, the plural form of the noun can be input automatically by single click of the Syntax key. If the word belongs to an adjective, the comparative form of the adjective can be input automatically by single click of the Syntax key; and the superlative form of the adjective can be input by double-click of the Syntax key. Other actions related with the Syntax key are shown in the following table (the functions in the blank cells are to be defined). The table can be designed according to the syntax of a specific language.

TABLE 4

| Syntax key | Noun | Verb | Pronoun | Number | Adjective, Adverb |
|---|---|---|---|---|---|
| Single click | Plural form | Past tense | Reflexive pronoun | Cardinal number | Comparative degree |
| Click again | Singular form | Simple tense | Objective | | Positive degree |
| Double-click | Possessive | Perfect tense | Possessive pronoun | Ordinal number | Superlative degree |
| Long press | | Progressive | | | Superlative degree |

If the user inputs a verb, the user can select the verb tense by single click of the Syntax key, as shown in FIG. 51. The verb tense can be selected by sliding with multiple fingers in clockwise direction or counter clockwise direction. It can be seen from above embodiment: the Syntax key can be used at the same time according to different tenses of the word to reduce syntax errors of user, and is especially helpful in circumstances that the user can't recall the syntax clearly or correctly, or doesn't know the correct syntax.

Figures 1, 46:
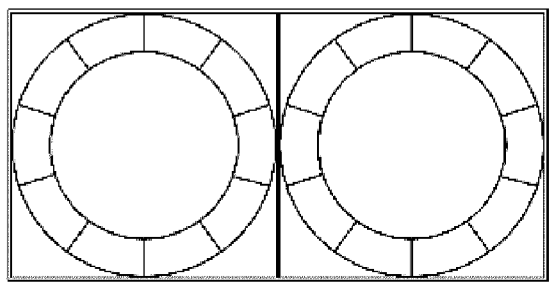
FIG. 46 is a schematic diagram of using multiple MMIs together.
Figures 2, 46:
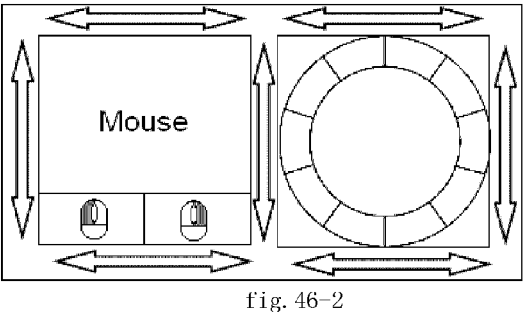
Figures 3, 46:
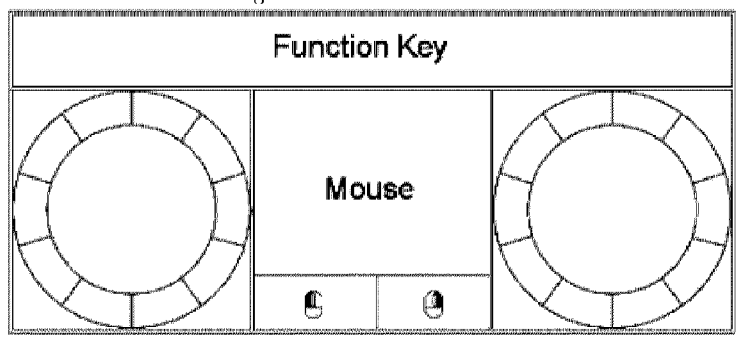
Figures 4, 46:
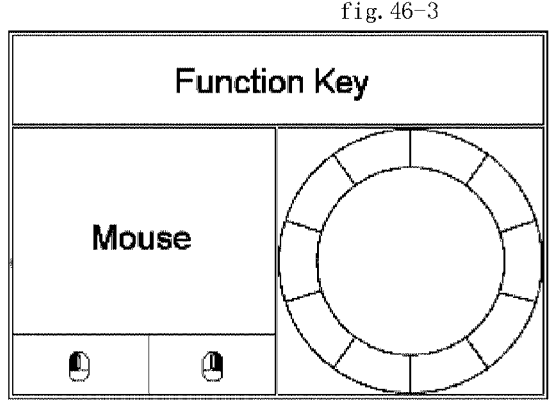
Figures 5, 46:
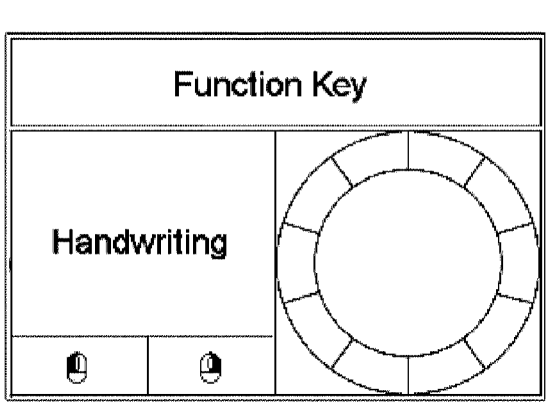

The MMI in the present invention can work with not only one circle but also two or more circles to improve the efficiency of input. FIG. 46 illustrates the arrangement of working with multiple circles. FIG. 46-1 illustrates the arrangement of two circles, wherein, one circle can be switched to mouse state, as shown in FIG. 46-4; the other circle can be switched to handwriting recognition state, as shown in FIG. 46-5. The MMI can also work with three circles, including a middle circle used as mouse and two circles at the sides, as shown in FIG. 46-3. In FIG. 46-3, FIG. 46-4, and FIG. 46-5, space between and around circles can be used as zones for sliding operations, as shown in FIG. 46-2.

Figures 1, 47:
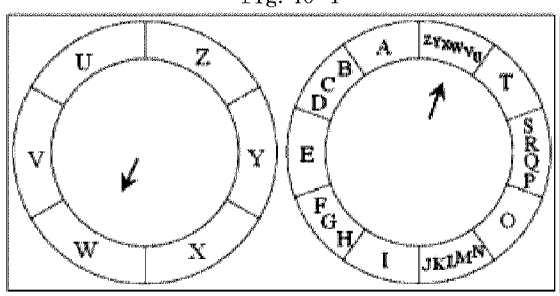
FIG. 47 shows an embodiment of using two circles together in English.
Figures 2, 47:
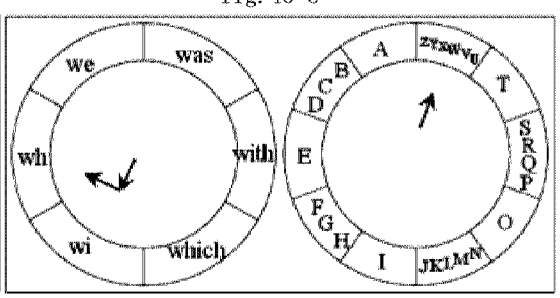

FIG. 47 shows embodiments of FIG. 46. FIG. 47-1, FIG. 47-2, and FIG. 47-3 illustrate arrangements using a primary circle for input and using a vice circle for expansion and enlargement. As shown in FIG. 47-1, when the user slides towards the angular cell "UVWXYZ" on the primary circle, the morphemes in the angular cell are expanded on the vice circle. After the user inputs letter 'W', the vice circle prompts in an expanded manner. FIG. 47-3 illustrates the example of inputting a word "where".

FIG. 47-4 illustrates an arrangement of using two primary circles simultaneously, wherein, when a word is input with the primary circle on the left, the next word can be input simultaneously with the primary circle on the right, so as to achieve parallel input and improve the input speed.

FIG. 48 illustrates an embodiment of dividing letters into two circles. Except for the arrangement shown in FIG. 48, the left circle can be allocated with letters A~N, while the right circle can be allocated with letters O~Z.

The MMI provided in the present invention can be toggled among primary circle, auxiliary circle, handwriting input interface, plot interface, and mouse interface.

The input method provided in the present invention detects the user's movement direction in real time, not only finger sliding direction and input pen sliding direction but also pressure direction and swaying direction, etc. FIG. 49-1 illustrates an application of the present invention on a spot-input device. The device shown in FIG. 49-1 is a spot-input device that can sense pressure; the system automatically predicts the user's input on the basis of the pressure direction; the user can conveniently input information by controlling and adjusting the amplitude and direction of pressure. Such an MMI can be used on small and compact devices to input information quickly, such as portable electric devices including mobile phones, MIDs, UMPCs, and PDAs, etc. FIG. 49-2 illustrates an arrangement with two spot-input MMIs, which can be manipulated simultaneously with left and right hands to improve the input speed. Or, one MMI can be used for input, while the other MMI can be used as mouse. When no information input is required, both MMIs can be used as mouse to plot or play game, etc. FIG. 49-3 illustrates an application of the MMI in the present invention on a thumb touch pad; FIG. 49-4 illustrates an application of the MMI on a point stick or joy stick.

Figures 4, 50:
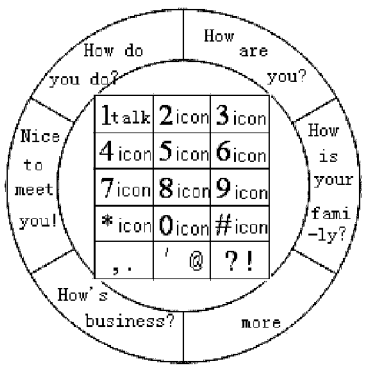
FIG. 50 is a schematic diagram of icon-based application.
Figures 5, 50:
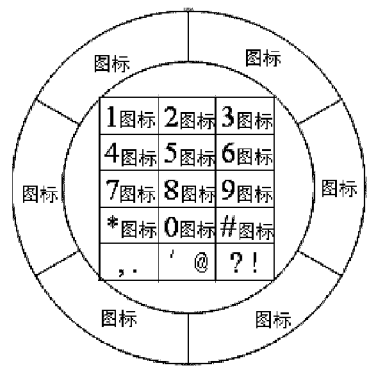
Figures 6, 50:
Figures 7, 50:
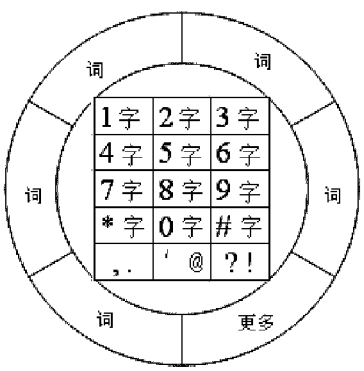
Figures 8, 50:
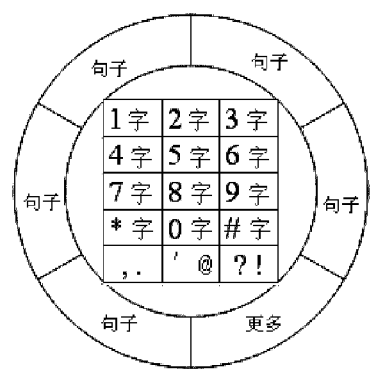
Figures 9, 50:
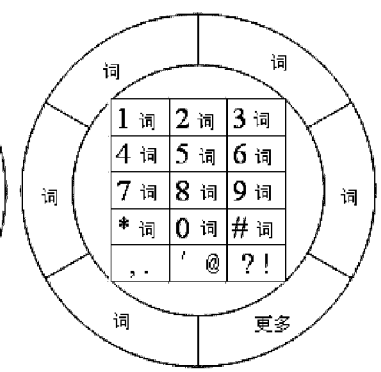
Figures 10, 50:
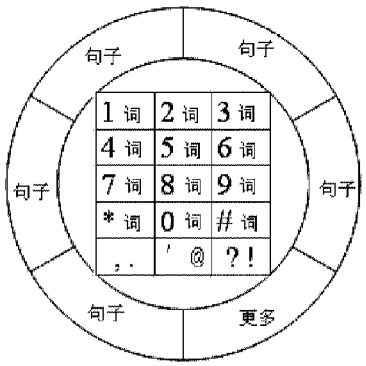
Figures 11, 50:
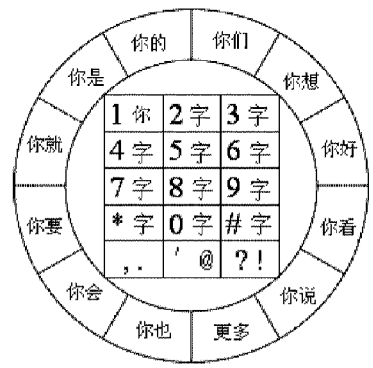
Figures 12, 50:
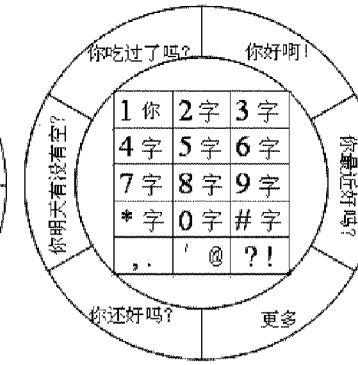
Figures 13, 50:
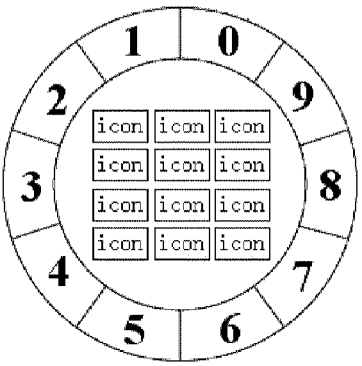
Figures 14, 50:
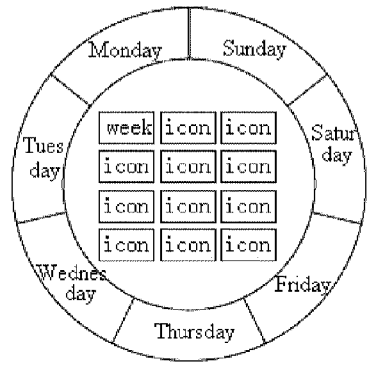
Figures 15, 50:
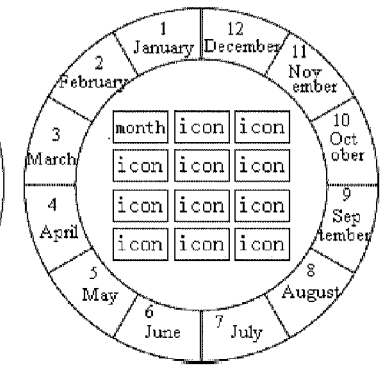

The present invention can also provide icon-based or category-based input methods, as shown in FIG. 50. When the user click an icon with specific meaning or a category with specific meaning, the options related with the meaning or category appear on the circumference for the user to select. This input method can be used to input some commonly used characters or words. FIG. 50-1 illustrates expansion of category on the circumference when an icon that represents a category in English is pressed, FIG. 50-2, FIG. 50-3, and FIG. 50-4 show embodiments of FIG. 50-1; when an icon that represents food and beverage is clicked, the category is expanded to show common foods and beverage products for the user to select. In FIG. 50-6, when an icon represents chat and greeting is clicked, the category is expanded to show commonly used greetings for the user to select. FIG. 50-5 and FIG. 50-6 illustrate embodiments of expansion of Chinese icons and categories. FIG. 50-7 to FIG. 50-12 illustrate hierarchical expansion of Chinese characters, words and sentences. FIG. 50-13 to FIG. 50-18 illustrate category-based input method for a number circle. In FIG. 50-14, when the icon of "week" in English is input, the days of week are displayed for the user to select; in FIG. 50-15, when the icon of "month" in English is input, the months are displayed for the user to select. FIG. 50-16 illustrates quick input of time by utilizing the position information of the starting point. Pointing to '3' from the zone "month" indicates inputting "March"; pointing to '5' from the zone "week" indicates inputting "Friday"; pointing to '2' from the zone "hour" indicates inputting "two hours"; pointing to '5' from the zone "minutes" indicates inputting "five minutes". FIG. 50-18 illustrates category-based input of Chinese zodiacs.

FIG. 50-19 illustrates expansion of a circle when an icon is clicked. In FIG. 7-19, when an icon is clicked, other icons disappear, and a circle expanded from the icon is displayed for the user to select. Or, there is only one icon originally, representing the MMI in minimized state; when the icon is clicked, the MMI is opened; when the icon is clicked again, the MMI is minimized. Or, the expansion represents the manipulation of icons in operating system; for example, when the icon that represents "Start" is clicked, computer icons such as "Program", "My Computer", "Control Panel", and "Internet", etc. are displayed; when the user slides towards one of these icons, the icon is further expanded to display more icons. For example, when the user slides towards the icon "My Computer", another circle is displayed, with icons "Disk C" and "Disk D" on it; then, the user can slide further and select the required folder, and then slide again to select the required file. The entire process is a hierarchical expansion process, as shown in FIG. 24-1~FIG. 24-3. The method of selecting icons in the operating system by continuous sliding can be used to replace the existing method of clicking and selecting with the mouse level by level, and is more convenient and attractive.

The MMI provided in the present invention supports inputting words in sequence by single-click or double-click of individual letters, just like the conventional input method; usually, single-click indicates inputting a letter in lower case, while double-click indicates inputting a letter in upper case. Double-clicking a letter next to a non-letter character indicates converting the letter to upper case; double-clicking a letter next to a letter indicates inputting two identical letters consecutively. The user can input every morpheme separately. For single-morpheme angular cells, the user can input the morpheme in the angular cell by single-click; for multi-morpheme angular cells, the user can input a morpheme in the angular cell with any of the methods 1, 2, and 3 shown in the following table. Alternatively, the user can input individual morpheme separately, and input the rest morphemes by mean of combined inputting. There are three methods for inputting the initial morpheme. Method 7 has the highest input speed, but is much more likely to pick up words. Therefore, this method is suitable for application occasions such as input on mobile phones, because most words input on mobile phones are words related with daily life and therefore words are less likely to be picked up. Method 1, 2, and 3 have lower input speeds, but every morpheme can be determined separately with these methods. Therefore, these methods are suitable for input of personal names, geographic names, and abbreviations that are rarely seen in dictionaries. In that case, after the user accomplishes the input of a word, the system will add the manually input word into the system database, so that the user needn't to input the morphemes one by one in the next time, but can input them directly in a combined manner with the method 7. Methods 4, 5, and 6 achieves trade-off between speed and word pickup, and are suitable for application occasions that involve vast input information, such as computers.

|  | Each morpheme is input separately | The initial morpheme is input separately, the rest morphemes are input in combination |  |
|---|---|---|---|
| Slide and select within angular cell | 1 | 4 | 7. Directly combined input of the angular cells, without separate input |
| Angular cell enlargement and selection | 2 | 5 | |
| Select multi-morpheme angular cell at the position of the starting point | 3 | 6 | |

When using the MMI provided in the present invention to input information, the user can set the mechanism of input confirmation to be used when he/she points to an angular cell, according to his/her habit, familiarity with the MMI, and expected input accuracy and speed. A scheme is: when the user points to an angular cell, the system directly inputs the content in the angular cell without any prompt, and the user continues to input the content in the next angular cell. Another scheme is: when the user points to an angular cell, the system directly inputs the content in the angular cell, and displays the angular cell in a difference manner, to indicate the content in the angular cell has been input. Another scheme is: when the user points to an angular cell, the system doesn't input the content in the angular cell but displays the angular cell in a differentiate manner to indicate that the user is pointing to the angular cell, and waits for the user to confirm; when the user moves on in the direction of movement to confirm input, the system inputs the content in the angular cell, and displays the angular cell in a difference manner to provide feedback to the user.

|  | Direct input, without any prompt | Direct input when the angular cell is pointed, and provide feedback by different display | Differentiate the display and don't input, wait for the user to confirm when the angular cell is pointed; differentiate the display in a different way to provide feedback after the user confirms the input. |
|---|---|---|---|
| Initial morpheme | 1 | 2 | 3 |
| The rest morphemes | 4 | 5 | 6 | morphemes with the method 7 shown in the following table, i.e., by directly combined inputting of the angular cells. FIG. 52 shows the flow chart of input by means of directly combined inputting of angular cells. The user can input the initial The methods 1~6 described above can be combined on the basis of morpheme order into the following nine methods: 14, 15, 16, 24, 25, 26, 34, 35 and 36. Wherein, method 14 has the highest input speed and is suitable for veterans; method 36 has the highest accuracy and is suitable for novices. The input confirmation by user in method 3 and method 6 refers to: if the content in the angular cell currently displayed by the system in a differentiated manner is expected by the user, the user can move on in the current movement direction; however, if the content of angular cell currently displayed by the system in a differentiated manner is not expected by the user, the user can change the movement direction to point to the required angular cell.

With an acceleration sensor, a device that uses the MMI provided in the present invention can toggle between different interfaces by means of shaking. For example, when the devices is swayed for the first time, it toggles to number circle; when swayed again, the device toggles to punctuation symbol input; when swayed further, the device toggles back to the original interface. Otherwise, the device can be configured to toggle to number circle when swayed to left; toggle to punctuation symbol input when swayed to right; toggle to another kind of language or input method (e.g., toggle from Chinese to English, or toggle from phonetic input to stroke input) when swayed upwards; toggle to handwriting input when swayed downwards. The user can configure the interface corresponding to a swaying direction according to his/her habit and preference.

FIG. 53 to FIG. 55 show embodiments of circles in other languages as shown in FIG. 5-1. FIG. 53 lists circles for Japanese, Korean, and other languages that contain about 40~60 morpheme units. Morphemes of such language can be input in combination according to the rules of the language, with reference to the input of Japanese described in the present invention. The input can be carried out in a way similar to that shown in FIG. 32 and FIG. 39. FIG. 54 lists languages that contain the same basic letters as those in English, with additional letter variants. Input of such languages can be accomplished by means of the English circles shown in FIG. 8; or, some modifications can be made to the English circles according to the characteristics of such languages; for example, the high-frequency letters in these languages can be arranged separately, and some letters that don't exist in English can be added. Input of languages that are similar to English but with some vowel variants, such as Spanish, Swedish, or Italian, etc., can be accomplished directly with the method shown in FIG. 8-3, with the vowel variants being input with the method shown in FIG. 18-1. Input of languages with variants of letter 'S', such as German, Finnish, etc., can be input with the circle shown in FIG. 8-6, with the variants of letter 'S' being allocated in a separate cell. FIG. 55 lists languages that have fewer basic morpheme and quite different from English. For these languages, the high-frequency letters can be arranged in a separate angular cell, and other letters can be arranged in combination in order in other angular cells, with a method similar to that for English, according to the rules of the language and the frequency of the letters. For very complex languages with more than 60 basic morphemes, such as Arabic language, Thai language, Tibetan language, Sanskrit language, Mongolian language, Bengali language, etc., the input can be accomplished with reference to the method for Chinese cycle. Though there are hundreds of radicals and components in Chinese, commonly used stroke and component can be abstracted. Alternatively, for these languages, some basic strokes can be used to form all characters and symbols according to the characteristics of the language, with reference to the design shown in FIG. 12.

It can seen from above description: the technical scheme of input in three major languages (English, Chinese, and Japanese) described in the description is essentially applicable to all human languages. The input can be accomplished conveniently by means of a circle and the innovative sliding input methods provided in the present invention, and are no longer restricted to real QWERTY keyboard or device size. The present invention can even be used on mobile phones to achieve convenient input. With the MMI provided in the present invention, any user can input directly in his/her mother language, without mapping to English keyboard. Therefore, the present invention is very helpful in enriching the world culture.

The interfaces for different language symbol systems illustrated in the accompanying drawings are only provided to illustrate and describe the technical ideal of the present invention, and shall not be deemed as limitation to the present invention. In specific applications, it is possible to obtain appropriate designs or make appropriate changes to cater for other languages and characters in the world according to the characteristics of the languages and characters, without departing from the spirit of the present invention; however, all of such designs shall be deemed as falling into the protection scope of the present invention. In the designs of input methods for different languages and symbol systems, the input symbols should be arranged in a way according to the characteristics and symbol order in the language and symbol system, so that all users all over the world can input intuitively and smoothly in their mother languages, without passing through a hard learning process, to get rid of the current situation of input, i.e., many users whose mother language is not English have to map the morphemes in their mother languages into the QWER arrangement in English and therefore encounter inconvenience and high learning cost in input. Furthermore, with the technical scheme of the present invention, all users all over the world can set about from the language itself when they use a foreign language, so as to learn and use foreign languages more easily.

The embodiments described above in this present invention are only provided to clarify the present invention, without any intention to limit the present invention to any of the disclosed forms. It is possible to make modifications or variations to the present invention on the basis of above instructions or the embodiments provided in the present invention. Those embodiments are selected and described only to describe and illustrate the principle of the present invention and enable those skilled in this art to utilize the present invention in actual applications. The technical ideal of the present invention is only confined by the claims.

The invention claimed is:

1. A method for a user to input content into an electronic device using an input system, the input system comprising a circle ring and a database, the circle ring comprising an outer circle and an inside circle, a first input area is on the circle ring and between the outer circle and the inside circle, the first input area comprising a plurality of keys, wherein each key of the plurality of keys is an angular cell comprising at least one morpheme;

a second input area is inside the inside circle, the second input area is empty or includes only punctuation marks, and wherein the second input area is divided into a plurality of zones;

the method comprising:

the user continuously sliding or pressing along a slide path towards the angular cell of each of a plurality of morphemes of the input content until a final morpheme is completed, the system comparing all possible combinations of the plurality of morphemes with the database;

detecting at the system in real time positional information of a starting point, a turning point, a finishing point of the slide path, pause durations and magnitude of pressure, to assist in prediction and judgment of the content to be input into the electronic device;

determining at the system word length of an input word based on the positional information of the starting point of the slide path;

determining at the system a second input word a third input word and a fourth input word in a phrase or a sentence based on a pause duration of the starting point of the slide path; and inputting from the system into the electronic device only one possible combination of the plurality of morphemes or high frequency combination of the plurality of morphemes.

2. The method according to claim 1, wherein, content to be input is placed in the angular cells of the first input area, the input content comprising a morpheme, categories, icons, file folders, files, program; the morpheme comprising a letter, character, number, Chinese radical, Chinese stroke; the morpheme according to a sequence of an alphabet.

3. The method according to claim 1, wherein, at least one angular cell comprises only one morpheme; and at least one other angular cell comprises more than one morpheme.

4. The method according to claim 1, wherein, five letters "A, E, I, O, T" are separately placed in one angular cell; or five vowel letters "A, E, I, O, U" are separately placed in one angular cell; or five Japanese Kana are placed together in one angular cell according to a sequence of Japanese syllabary.

5. The method according to claim 1, wherein, the input method comprises:

sliding along a first slide path from the first input area to the second input area, wherein a starting point of the first slide path is on the first input area and a finishing point of the first slide path is on the second input area, and wherein the input system inputs a combination of content in a first angular cell corresponding to the starting point and content in a second angular cell toward which the first slide path extends; and wherein, if the content in the first and second angular cells is numbers, the input system inputs a starting number in the second angular cell;

sliding along a second slide path from the second input area toward the first input area, wherein a starting point and a finishing point of the second slide path are each in the second input area, and wherein the input system inputs content in an angular cell toward which the second slide path extends;

sliding along a third slide path from the second input area directly to the first input area, wherein a starting point of the third slide path is on the second input area and a finishing point of the third slide path is on the first input area, and wherein the input system inputs a word or phrase initial with a morpheme of an angular cell at the finishing point;

sliding outward from the circle ring, wherein the input system inputs a capital letter or letter variant, or a shortcut input word;

sliding outward from the circle ring and then sliding back, wherein the input system inputs a letter variant, or shortcut input word or phrase;

sliding between two adjacent angular cells, wherein the input system inputs a combination of morphemes in the two adjacent angular cells;

sliding within an angular cell selecting a morpheme in a multi-morpheme angular cell;

sliding within an angular cell shortcut input word in a single-morpheme angular cell;

two fingers retracting inward from the circle ring, wherein the input system inputs a combination of morphemes in two starting angular cells;

two fingers extending outward in opposite directions along an extension line, wherein the input system inputs a combination of morphemes in two angular cells that the extension line points to;

two fingers revolving on the circle ring revolving or switching interface.

6. The method according to claim 1, wherein, content in angular cell that current slide direction points to changes in real time, an incremental morpheme string is prompted hierarchically for user to select and continue; once slide direction doesn't point to the angular cell any more, content in the angular cell returns to initial state.

7. The method according to claim 1, wherein, the method further includes: when words are input, different contents are prompted depending on ordinal number of angular cells in input; when first and second angular cells are input, prompts prefixes; when second and third angular cells are input, prompts letter strings initiated with morpheme in the angular cell; when third and further angular cells are input, prompts suffixes; system prompts alphabetic variants during input of Latin language.

8. The method according to claim 1, wherein, after user stop sliding and leave interface, system directly input word and add a space or punctuation symbol after word.

9. The method according to claim 1, wherein, the method further includes: an expansion and enlargement function, wherein morphemes in one angular cell along a slide direction expand and enlarge to adjacent angular cells for a user to select; and wherein, after expansion and enlargement, each morpheme occupies an angular cell separately.

10. The method according to claim 1, wherein, morphemes in an expandable angular cell expand in three types: firstly, expand towards both sides, centering on a central morpheme in the expandable angular cell; secondly, expand towards both sides, centering on a frequency morpheme in the expandable angular cell; thirdly, expand towards both sides, centering on slide direction.

11. The method according to claim 1, wherein, the method further includes: angular cells enlargement function, wherein each angle of adjacent angular cells pointed by the slide path enlarge for user to select.

12. The method according to claim 1, wherein, the method further provides an icon-based input method, wherein, when an icon is clicked, the input system displays a circle ring comprising a plurality of icons;

continuous sliding select icons of an operating system, comprising: clicking on a "Start" icon of the operating system, wherein the input system displays a circle ring comprising a plurality icons of the operating system; sliding towards one of the icons of the operating system, wherein the one of the icons of the operating system is further expanded to display more icons; sliding and selecting a folder, and further sliding to select a file.

13. The method according to claim 1, wherein, the method further provides shortcut input of time according to position information of the starting point; wherein, when the first input area is a number circle ring, the second input area comprises a month zone, a week zone, an hour zone, and a minute zone.

14. The method according to claim 1, wherein, the method further provides an assistant initial morpheme screening method, comprising: inputting an initial morpheme separately, and consecutively sliding from a second morpheme to a last morpheme; wherein the input system filters out meaningful combinations from all possible combinations.

15. The method according to claim 1, wherein, the possible combinations display on the first input area for the user to select.

16. The method according to claim 1, wherein, selecting a morpheme in an angular cell according to a corresponding starting point zone information of the second input area; wherein each zone sequence number of the second input area corresponds to a morpheme sequence number in an angular cell;

or, wherein a morpheme in an angular cell is selected according to starting point zone information of the second input area relative to a pointed angular cell; wherein the zone near an angular cell corresponds to the middle morpheme in an angular cell, and wherein the zone on both sides of an angular cell corresponds to an edge morpheme in an angular cell.

17. The method according to claim 1, wherein, the method automatically recognizes input language type or forms according to zone information of the second input area; each zone of the second input area corresponds to one language type or different forms of a same language.

18. The method according to claim 1, wherein, the method automatically identifies demarcation points of input content at different levels according to the position of the starting point, demarcation points comprising positions in phrases or sentences, achieve smart input of phrase or sentence, the starting point in one zone of the second input area corresponds to the phrase or sentence input.

19. The method according to claim 1, wherein, the first input area is a tetragon.

20. The method according to claim 1, wherein, the method judges an accent of a word according to the position of the turning point outside the first input area, and wherein a morpheme at the turning point is an accent morpheme;

or the method judges long vowels according to the pause period of the turning point, and wherein a morpheme at the turning point is a long vowel.

21. The method according to claim 1, wherein, the method judges tones according to zone information of starting point; and wherein each zone of the second input area corresponds to different tone.

22. The method according to claim 1, wherein, the method judges structural information of morpheme elements in Chinese and Korean, according to zone information of the starting point; structural information comprising structural of strokes, components, or phonetics in Chinese characters and Korean; and wherein each zone of the second input area corresponds to different structural position information.

23. The method according to claim 1, wherein, the method judges the word length of the input word according to a position of the starting point; wherein if the starting point is in the first input area, the input system determines that the word length of the input word is less than or equal to a setting number; wherein if the starting point is in the second input area, the input system determines that the word length of the input word is greater than the setting number; and wherein, each zone of the second input area corresponds to different word length.

24. The method according to claim 1, wherein, the method judges part of speech of input content according to the position of zone information, wherein each zone of the second input area corresponds to different part of speech.

25. The method according to claim 1, wherein, the method further includes an operation performed with multiple fingers;

multiple fingers click to achieve function of Space, Enter, and Syntax keys;

when multiple fingers slide towards different directions, the input system switches between different input interfaces; or achieves function of CapsLock key, Backspace key, and Enter key; or achieves selection of prompted content; or achieves selection of recently input content; or achieves selection of verb tense.

26. The method according to claim 1, wherein, the method further includes operation with a plurality of circle rings.

27. The method according to claim 1, wherein, the method further provides phonetic input.

28. The method according to claim 1, wherein, the method judges concept categories of input content according to zone information, wherein each zone of the second input area corresponds to different kind of concept category.

29. The method according to claim 1, wherein, the method provides a Syntax button function; wherein a Syntax key is on top of the circle ring, or wherein when two fingers click the second input area the input system achieves function of the Syntax key; and wherein when the input system detects action of the Syntax key, it inputs a corresponding syntax word according to part of speech of currently input word.

30. The method according to claim 1, further comprising a square frame outside of the circle ring, wherein the input system comprises four corner zones between the circle ring and the square frame, and wherein these four corner zones are a third input area.

31. The method according to claim 30, wherein, CapsLock, Space, Backspace and Enter keys are arranged within the four corner zones;

in addition, starting from the third input area, sliding towards different directions, to select words, phrases, or sentences prompted by the input system;

or selecting words, phrases, or sentences that the user has input before;

or switching between different input interfaces;

or achieving function of Esc key, Tab key, cursor keys (Up, Down, Left, Right), PgUp key and PgDn key, Home key, and End key;

or achieving editing function of copy, cut, paste, delete, undo, and redo;

or achieving function of upper case conversion of initial letter or all letters of previous word, or upper case conversion of initial letter of next word;

or achieving direct deletion of a previous word or sentence, or direct deletion of a next word or sentence.

32. The method according to claim 1, method further includes: when the user inputs a word that doesn't exist in the database, the user input morphemes one by one; after the user finishes the input, the input system adds the word into the system database automatically.

33. The method according to claim 1, wherein, the method further includes detecting a swaying direction.

34. The method according to claim 1, wherein, the method further includes switching between different input interfaces by swaying the electronic device.

35. The method according to claim 1, wherein, the method provides three methods for the user to confirm input content in the angular cell:

when the user points to an angular cell, the system directly inputs the angular cell without any prompt, and then the user continues to point to a next angular cell;

or, the system directly inputs the angular cell and display the angular cell in a different manner to indicate that input of the angular cell was done;

or, the system doesn't input and displays the angular cell in a different manner and waits for user confirmation; wherein the user confirms by further sliding in a slide direction; and wherein the system directly inputs the angular cell and displays the angular cell in another different manner.

\* \* \* \* \*